(12) United States Patent
Kawase et al.

(10) Patent No.: US 10,680,273 B2
(45) Date of Patent: Jun. 9, 2020

(54) BATTERY

(71) Applicant: Panasonic Intellectual Property Management Co., Ltd., Osaka (JP)

(72) Inventors: Akira Kawase, Osaka (JP); Kazuyoshi Honda, Osaka (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 16/018,093

(22) Filed: Jun. 26, 2018

(65) Prior Publication Data
US 2019/0020054 A1    Jan. 17, 2019

(30) Foreign Application Priority Data

Jul. 14, 2017 (JP) ................................ 2017-137573

(51) Int. Cl.
*H01M 10/04* (2006.01)
*H01M 10/46* (2006.01)
*H01M 10/02* (2006.01)

(52) U.S. Cl.
CPC ....... *H01M 10/0459* (2013.01); *H01M 10/02* (2013.01); *H01M 10/045* (2013.01); *H01M 10/0418* (2013.01); *H01M 10/46* (2013.01)

(58) Field of Classification Search
None
See application file for complete search history.

(56) References Cited

U.S. PATENT DOCUMENTS

| | | | | | |
|---|---|---|---|---|---|
| 5,990,660 | A | * | 11/1999 | Meissner | H01M 10/44 320/127 |
| 2005/0064278 | A1 | * | 3/2005 | Fetcenko | H01M 10/345 429/50 |
| 2006/0280977 | A1 | * | 12/2006 | Sakajo | H01M 8/04007 429/429 |
| 2012/0094152 | A1 | * | 4/2012 | Wu | H01M 10/052 429/50 |
| 2014/0291410 | A1 | * | 10/2014 | Uemura | G05D 23/1919 236/46 R |

(Continued)

FOREIGN PATENT DOCUMENTS

| | | |
|---|---|---|
| JP | 2002-298920 | 10/2002 |
| JP | 2012-243395 | 12/2012 |
| JP | 2014-067542 | 4/2014 |

(Continued)

*Primary Examiner* — Scott J. Chmielecki
(74) *Attorney, Agent, or Firm* — Greenblum & Bernstein, P.L.C.

(57) ABSTRACT

A battery includes a first insulator, a first electrode layer, and a first counter-electrode layer. The first counter-electrode layer is a counter electrode for the first electrode layer. The first insulator includes a first electrolyte portion, a second electrolyte portion, and a first bent portion. The first bent portion is positioned between the first electrolyte portion and the second electrolyte portion. The first electrode layer is disposed in contact with the first electrolyte portion. The first counter-electrode layer is disposed in contact with the second electrolyte portion. The first insulator is bent at the first bent portion, and thereby the first electrode layer and the first counter-electrode layer are positioned facing each other.

22 Claims, 57 Drawing Sheets

(56) References Cited

U.S. PATENT DOCUMENTS

2015/0142237 A1* 5/2015 Wu .................. B60L 1/003
                                                                                                  701/22
2016/0308195 A1* 10/2016 Mui .................. H01M 4/667

FOREIGN PATENT DOCUMENTS

| JP | 2014-130754 | 7/2014 |
| JP | 2014130754 A * | 7/2014 |

* cited by examiner

FIG. 1
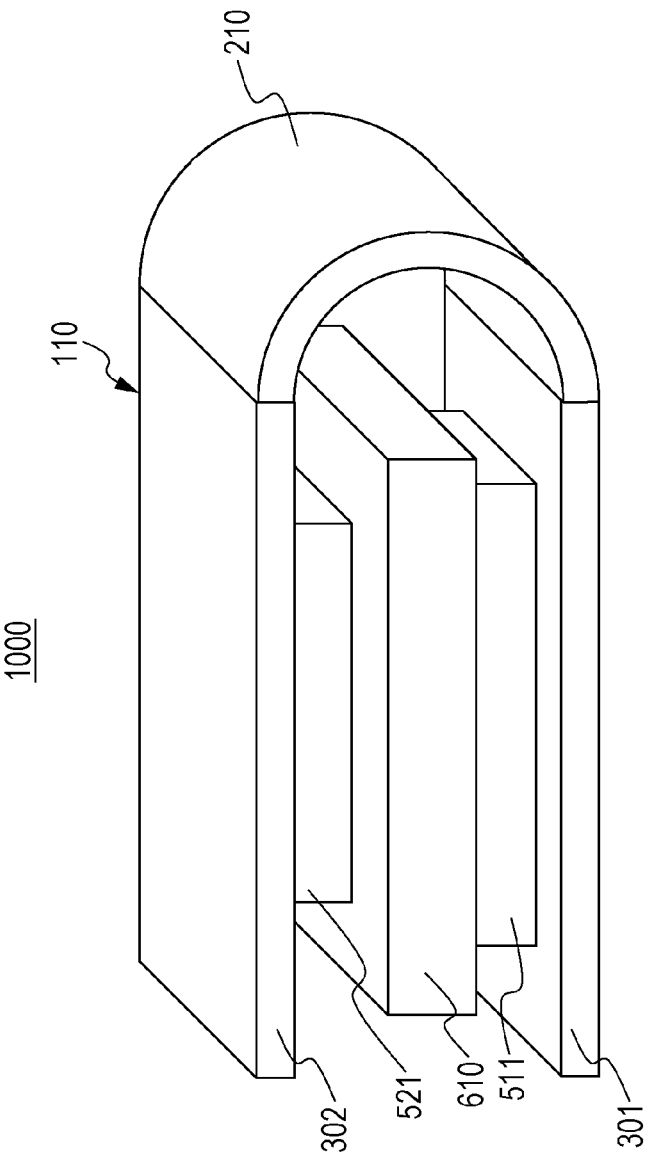
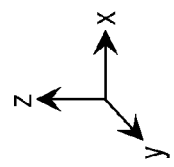

4100

FIG. 58
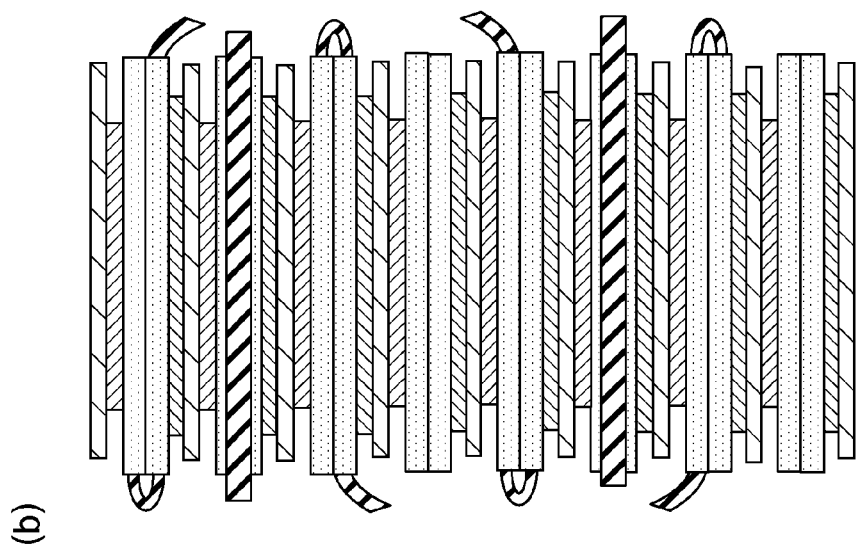
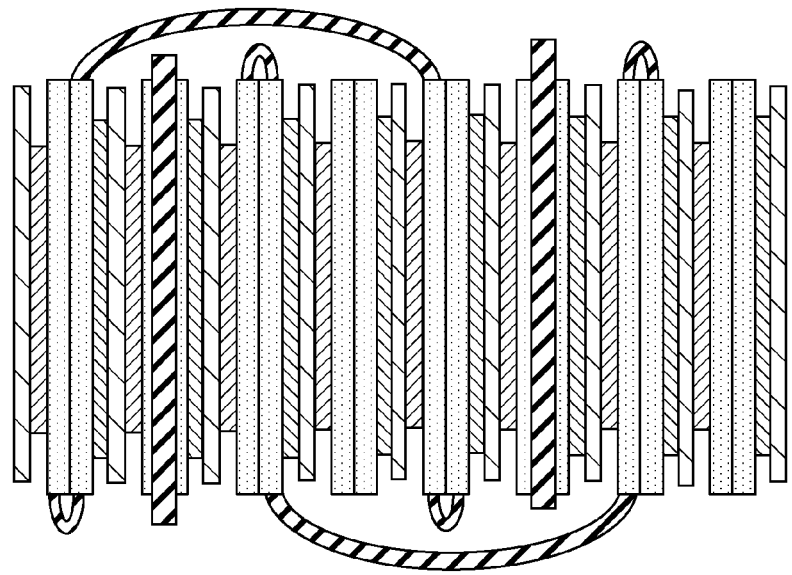

BATTERY

BACKGROUND

1. Technical Field

The present disclosure relates to a battery.

2. Description of the Related Art

Japanese Patent No. 5599366 discloses a method of manufacturing a solid assembled battery, the method including a step of crossing and alternately folding a strip-shaped positive-electrode current collector and a strip-shaped negative-electrode current collector.

Japanese Unexamined Patent Application Publication No. 2002-298920 discloses a battery element in which a negative-electrode active-material layer and a positive-electrode active-material layer are positioned facing each other with an electrolyte member therebetween and are bent at cutout portions.

Japanese Unexamined Patent Application Publication No. 2014-130754 discloses an all-solid-state battery formed by folding an insulating member in a zigzag pattern.

SUMMARY

One non-limiting and exemplary embodiment provides a battery in which bonding strength between the components of the battery is increased.

In one general aspect, the techniques disclosed here feature a battery including a first insulator, a first electrode layer, and a first counter-electrode layer. The first counter-electrode layer is a counter electrode for the first electrode layer. The first insulator includes a first electrolyte portion, a second electrolyte portion, and a first bent portion. The first bent portion is positioned between the first electrolyte portion and the second electrolyte portion. The first electrode layer is disposed in contact with the first electrolyte portion. The first counter-electrode layer is disposed in contact with the second electrolyte portion. The first insulator is bent at the first bent portion, and thereby the first electrode layer and the first counter-electrode layer are positioned facing each other.

With the present disclosure, it is possible to increase bonding strength between the components of a battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic perspective view of a battery according to a first embodiment;

FIG. 58 illustrates an example of removing of bent portions.

DETAILED DESCRIPTION

Hereinafter, embodiments will be described with reference to the drawings.

First Embodiment

FIG. 1 is a schematic perspective view of a battery 1000 according to a first embodiment.

Figure 2:
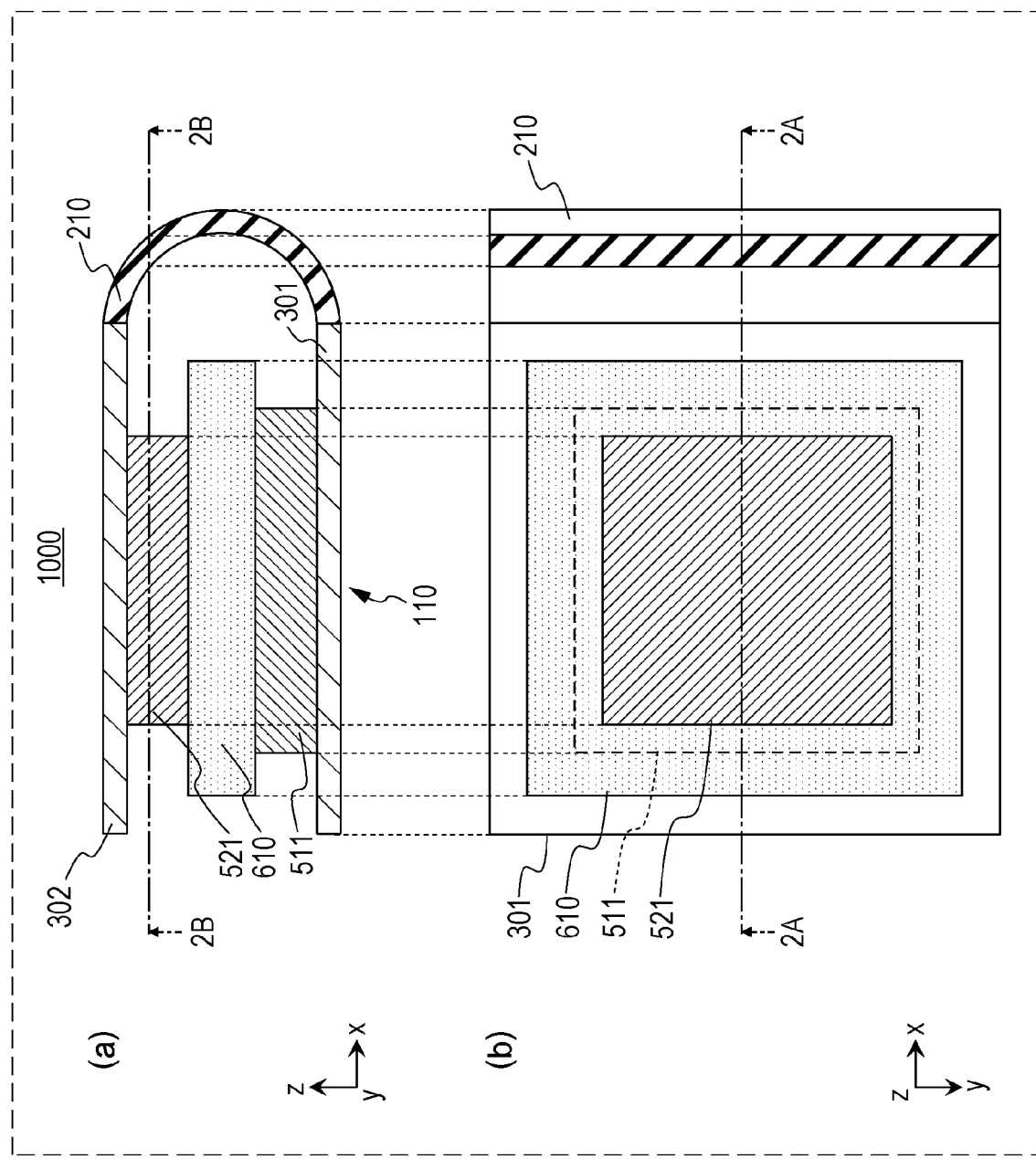
FIG. 2 schematically illustrates the battery according to the first embodiment.

FIG. 2 schematically illustrates the battery 1000 according to the first embodiment.

FIG. 2(a) is a schematic x-z view (sectional view taken along line 2A-2A) of the battery 1000 according to the first embodiment.

FIG. 2(b) is a schematic x-y view (sectional view taken along line 2B-2B) of the battery 1000 according to the first embodiment.

The battery 1000 according to the first embodiment includes a first insulator 110, a first electrode layer 511, and a first counter-electrode layer 521.

The first counter-electrode layer 521 is a counter electrode for the first electrode layer 511.

The first insulator 110 includes a first electrolyte portion 301, a second electrolyte portion 302, and a first bent portion 210.

The first bent portion 210 is positioned between the first electrolyte portion 301 and the second electrolyte portion 302.

The first electrode layer 511 is disposed in contact with the first electrolyte portion 301.

The first counter-electrode layer 521 is disposed in contact with the second electrolyte portion 302.

The first insulator 110 is bent at the first bent portion 210. Thus, the first electrode layer 511 and the first counter-electrode layer 521 are positioned facing each other.

With the structure described above, bonding strength between the components of the battery can be increased. That is, the first electrode layer 511 and the first counter-electrode layer 521 can be respectively disposed on the first electrolyte portion 301 and the second electrolyte portion 302, which are linked to each other by the first bent portion 210. Thus, the first bent portion 210 (in other words, the first insulator 110, which is a single component) can securely maintain the positional relationship between the first electrode layer 511, which is disposed on the first electrolyte portion 301, and the first counter-electrode layer 521, which is disposed on the second electrolyte portion 302. Thus, for example, it is possible to prevent displacement or separation of layers (or battery elements) of the battery, which may occur due to an impact, vibration, or the like when manufacturing or using the battery. That is, the first insulator 110 can increase the bonding strength between layers (such as the first electrode layer 511 and the first counter-electrode layer 521) of the battery. Thus, the reliability of the battery can be improved.

Moreover, with the structure described above, the first bent portion 210 can cover a side surface of the battery where the first bent portion 210 is positioned. Thus, the first bent portion 210 can prevent contact between a member that may exist outside the battery (such as another battery) and the side surface of the battery where the first bent portion 210 is positioned. Accordingly, a short circuit due to contact between batteries can be suppressed. Moreover, it is possible to suppress partial destruction of the side surface of the battery due to contact between the battery and a member that may exist outside the battery. Because the first bent portion 210 covers a part of the side surface of the battery, even if a part of a component of the battery (such as an electrode material included in the first electrode layer 511 or a counter-electrode material included in the first counter-electrode layer 521) crumbles and falls, the first bent portion 210 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

Figure 3:
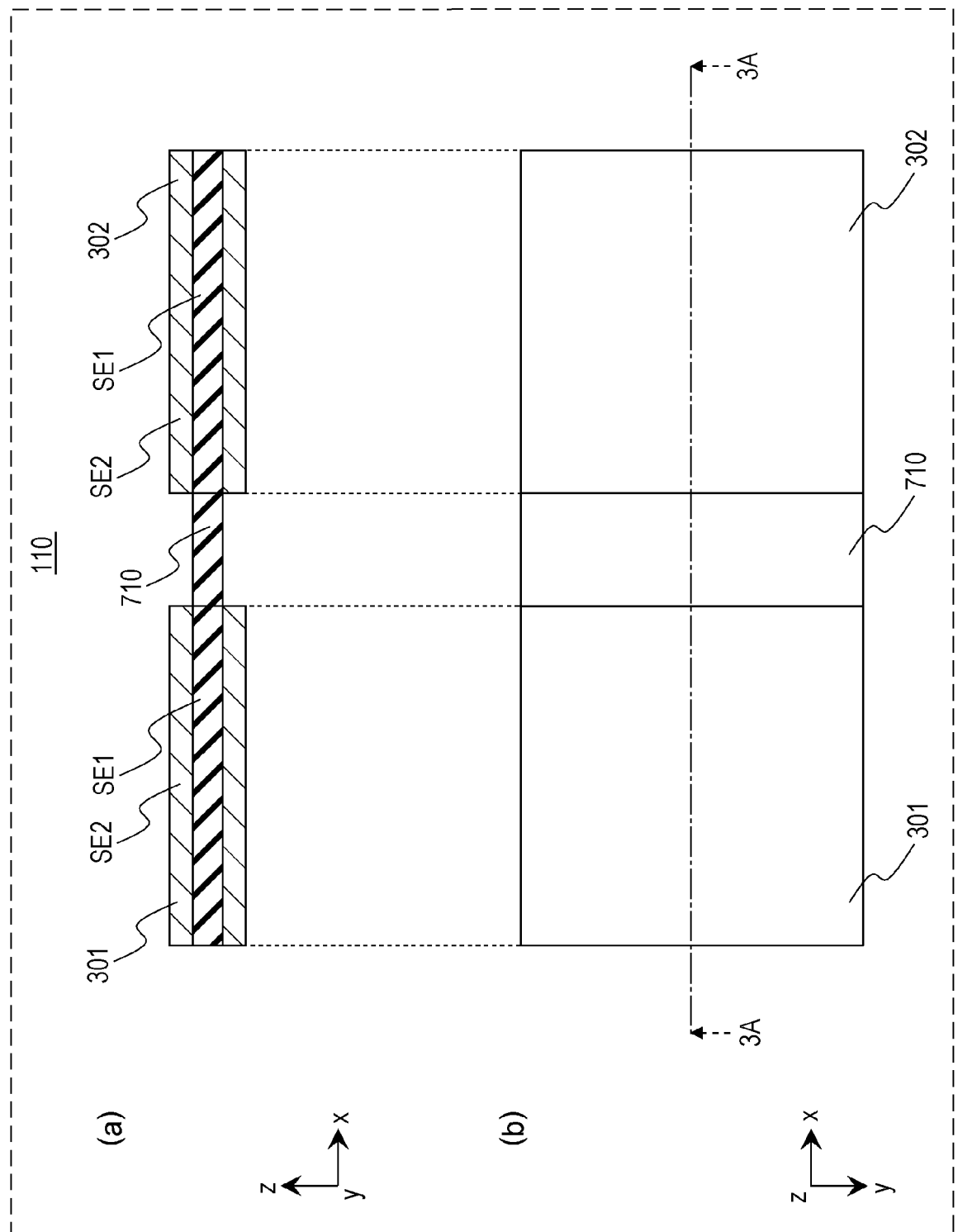
FIG. 3 schematically illustrates an example of a first insulator.

FIG. 3 schematically illustrates an example of the first insulator 110.

FIG. 3(a) is a schematic x-z view (sectional view taken along line 3A-3A) of the example of the first insulator 110.

FIG. 3(b) is a schematic x-y view (top view) of the example of the first insulator 110.

As illustrated in FIG. 3, for example, the first insulator 110 may be formed by providing the first electrolyte portion 301 and the second electrolyte portion 302 to an insulating base material (such as a substrate). The first insulator 110 may be formed as, for example, an elongated sheet-shaped member.

The base material of the first insulator 110 may be, for example, a sheet (such as a porous sheet, a non-woven cloth, or a mesh sheet) made of an insulating material (such as glass fiber, polypropylene, polyethylene, polytetrafluoroethylene, or paper).

The thickness of the base material of the first insulator 110 may be in the range of 1 to 100 µm or 1 to 30 µm.

The first electrolyte portion 301 and the second electrolyte portion 302 are formed by providing an electrolyte material to the base material. The base material may be, for example, a porous base material having a plurality of small holes. In this case, the first electrolyte portion 301 and the second electrolyte portion 302 may be formed by impregnating the plurality of small holes in the base material with an electrolyte material (portions SE1 in FIG. 3(b)).

As the electrolyte material of the first electrolyte portion 301 and the second electrolyte portion 302, a generally known electrolyte for a battery may be used. For example, the electrolyte material may be a solid electrolyte. As the solid electrolyte, a known solid electrolyte (such as an inorganic solid electrolyte) may be used. As the inorganic solid electrolyte, a sulfide solid electrolyte or an oxide solid electrolyte may be used. As the sulfide solid electrolyte, for example, a mixture of $Li_2S:P_2S_5$ may be used. The first electrolyte portion 301 and the second electrolyte portion 302 may contain a binder (such as polyvinylidene fluoride) in addition to the electrolyte material.

The thickness of each of the first electrolyte portion 301 and the second electrolyte portion 302 may be in the range of 5 to 150 µm or 5 to 50 µm.

The electrolyte material may be provided, not only in the small holes of the base material, but also on surfaces of the base material (for example, two main surfaces on the front and back sides of the base material) (portions SE2 in FIG. 3(a)). Thus, the electrolyte material can be exposed on the surfaces of the base material. Therefore, it is possible to enhance the function of the electrolyte material in transferring metal ions (such as lithium ions) between an electrode layer and a counter-electrode layer.

The first electrolyte portion 301 and the second electrolyte portion 302 may be disposed in an insular pattern with a predetermined distance therebetween. In this case, a portion of the base material positioned between the first electrolyte portion 301 and the second electrolyte portion 302 (a portion where an electrolyte material is not disposed) is a first bend region 710. The first bent portion 210 is formed by bending the first bend region 710.

As illustrated in FIG. 3, the first electrolyte portion 301 and the second electrolyte portion 302 may extend to end portions of the base material (the end portions of the first insulator 110). Thus, a larger amount of electrolyte material can be disposed in or on the base material.

Figure 4:
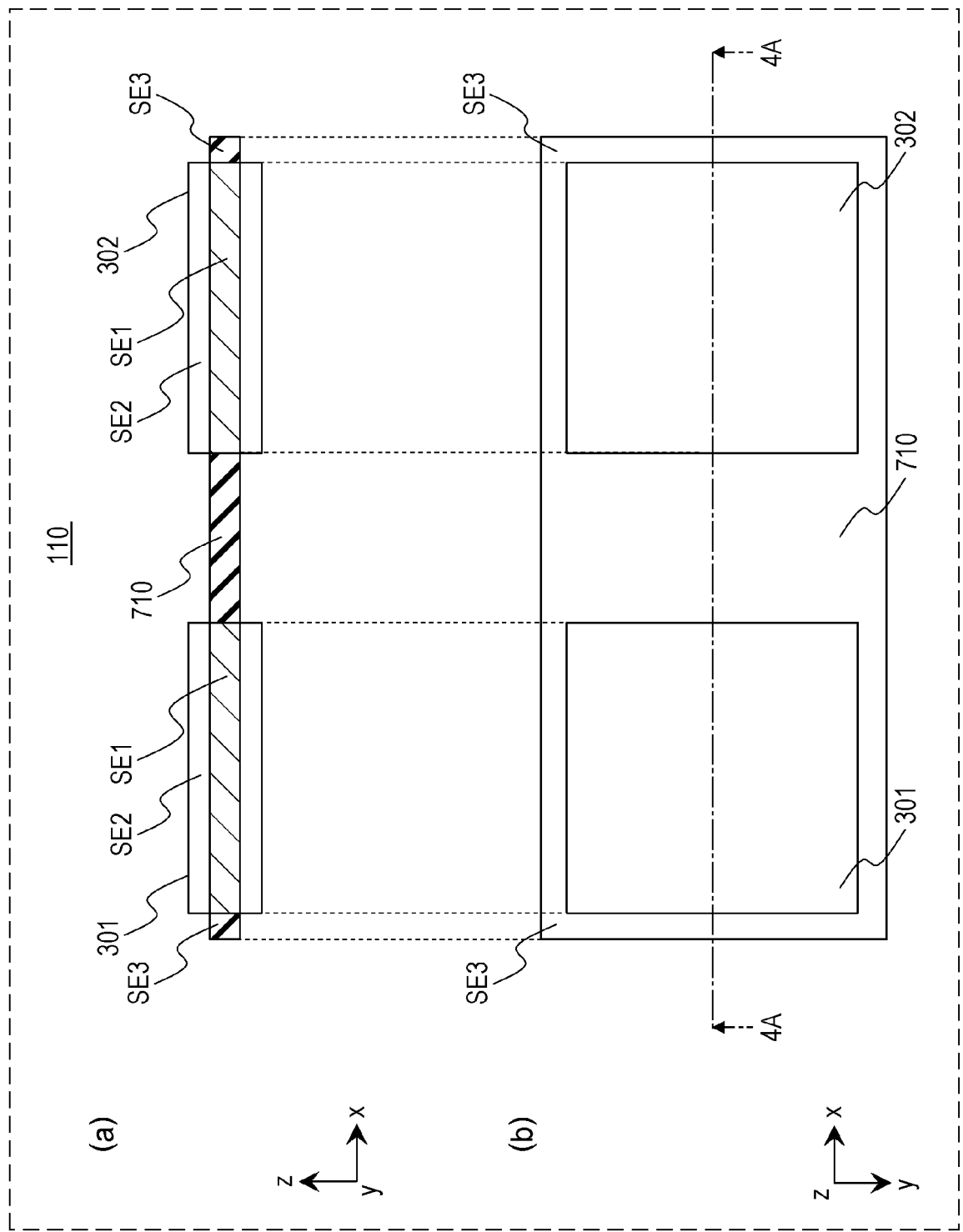
FIG. 4 schematically illustrates an example of the first insulator.

FIG. 4 schematically illustrates an example of the first insulator 110.

FIG. 4(a) is a schematic x-z view (sectional view taken along line 4A-4A) of the example of the first insulator 110.

FIG. 4(b) is a schematic x-y view (top view) of the example of the first insulator 110.

As illustrated in FIG. 4, the first electrolyte portion 301 and the second electrolyte portion 302 need not be provided at end portions of the base material. In other words, portions where the electrolyte material is not provided (portions SE3 in FIG. 4(a)) may be disposed at the end portions of the base material (the end portions of the first insulator 110).

With the structure described above, it is possible to suppress removal or crumbling/falling of the electrolyte material from the first electrolyte portion 301 or the second electrolyte portion 302, which may occur when a stress is applied to the end portions of the first insulator 110.

Moreover, with the structure described above, because electrolyte portions are not formed at the end portions of the base material (the end portions of the first insulator 110), even if a portion where the electrolyte material is not provided is bent, metal ions of the electrolyte material (such as lithium ions) are prevented from being transferred to a portion other than an electrode layer and a counter-electrode layer that are formed in contact with the electrolyte portion. For example, in the structure shown in FIG. 5 (described below), if a portion where the electrolyte material is not provided is disposed around the second electrolyte portion 302, direct contact between the second electrolyte portion 302 and a second counter-electrode layer 522 and a third electrolyte portion 303 (or the first electrode layer 511 and the first electrolyte portion 301) can be prevented. Thus, it is possible to prevent transfer of metal ions (such as lithium ions) of the electrolyte material of the second electrolyte portion 302 to the second counter-electrode layer 522 and the third electrolyte portion 303 (or the first electrode layer 511 and the first electrolyte portion 301).

The first electrolyte portion 301 and the second electrolyte portion 302 may be produced, for example, by applying a paste-like coating, in which the electrode material is mixed with a solvent, onto the base material and drying the coating. Alternatively, the first electrolyte portion 301 and the second electrolyte portion 302 may be produced by directly impregnating a porous base material with a powder-like electrolyte material or by using a gas-phase method (such as a vapor deposition process or a sputtering process).

As illustrated in FIGS. 1 and 2, the battery 1000 according to the first embodiment may further include a first current collector 610.

The first current collector 610 is disposed between the first electrode layer 511 and the first counter-electrode layer 521 and in contact with the first electrode layer 511 and the first counter-electrode layer 521.

With the structure described above, it is possible to stack a power generation element including the first electrode layer 511 and a power generation element including the first counter-electrode layer 521 in series via the first current collector 610.

Figure 5:
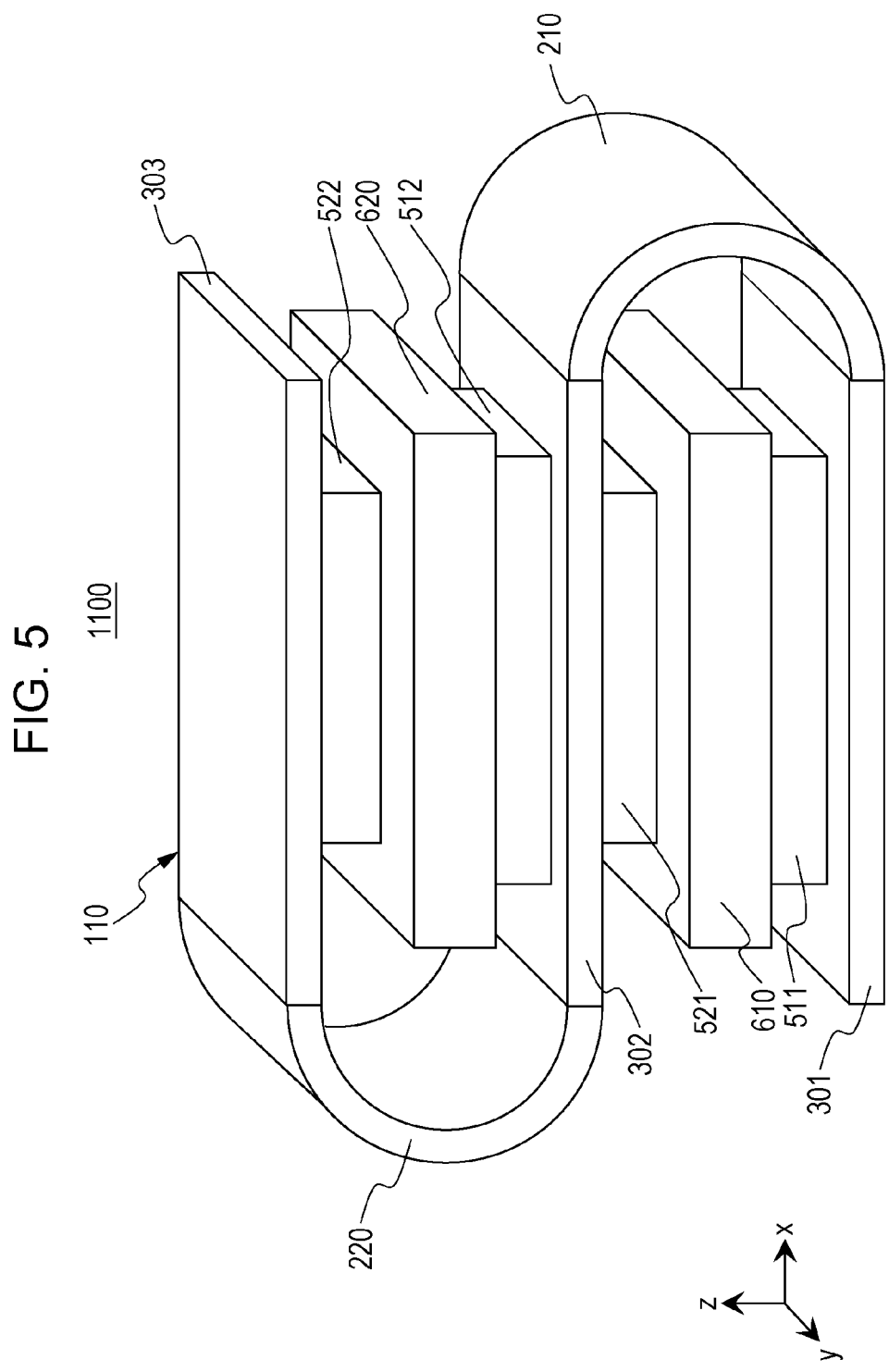
FIG. 5 is a schematic perspective view of a battery according to the first embodiment.

FIG. 5 is a schematic perspective view of a battery 1100 according to the first embodiment.

Figure 6:
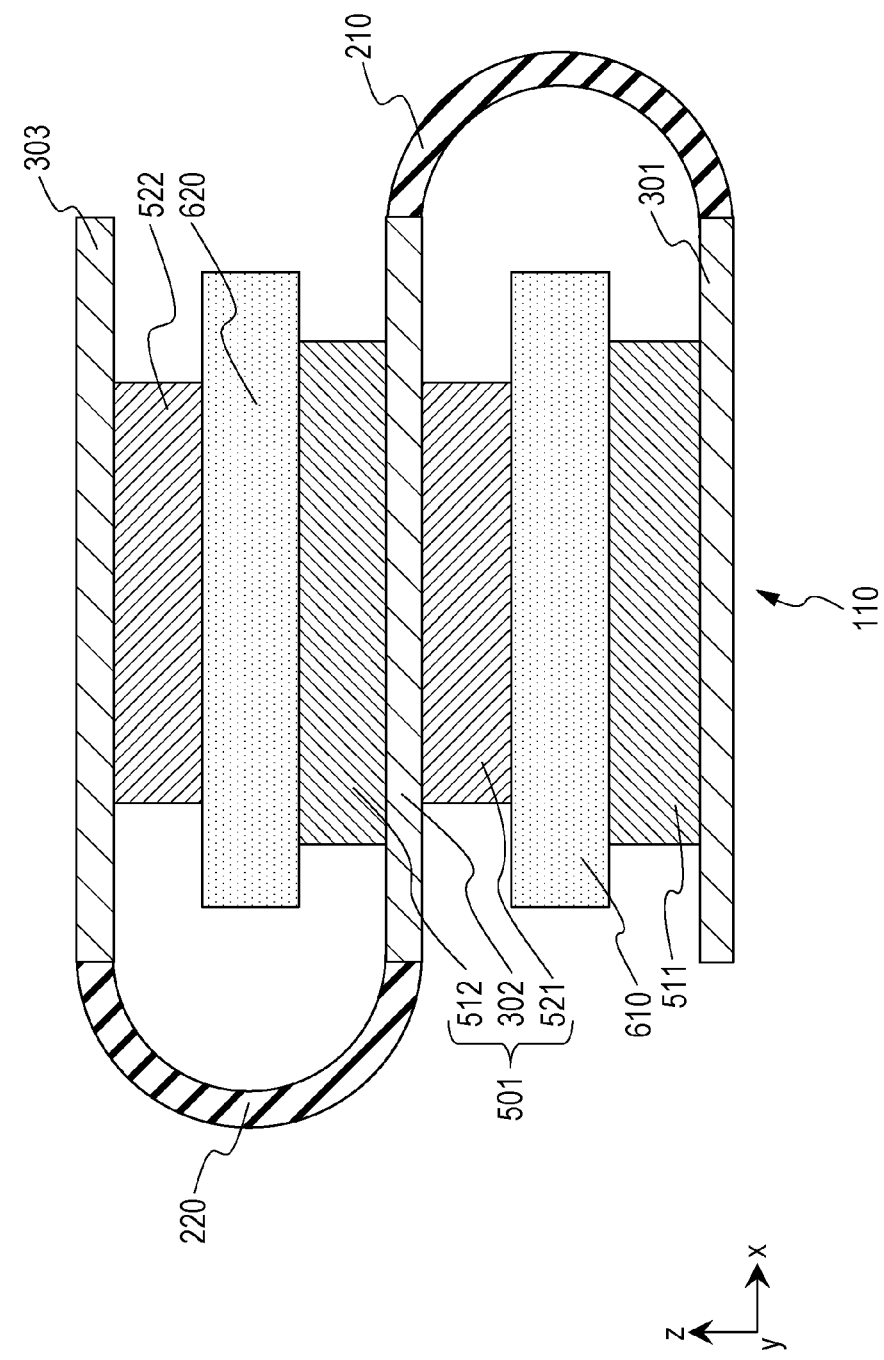
FIG. 6 is a schematic x-z view (sectional view) of the battery according to the first embodiment.

FIG. 6 is a schematic x-z view (sectional view) of the battery 1100 according to the first embodiment.

The battery 1100 according to the first embodiment further includes the following components, in addition to the components of the battery 1000 according to the first embodiment.

That is, in the battery 1100 according to the first embodiment, the first insulator 110 includes a third electrolyte portion 303 and a second bent portion 220.

The second bent portion 220 is positioned between the second electrolyte portion 302 and the third electrolyte portion 303.

The first insulator 110 is bent at the second bent portion 220. Thus, the second electrolyte portion 302 and the third electrolyte portion 303 are positioned facing each other.

With the structure described above, bonding strength between the components of the battery can be further increased. That is, an electrode layer and a counter-electrode layer can be respectively disposed on the second electrolyte portion 302 and the third electrolyte portion 303 (that is, two partial regions of the first insulator 110 that are linked to each other by the second bent portion 220). Thus, the second bent portion 220 (in other words, the first insulator 110, which is a single component) can securely maintain the positional relationship between the electrode layer and the counter-electrode layer, which are respectively disposed on the second electrolyte portion 302 and the third electrolyte portion 303. Accordingly, for example, when forming a stacked battery by using the first insulator 110, the first insulator 110 can securely link two battery cells (battery elements) of the battery to each other. Thus, for example, it is possible to prevent displacement or separation of layers (or battery elements) of the battery, which may occur due to an impact, vibration, or the like when manufacturing or using the battery. That is, the first insulator 110 can increase the bonding strength between layers (or battery elements) of the battery. Thus, the reliability of the battery can be improved.

As illustrated in FIGS. 5 and 6, the battery 1100 according to the first embodiment may further include a second electrode layer 512 and a second counter-electrode layer 522.

The second counter-electrode layer 522 is a counter electrode for the first electrode layer 511 and the second electrode layer 512.

The second electrode layer 512 is disposed in contact with the second electrolyte portion 302.

The second counter-electrode layer 522 is disposed in contact with the third electrolyte portion 303.

The first insulator 110 is bent at the second bent portion 220. Thus, the second electrode layer 512 and the second counter-electrode layer 522 are positioned facing each other.

With the structure described above, bonding strength between the components of the battery can be further increased. That is, the second electrode layer 512 and the second counter-electrode layer 522 can be respectively disposed on the second electrolyte portion 302 and the third electrolyte portion 303, which are linked to each other by the second bent portion 220. Thus, the second bent portion 220 (in other words, the first insulator 110, which is a single component) can securely maintain the positional relationship between the second electrode layer 512, which is disposed on the second electrolyte portion 302, and the second counter-electrode layer 522, which is disposed on the third electrolyte portion 303. Thus, for example, it is possible to prevent displacement or separation of layers (such as the second electrode layer 512 and the second counter-electrode layer 522) of the battery, which may occur due to an impact, vibration, or the like when manufacturing or using the battery.

Moreover, with the structure described above, the second bent portion 220 can cover a side surface of the battery where the second bent portion 220 is positioned. Thus, the second bent portion 220 can prevent contact between a member that may exist outside the battery (such as another battery) and the side surface of the battery where the second bent portion 220 is positioned. Accordingly, a short circuit due to contact between batteries can be suppressed. Moreover, it is possible to suppress partial destruction of the side surface of the battery due to contact between the battery and a member that may exist outside the battery. Because the second bent portion 220 covers a part of the side surface of the battery, even if a part of a component of the battery (such as an electrode material included in the second electrode layer 512 or a counter-electrode material included in the second counter-electrode layer 522) crumbles and falls, the second bent portion 220 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

As illustrated in FIGS. 5 and 6, the battery 1100 according to the first embodiment may further include a second current collector 620.

The second current collector 620 is disposed between the second electrode layer 512 and the second counter-electrode layer 522 and in contact with the second electrode layer 512 and the second counter-electrode layer 522.

With the structure described above, it is possible to stack a power generation element including the second electrode layer 512 and the first counter-electrode layer 521 (a first power generation element 501) and another power generation element (such as a power generation element including the first electrode layer 511 or the second counter-electrode layer 522) in series via the first current collector 610 and the second current collector 620.

Figure 7:
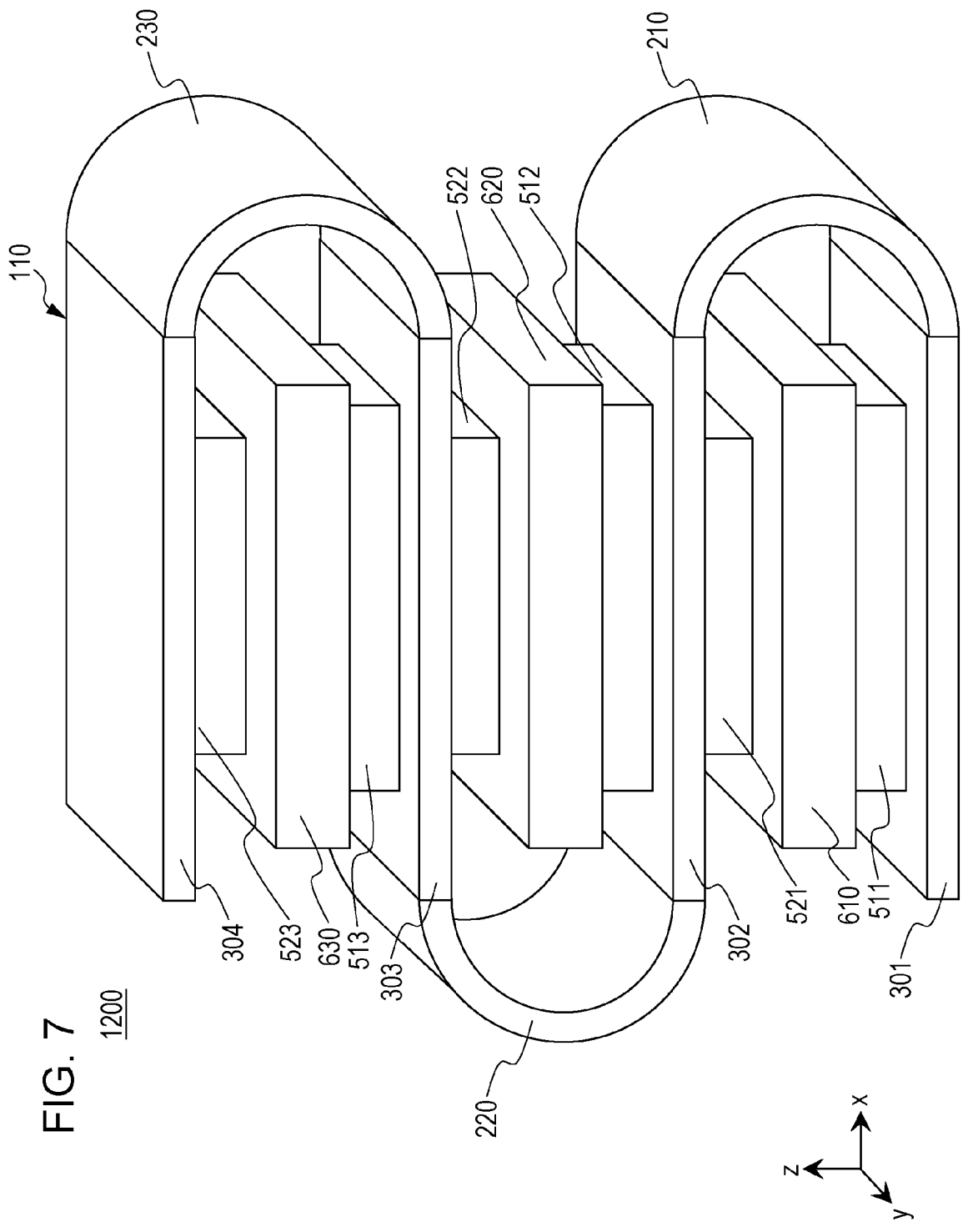
FIG. 7 is a schematic perspective view of a battery according to the first embodiment.

FIG. 7 is a schematic perspective view of a battery 1200 according to the first embodiment.

Figure 8:
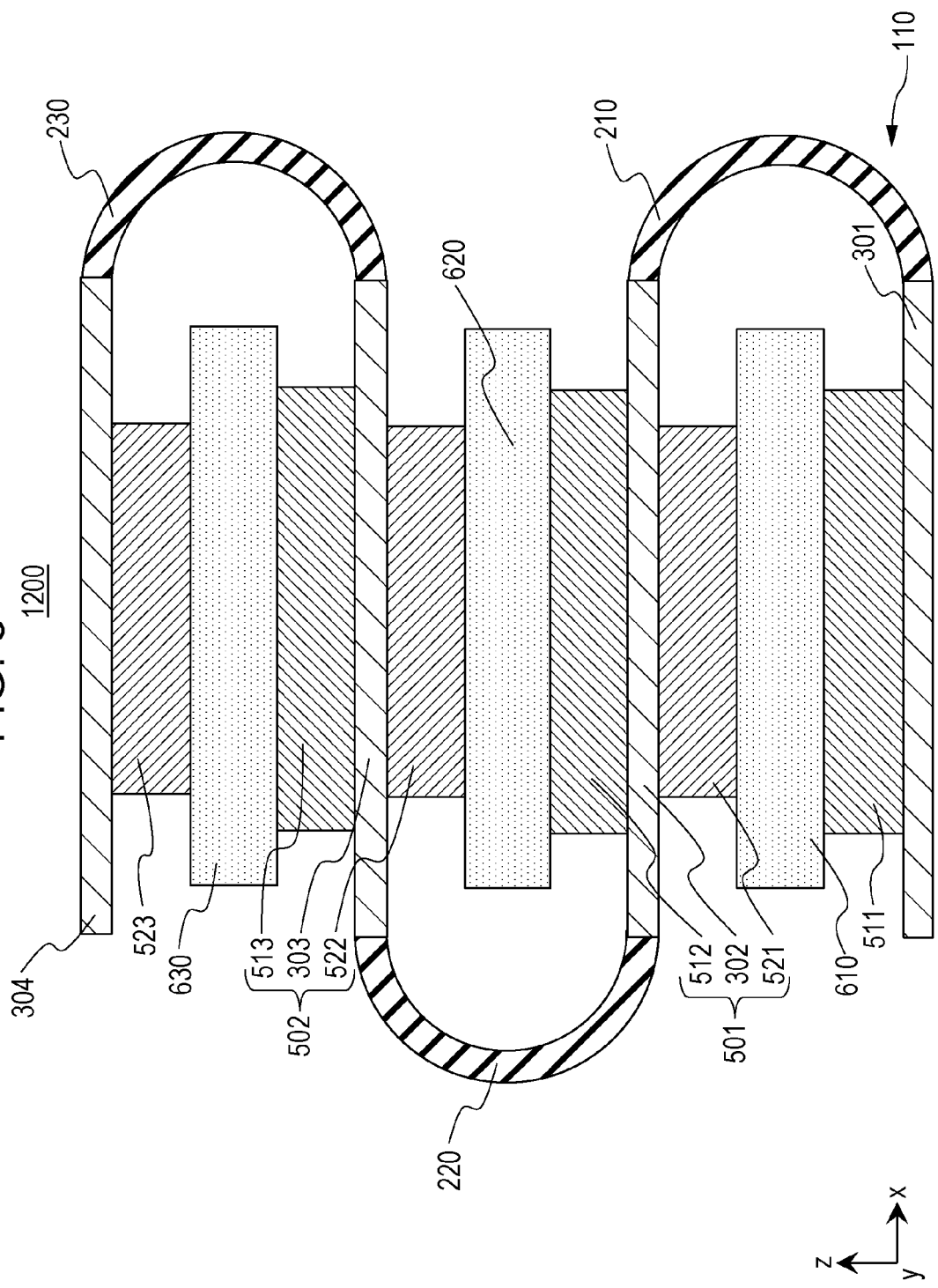
FIG. 8 is a schematic x-z view (sectional view) of the battery according to the first embodiment.

FIG. 8 is a schematic x-z view (sectional view) of the battery 1200 according to the first embodiment.

The battery 1200 according to the first embodiment further includes the following components, in addition to the components of the battery 1100 according to the first embodiment.

That is, the battery 1200 according to the first embodiment further includes a third electrode layer 513 and a third counter-electrode layer 523.

The third counter-electrode layer 523 is a counter electrode for the first electrode layer 511, the second electrode layer 512, and the third electrode layer 513.

The first insulator 110 includes a fourth electrolyte portion 304 and a third bent portion 230.

The third bent portion 230 is positioned between the third electrolyte portion 303 and the fourth electrolyte portion 304.

The third electrode layer 513 is disposed in contact with the third electrolyte portion 303.

The third counter-electrode layer 523 is disposed in contact with the fourth electrolyte portion 304.

The first insulator 110 is bent at the third bent portion 230. Thus, the third electrode layer 513 and the third counter-electrode layer 523 are positioned facing each other.

With the structure described above, bonding strength between the components of the battery can be further increased. That is, the third electrode layer 513 and the third counter-electrode layer 523 can be respectively disposed on the third electrolyte portion 303 and the fourth electrolyte portion 304, which are linked to each other by the third bent portion 230. Thus, the third bent portion 230 (in other words, the first insulator 110, which is a single component) can securely maintain the positional relationship between the third electrode layer 513, which is disposed on the third electrolyte portion 303, and the third counter-electrode layer 523, which is disposed on the fourth electrolyte portion 304. Thus, for example, it is possible to prevent displacement or separation of layers (such as the third electrode layer 513 and the third counter-electrode layer 523) of the battery, which may occur due to an impact, vibration, or the like when manufacturing or using the battery.

Moreover, with the structure described above, the third bent portion 230 can cover a side surface of the battery where the third bent portion 230 is positioned. Thus, the third bent portion 230 can prevent contact between a member that may exist outside the battery (such as another battery) and the side surface of the battery where the third bent portion 230 is positioned. Accordingly, a short circuit due to contact between batteries can be suppressed. Moreover, it is possible to suppress partial destruction of the side surface of the battery due to contact between the battery and a member that may exist outside the battery. Because the third bent portion 230 covers a part of the side surface of the battery, even if a part of a component of the battery (such as an electrode material included in the third electrode layer 513 or a counter-electrode material included in the third counter-electrode layer 523) crumbles and falls, the third bent portion 230 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

As illustrated in FIGS. 7 and 8, the battery 1200 according to the first embodiment may further include a third current collector 630.

The third current collector 630 is disposed between the third electrode layer 513 and the third counter-electrode layer 523 and in contact with the third electrode layer 513 and the third counter-electrode layer 523.

With the structure described above, it is possible to form a stacked battery by using the first insulator 110. That is, it is possible to stack a first power generation element 501, which includes the second electrode layer 512 and the first counter-electrode layer 521, and a second power generation element 502, which includes the third electrode layer 513 and the second counter-electrode layer 522, in series via the second current collector 620. That is, it is possible to increase the voltage of the battery by connecting the first power generation element 501 and the second power generation element 502 in series, while the bent portions of the first insulator 110 securely maintain the positional relationship between the first power generation element 501 and the second power generation element 502.

The third electrolyte portion 303 and the fourth electrolyte portion 304 are formed by providing an electrolyte material to the base material. The first electrolyte portion 301, the second electrolyte portion 302, the third electrolyte portion 303, and the fourth electrolyte portion 304 may have the same characteristics (such as thickness, area, shape, and materials) or may have different characteristics.

The second electrolyte portion 302 and the third electrolyte portion 303 may be disposed in an insular pattern with a predetermined distance therebetween. In this case, a portion of the base material positioned between the second electrolyte portion 302 and the third electrolyte portion 303 (a portion where an electrolyte material is not disposed) is a second bend region 720. The second bent portion 220 is formed by bending the second bend region 720.

The third electrolyte portion 303 and the fourth electrolyte portion 304 may be disposed in an insular pattern with a predetermined distance therebetween. In this case, a portion of the base material positioned between the third electrolyte portion 303 and the fourth electrolyte portion 304 (a portion where an electrolyte material is not disposed) is a third bend region 730. The third bent portion 230 is formed by bending the third bend region 730.

The first bent portion 210, the second bent portion 220, and the third bent portion 230 may have the same characteristics (such as thickness, area, shape, and materials) or may have different characteristics.

The first current collector 610, the second current collector 620, and the third current collector 630 are conductive members. The first current collector 610, the second current collector 620, and the third current collector 630 may be, for example, conductive thin films. As the material of the first current collector 610, the second current collector 620, and the third current collector 630, for example, a metal (SUS, Al, Cu, or the like) may be used. In each of the first current collector 610, the second current collector 620, and the third current collector 630, the material of a main surface on which an electrode layer is disposed may differ from the material of a main surface on which a counter-electrode layer is disposed. That is, multilayer metal foil may be used as the first current collector 610, the second current collector 620, and the third current collector 630. Thus, it is possible to achieve both of increase in reliability and reduction in weight of the solid battery. A current collector layer (such as a layer containing a conductive material) may be disposed at a portion in contact with an electrode layer or a counter-electrode layer. The thickness of each of the first current collector 610, the second current collector 620, and the third current collector 630 is, for example, in the range of 5 to 100 µm.

The first power generation element 501 and the second power generation element 502 are each, for example, a power generation unit having charging and discharging properties (such as a secondary battery). For example, the first power generation element 501 and the second power generation element 502 each may be an electric cell.

The second electrolyte portion 302 and the third electrolyte portion 303 each may include a solid electrolyte. That is, the first power generation element 501 and the second power generation element 502 each may be an all-solid-state battery.

The first electrode layer 511, the second electrode layer 512, and the third electrode layer 513 are each a layer containing an electrode material (such as an active material).

The first counter-electrode layer 521, the second counter-electrode layer 522, and the third counter-electrode layer 523 are each a layer containing a counter-electrode material (such as an active material). The counter-electrode material is a material that forms a counter electrode for an electrode material.

As illustrated in FIGS. 7 and 8, the first electrode layer 511, the second electrode layer 512, and the third electrode layer 513 each may be formed in an area that is smaller than a corresponding one of the first current collector 610, the second current collector 620, and the third current collector 630.

As illustrated in FIGS. 7 and 8, the first counter-electrode layer 521, the second counter-electrode layer 522, and the third counter-electrode layer 523 each may be formed in an area that is smaller than a corresponding one of the first current collector 610, the second current collector 620, and the third current collector 630.

As illustrated in FIGS. 7 and 8, the first electrolyte portion 301, the second electrolyte portion 302, the third electrolyte portion 303, and the fourth electrolyte portion 304 each may be formed in an area that is larger than a corresponding one of the first electrode layer 511, the second electrode layer 512, and the third electrode layer 513 and is larger than a corresponding one of the first counter-electrode layer 521, the second counter-electrode layer 522, and the third counter-electrode layer 523. Thus, a short circuit due to direct contact between an electrode layer and a counter-electrode layer can be prevented.

As illustrated in FIGS. 7 and 8, the second electrolyte portion 302 may be disposed in an area larger than each of the first current collector 610 and the second current collector 620. Thus, the second electrolyte portion 302 can prevent a short circuit between the first current collector 610 and the second current collector 620.

As illustrated in FIGS. 7 and 8, the third electrolyte portion 303 may be disposed in an area larger than each of the second current collector 620 and the third current collector 630. Thus, the third electrolyte portion 303 can prevent a short circuit between the second current collector 620 and the third current collector 630.

The second electrolyte portion 302 and the third electrolyte portion 303 each may be formed in an area that has the same size as an area in which a corresponding one of the first current collector 610, the second current collector 620, and the third current collector 630 is formed. Alternatively, the second electrolyte portion 302 and the third electrolyte portion 303 each may be formed in an area that is smaller than an area in a corresponding one of the first current collector 610, the second current collector 620, and the third current collector 630 is each formed.

The first electrode layer 511, the second electrode layer 512, and the third electrode layer 513 each may be a negative-electrode active-material layer. In this case, the electrode material is a negative-electrode active material. The first current collector 610, the second current collector 620, and the third current collector 630 are each a bipolar current collector (that is, a current collector that has a main surface in contact with a positive electrode layer and a main surface in contact with a negative electrode layer). The first counter-electrode layer 521, the second counter-electrode layer 522, and the third counter-electrode layer 523 are each a positive-electrode active-material layer. The counter-electrode material is a positive-electrode active material. In this case, a positive-electrode active-material layer may be disposed in contact with the first electrolyte portion 301 (for example, on one of the main surfaces of the first electrolyte portion 301 on which the first electrode layer 511 is not disposed). Moreover, a positive-electrode current collector may be disposed in contact with the positive-electrode active-material layer. A negative-electrode active-material layer may be disposed in contact with the fourth electrolyte portion 304 (for example, on one of the main surfaces of the fourth electrolyte portion 304 on which the third counter-electrode layer 523 is not disposed). Moreover, a negative-electrode current collector may be disposed in contact with the negative-electrode active-material layer.

Alternatively, the first electrode layer 511, the second electrode layer 512, and the third electrode layer 513 each may be a positive-electrode active-material layer. In this case, the electrode material is a positive-electrode active material. The first current collector 610, the second current collector 620, and the third current collector 630 are each a bipolar current collector. The first counter-electrode layer 521, the second counter-electrode layer 522, and the third counter-electrode layer 523 are each a negative-electrode active-material layer. The counter-electrode material is a negative-electrode active material. In this case, a negative-electrode active-material layer may be disposed in contact with the first electrolyte portion 301 (for example, on one of the main surfaces of the first electrolyte portion 301 on which the first electrode layer 511 is not disposed). Moreover, a negative-electrode current collector may be disposed in contact with the negative-electrode active-material layer. A positive-electrode active-material layer may be disposed in contact with the fourth electrolyte portion 304 (for example, on one of the main surfaces of the fourth electrolyte portion 304 on which the third counter-electrode layer 523 is not disposed). Moreover, a positive-electrode current collector may be disposed in contact with the positive-electrode active-material layer.

As the positive-electrode active material included in the positive-electrode active-material layer, a known positive-electrode active material (such as lithium cobalt oxide or LiNO) may be used. As the positive-electrode active material, any appropriate material that can release and absorb ions of Li, Mg, or the like may be used.

As a material included in the positive-electrode active-material layer, a known solid electrolyte (such as an inorganic solid electrolyte) may be used. As the inorganic solid electrolyte, a sulfide solid electrolyte, an oxide solid electrolyte, or the like may be used. As the sulfide solid electrolyte, for example, a mixture of $Li_2S:P_2S_5$ may be used. The surface of the positive-electrode active material may be coated with a solid electrolyte. As a material included in the positive-electrode active-material layer, a conductive material (such as acetylene black), a binder (such as polyvinylidene fluoride), or the like may be used.

The positive-electrode active-material layer may be produced by applying a paste-like coating, in which the materials of the positive-electrode active-material layer are mixed with a solvent, onto the surface of the positive-electrode current collector and by drying the coating. After being dried, the positive-electrode active-material layer may be pressed in order to increase the density of the layer. The thickness of the positive-electrode active-material layer, which is produced as described above, is, for example, in the range of 5 to 300 μm.

As the positive-electrode current collector, metal foil (such as SUS foil or Al foil) may be used.

As the negative-electrode active material included in the negative-electrode active-material layer, a known negative-electrode active material (such as graphite) may be used. As the negative-electrode active material, any appropriate material that can release and absorb ions of Li, Mg, or the like may be used.

As a material included in the negative-electrode active-material layer, a known solid electrolyte (such as an inorganic solid electrolyte) may be used. As the inorganic solid electrolyte, a sulfide solid electrolyte, an oxide solid electrolyte, or the like may be used. As the sulfide solid electrolyte, for example, a mixture of $Li_2S:P_2S_5$ may be used. As a material included in the negative-electrode active-material layer, a conductive material (such as acetylene black), a binder (such as polyvinylidene fluoride), or the like may be used.

The negative-electrode active-material layer may be produced by applying a paste-like coating, in which the materials of the negative-electrode active-material layer are mixed with a solvent, onto the surface of the negative-electrode current collector and by drying the coating. The negative-electrode plate may be pressed in order to increase the density of the layer. The thickness of the negative-electrode active-material layer produced as described above is, for example, in the range of 5 to 300 μm.

As the negative-electrode current collector, metal foil (such as SUS foil or Al foil) may be used.

The positive-electrode active-material layer may be formed in an area that has the same size as an area in which the negative-electrode active-material layer is formed. Alternatively, the negative-electrode active-material layer may be formed in an area larger than an area in which the positive-electrode active-material layer is formed. Thus, for example, it is possible to prevent decrease of the reliability of the battery due to lithium precipitation (or magnesium precipitation).

Figure 9:
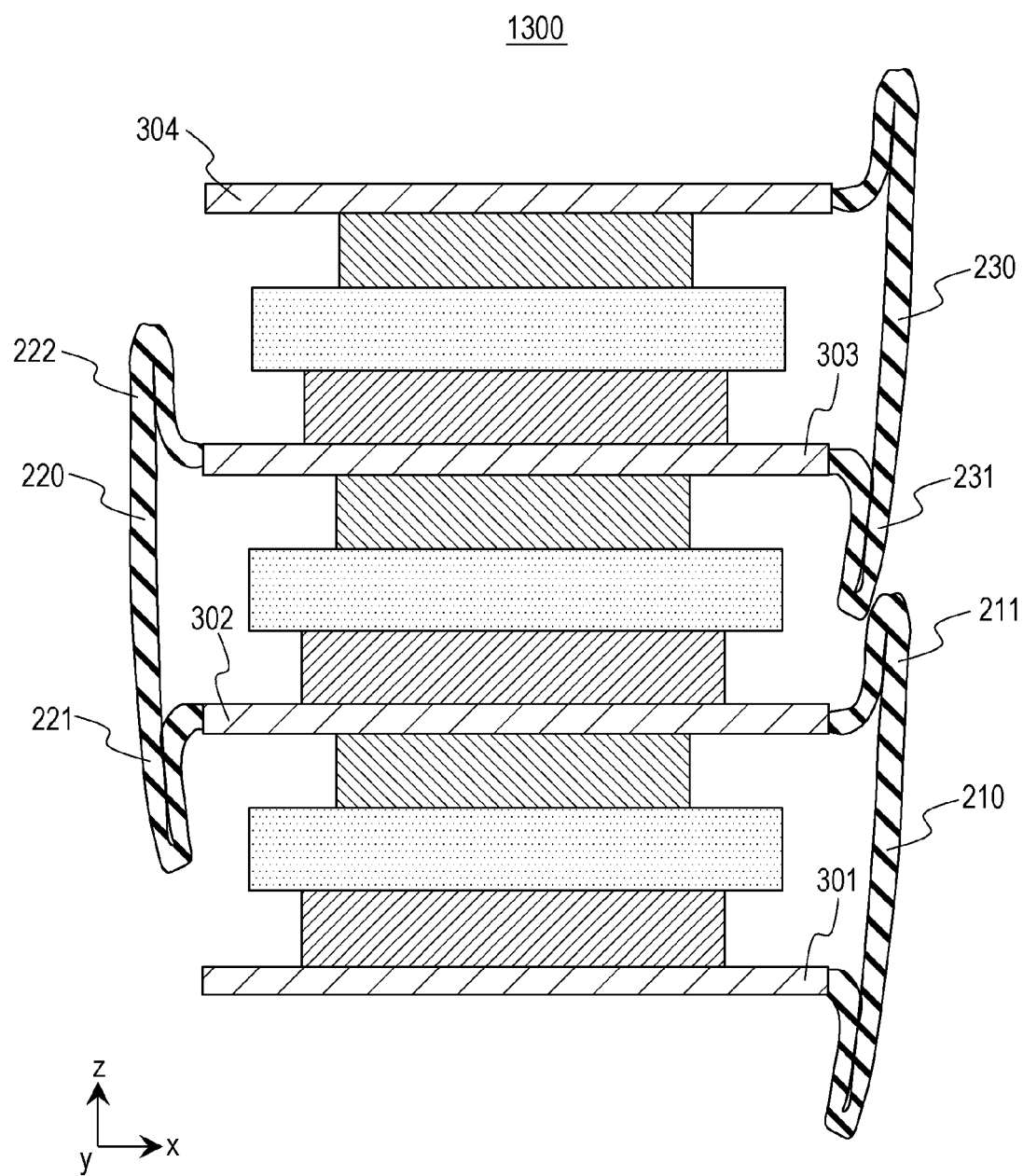
FIG. 9 is a schematic x-z view (sectional view) of a battery according to the first embodiment.

FIG. 9 is a schematic x-z view (sectional view) of a battery 1300 according to the first embodiment.

Figure 10:
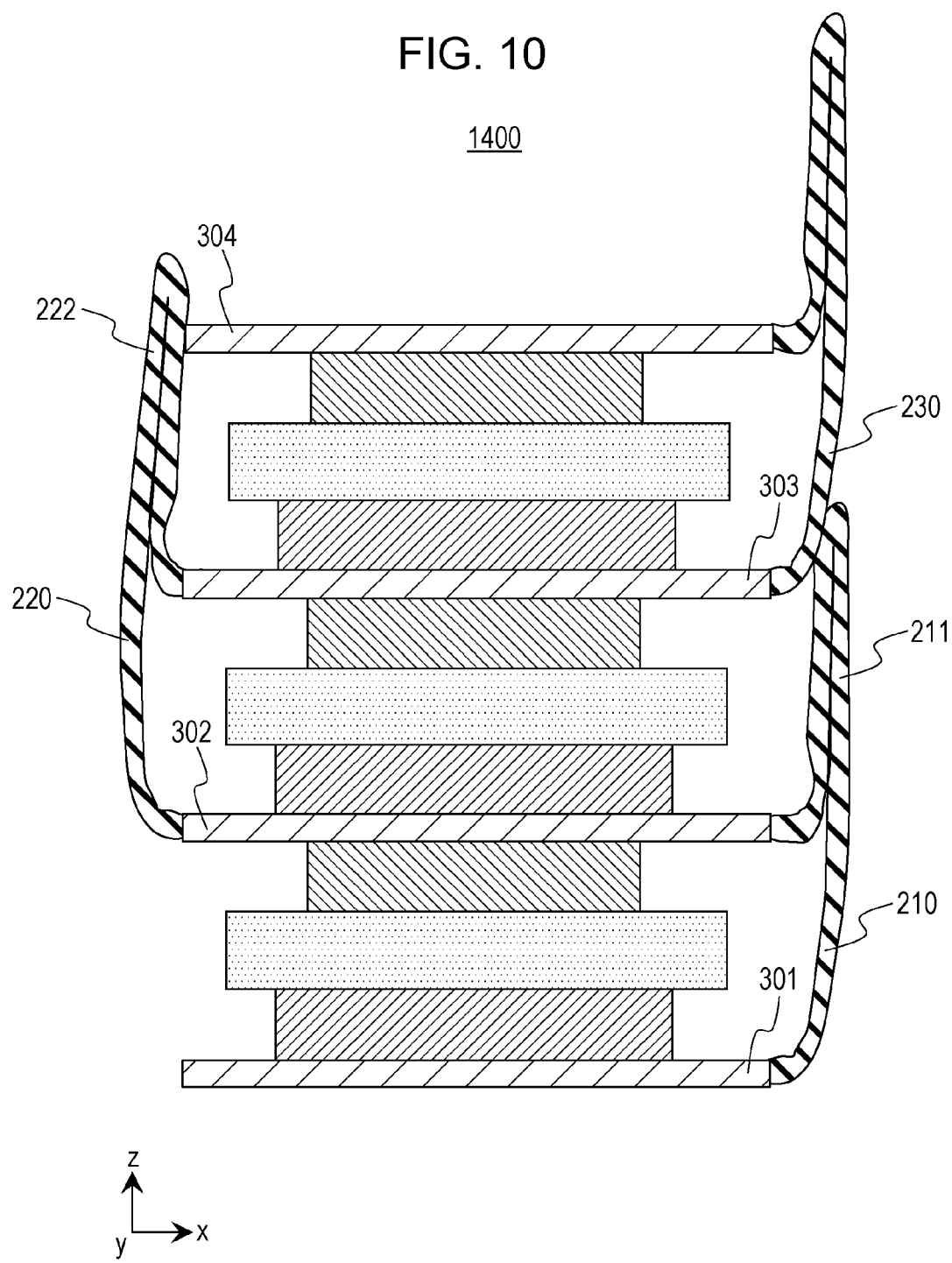
FIG. 10 is a schematic x-z view (sectional view) of a battery according to the first embodiment.

FIG. 10 is a schematic x-z view (sectional view) of a battery 1400 according to the first embodiment.

Figure 11:
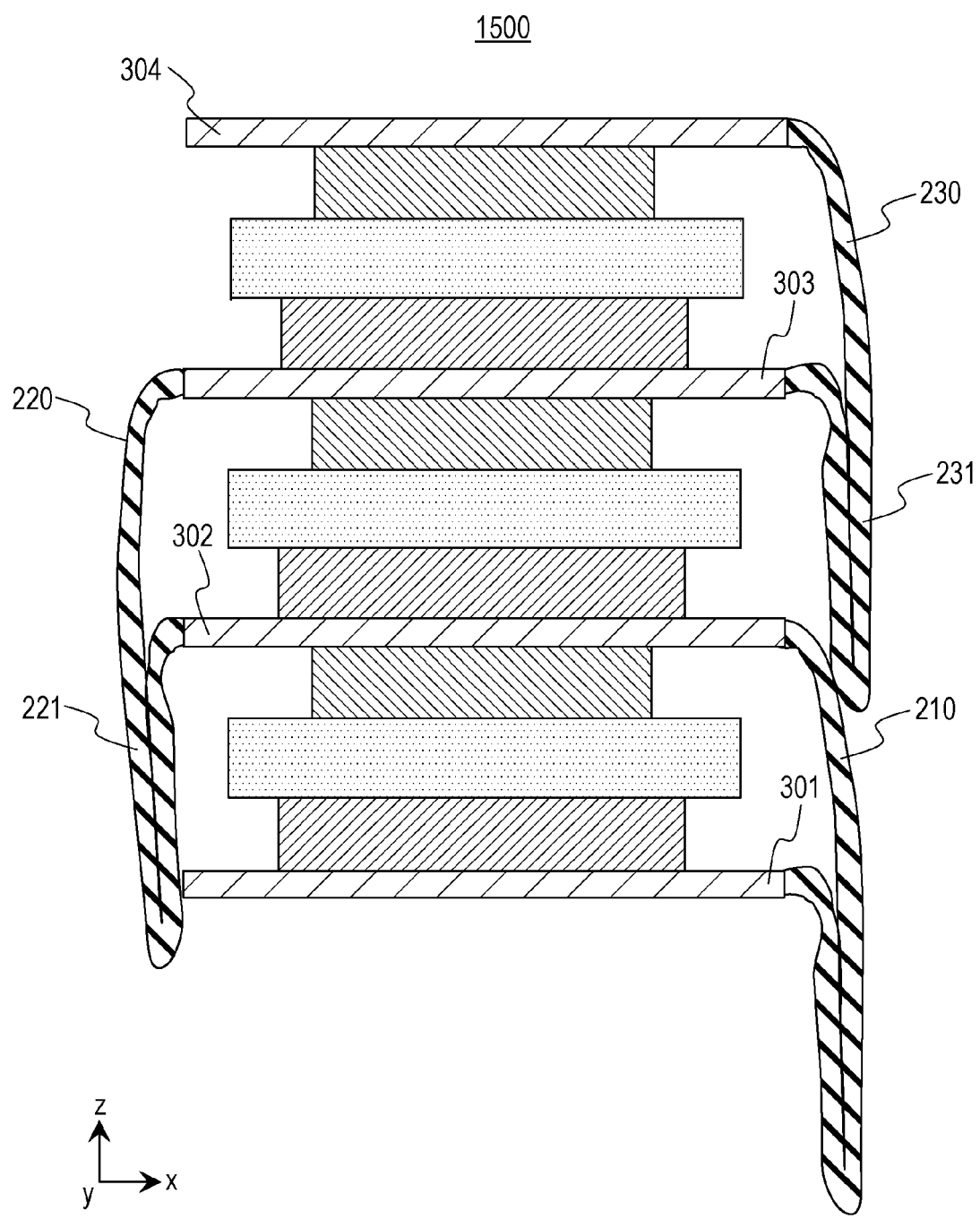
FIG. 11 is a schematic x-z view (sectional view) of a battery according to the first embodiment.

FIG. 11 is a schematic x-z view (sectional view) of a battery 1500 according to the first embodiment.

The first bent portion 210 may include a first protruding portion 211.

As illustrated in FIGS. 9 and 10, the first protruding portion 211 is a portion (of the first bent portion 210) that protrudes beyond the second electrolyte portion 302 toward a side on which the second electrode layer 512 is disposed.

With the structure described above, while the first bent portion 210 covers side surfaces of components (such as the first electrode layer 511, the first counter-electrode layer 521, and the first current collector 610) that are interposed between the first electrolyte portion 301 and the second electrolyte portion 302, the first protruding portion 211 of the first bent portion 210 can cover side surfaces of components (such as the second electrode layer 512, the second counter-electrode layer 522, and the second current collector 620) that are positioned beyond the second electrolyte portion 302 toward the side on which the second electrode layer 512 is disposed. Thus, the first bent portion 210 can prevent contact between a member that may exist outside the battery (such as another battery) and the side surfaces of the components that are interposed between the first electrolyte portion 301 and the second electrolyte portion 302 and the side surfaces of the components that are positioned beyond the second electrolyte portion 302 toward the side on which the second electrode layer 512 is disposed.

The second bent portion 220 may include at least one of a second protruding portion 221 and a second protruding portion 222.

As illustrated in FIGS. 9 and 11, the second protruding portion 221 is a portion (of the second bent portion 220) that protrudes beyond the second electrolyte portion 302 toward a side on which the first counter-electrode layer 521 is disposed.

With the structure described above, while the second bent portion 220 covers side surfaces of components (such as the second electrode layer 512, the second counter-electrode layer 522, and the second current collector 620) that are interposed between the second electrolyte portion 302 and the third electrolyte portion 303, the second protruding portion 221 of the second bent portion 220 can cover side surfaces of components (such as the first electrode layer 511, the first counter-electrode layer 521, and the first current collector 610) that are positioned beyond the second electrolyte portion 302 toward the side on which the first counter-electrode layer 521 is disposed. Thus, second protruding portion 221 can prevent contact between a member that may exist outside the battery (such as another battery) and the side surfaces of the components that are interposed between the second electrolyte portion 302 and the third electrolyte portion 303 and the side surfaces of the components that are positioned beyond the second electrolyte portion 302 toward the side on which the first counter-electrode layer 521 is disposed.

As illustrated in FIGS. 9 and 10, the second protruding portion 222 is a portion (of the second bent portion 220) that protrudes beyond the third electrolyte portion 303 toward a side on which the third electrode layer 513 is disposed.

With the structure described above, while the second bent portion 220 covers side surfaces of components (such as the second electrode layer 512, the second counter-electrode layer 522, and the second current collector 620) that are interposed between the second electrolyte portion 302 and the third electrolyte portion 303, the second protruding portion 222 of the second bent portion 220 can cover side surfaces of components (such as the third electrode layer 513, the third counter-electrode layer 523, and the third current collector 630) that are positioned beyond the third electrolyte portion 303 toward the side on which the third electrode layer 513 is disposed. Thus, the second bent portion 220 can prevent contact between a member that may exist outside the battery (such as another battery) and the side surfaces of the components that are positioned beyond the third electrolyte portion 303 toward the side on which the third electrode layer 513 is disposed.

The third bent portion 230 may include a third protruding portion 231.

As illustrated in FIGS. 9 and 11, the third protruding portion 231 is a portion (of the third bent portion 230) that protrudes beyond the third electrolyte portion 303 toward a side on which the second counter-electrode layer 522 is disposed.

With the structure described above, while the third bent portion 230 covers side surfaces of components (such as the third electrode layer 513, the third counter-electrode layer 523, and the third current collector 630) that are interposed between the third electrolyte portion 303 and the fourth electrolyte portion 304, the third protruding portion 231 of the third bent portion 230 can cover side surfaces of components (such as the second electrode layer 512, the second counter-electrode layer 522, and the second current collector 620) that are positioned beyond the third electrolyte portion 303 toward the side on which the second counter-electrode layer 522 is disposed. Thus, the third bent portion 230 can prevent contact between a member that may exist outside the battery (such as another battery) and the side surfaces of the components that are interposed between the third electrolyte portion 303 and the fourth electrolyte portion 304 and the side surfaces of the components that are positioned beyond the third electrolyte portion 303 toward the side on which the second counter-electrode layer 522 is disposed.

As illustrated in FIGS. 9, 10, and 11, the first bent portion 210 and the third bent portion 230 may contact each other.

With the structure described above, while the first bent portion 210 covers side surfaces of components (such as the first electrode layer 511, the first counter-electrode layer 521, and the first current collector 610) that are interposed between the first electrolyte portion 301 and the second electrolyte portion 302, and while the third bent portion 230 covers side surfaces of components (such as the third electrode layer 513, the third counter-electrode layer 523, the third current collector 630) that are interposed between the third electrolyte portion 303 and the fourth electrolyte portion 304, at least one of the first bent portion 210 and the third bent portion 230 can cover side surfaces of components (such as the second electrode layer 512, the second counter-electrode layer 522, and the second current collector 620) that are interposed between the second electrolyte portion 302 and the third electrolyte portion 303. In other words, at least one of the first bent portion 210 and the third bent portion 230 can cover side surfaces of components that are interposed between the second electrolyte portion 302 and the third electrolyte portion 303, the side surfaces being different from side surfaces that are covered by the second bent portion 220. Thus, the first bent portion 210 and the third bent portion 230 can prevent contact between a member that may exist outside the battery (such as another battery) and the side surfaces of the components that are interposed between the first electrolyte portion 301 and the fourth electrolyte portion 304. Moreover, because the first bent portion 210 and the third bent portion 230 cover a part of a side surface of the battery, even if a part of a component of the battery (such as an electrode material included in the second electrode layer 512, a counter-electrode material included in the second counter-electrode layer 522, or the like) crumbles and falls, the first bent portion 210 and the third bent portion 230 can suppress movement of the fallen component to another electric cell portion inside the battery (such as the first power generation element 501 or a third power generation element 503) or to the outside of the battery. Accordingly, a short circuit inside the battery, which may occur due to crumbling and falling of a component of the battery, can be suppressed. As a result, the reliability of the battery can be further improved.

As illustrated in FIG. 9, the first protruding portion 211 may contact the third protruding portion 231, and thereby the first bent portion 210 and the third bent portion 230 may contact each other.

Alternatively, as illustrated in FIG. 10, the first protruding portion 211 may contact the third bent portion 230, and thereby the first bent portion 210 and the third bent portion 230 may contact each other.

Alternatively, as illustrated in FIG. 11, the first bent portion 210 may contact the third protruding portion 231, and thereby the first bent portion 210 and the third bent portion 230 may contact each other.

In the present disclosure, a clause "a layer and another layer are positioned facing each other" means that, for example, "a part of a main surface (or the entire region of the main surface) of a layer overlaps a part of a main surface (or the entire region of the main surface) of another layer when seen in a direction in which these layers are stacked".

In the present disclosure, the meaning of a clause "a structure in which a layer and another layer are positioned facing each other" includes the meaning that "a structure in which another member (such as a layer made of a different material) is disposed between a main surface of a layer and a main surface of another layer, the main surfaces facing each other".

In the present disclosure, at least one of the first power generation element 501, the second power generation element 502, and the third power generation element 503 may be a stacked battery in which a plurality of electric cells are stacked.

A battery manufacturing method of manufacturing a battery according to the first embodiment will be described below as a fifth embodiment.

Second Embodiment

Hereinafter, a second embodiment will be described. Descriptions that overlap those of the first embodiment will be omitted as appropriate.

Figure 12:
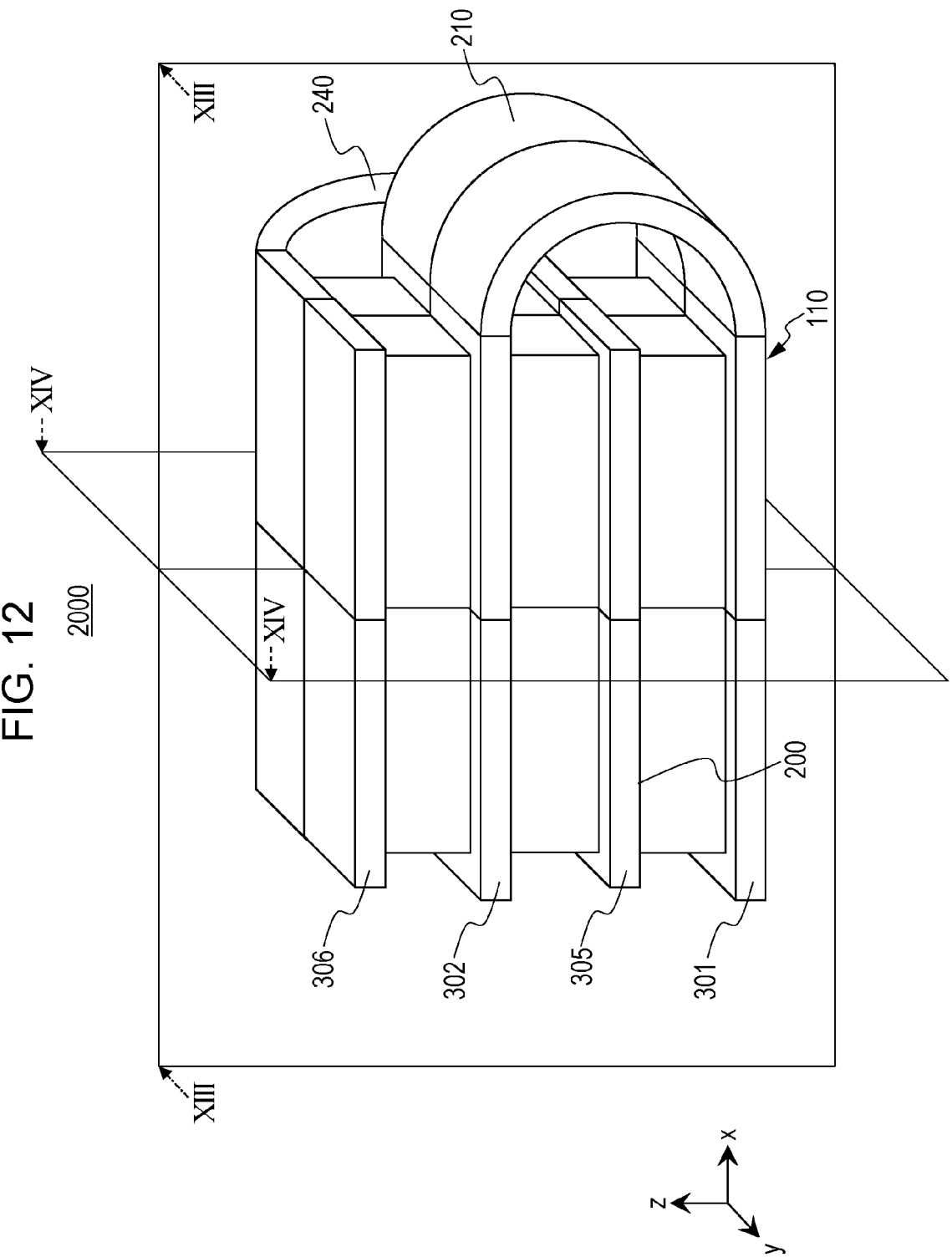
FIG. 12 is a schematic perspective view of a battery according to a second embodiment.

FIG. 12 is a schematic perspective view of a battery 2000 according to a second embodiment.

Figure 13:
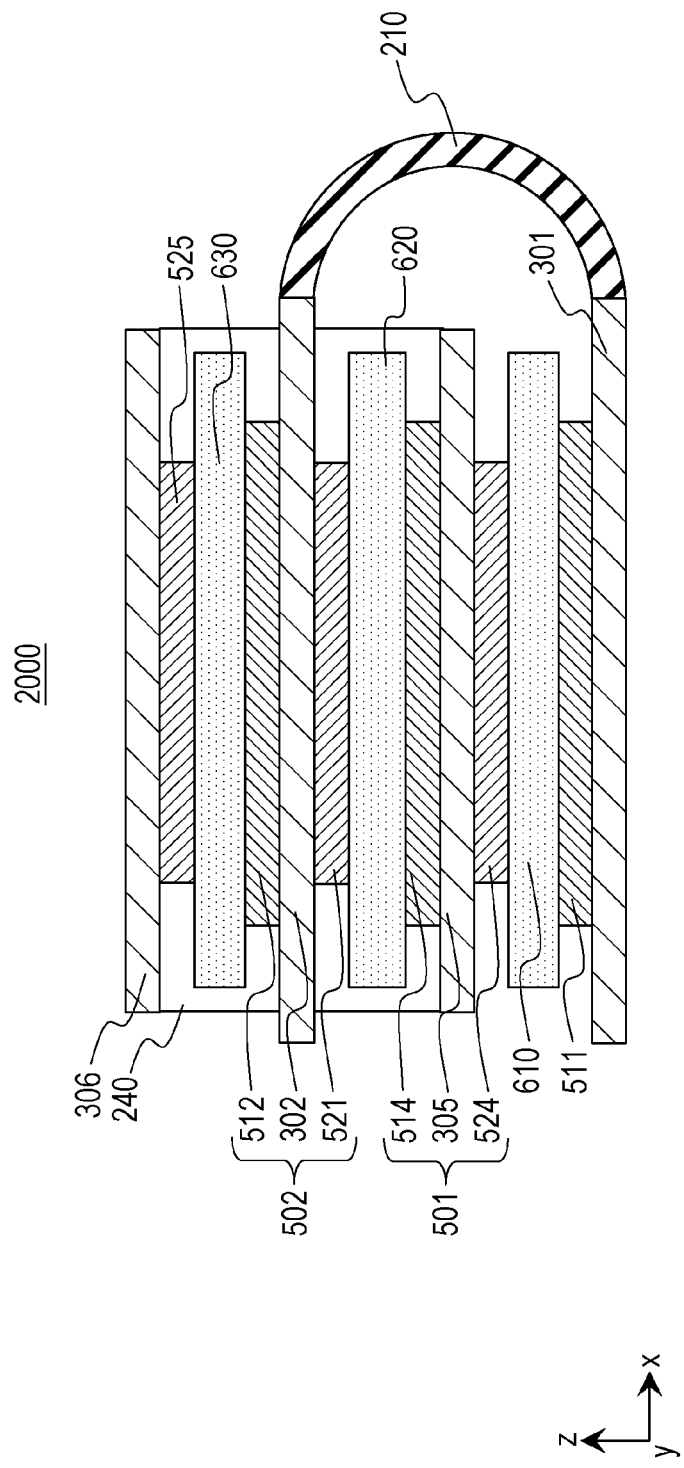
FIG. 13 is a schematic x-z view (sectional view taken along plane XIII-XIII in FIG. 12) of the battery according to the second embodiment.

FIG. 13 is a schematic x-z view (sectional view taken along plane XIII-XIII in FIG. 12) of the battery 2000 according to the second embodiment.

Figure 14:
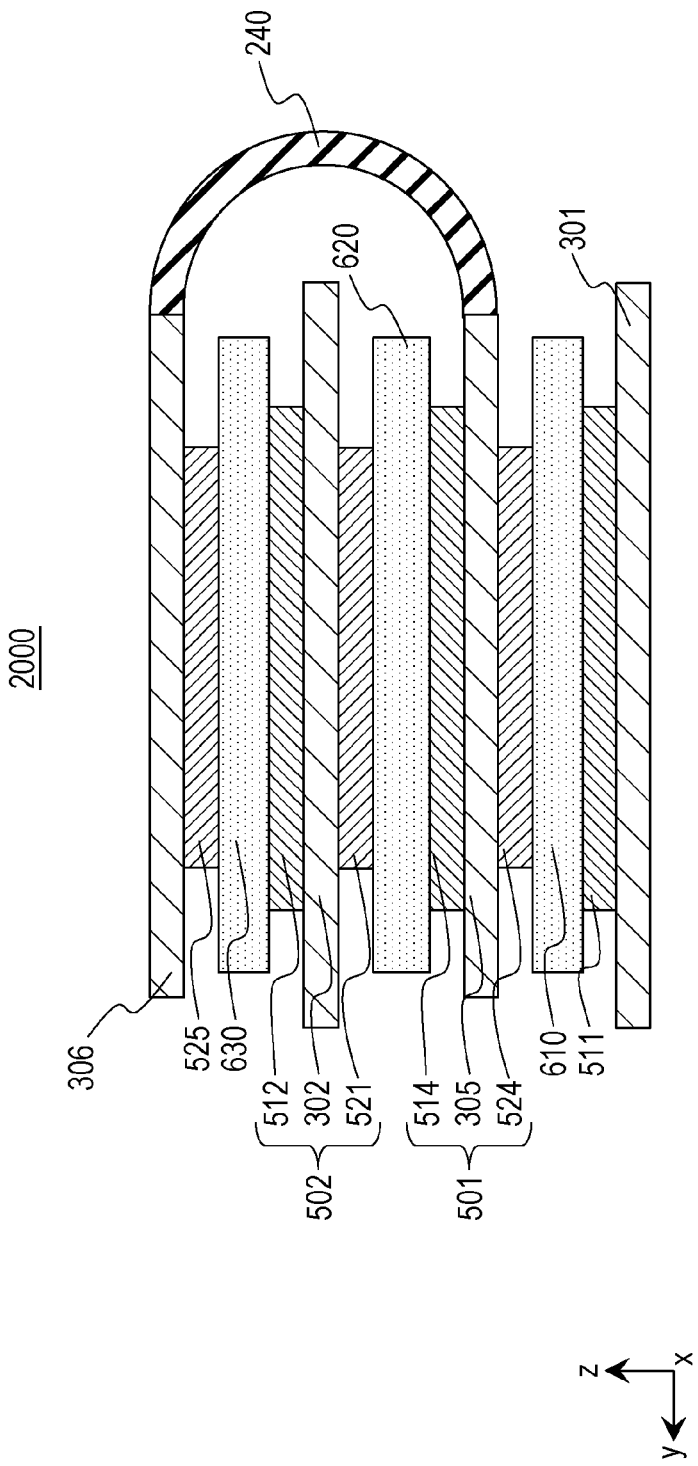
FIG. 14 is a schematic y-z view (sectional view taken along plane XIV-XIV in FIG. 12) of the battery according to the second embodiment.

FIG. 14 is a schematic y-z view (sectional view taken along plane XIV-XIV in FIG. 12) of the battery 2000 according to the second embodiment.

In FIG. 12 (and in similar perspective views such as FIG. 15), electrode layers, counter-electrode layers, and current collectors are not specifically illustrated for simplicity of the figure.

The battery 2000 according to the second embodiment further includes the following components, in addition to the components of the battery 1000 according to the first embodiment.

That is, the battery 2000 according to the second embodiment further includes a second insulator 120, a second electrode layer 512, a fourth electrode layer 514, a fourth counter-electrode layer 524, and a fifth counter-electrode layer 525.

The fourth counter-electrode layer 524 and the fifth counter-electrode layer 525 are counter electrodes for the first electrode layer 511 and the fourth electrode layer 514.

The second insulator 120 includes a fifth electrolyte portion 305, a sixth electrolyte portion 306, and a fourth bent portion 240.

The fourth bent portion 240 is positioned between the fifth electrolyte portion 305 and the sixth electrolyte portion 306.

The second electrode layer 512 is disposed in contact with the second electrolyte portion 302.

The fifth counter-electrode layer 525 is disposed in contact with the sixth electrolyte portion 306.

The fifth electrolyte portion 305 is disposed between the first electrolyte portion 301 and the second electrolyte portion 302.

The fourth electrode layer 514 is disposed in contact with the fifth electrolyte portion 305 and at a position facing the first counter-electrode layer 521.

The fourth counter-electrode layer 524 is disposed in contact with the fifth electrolyte portion 305 and at a position facing the first electrode layer 511.

The second insulator 120 is bent at the fourth bent portion 240. Thus, the second electrode layer 512 and the fifth counter-electrode layer 525 are positioned facing each other.

With the structure described above, bonding strength between the components of the battery can be further increased. That is, the fourth electrode layer 514 and the fifth counter-electrode layer 525 can be respectively disposed on the fifth electrolyte portion 305 and the sixth electrolyte portion 306, which are linked to each other by the fourth bent portion 240. Thus, the fourth bent portion 240 (in other words, the second insulator 120, which is a single component) can securely maintain the positional relationship between the fourth electrode layer 514, which is disposed on the fifth electrolyte portion 305, and the fifth counter-electrode layer 525, which is disposed on the sixth electrolyte portion 306. Thus, for example, it is possible to prevent displacement or separation of layers (such as the fourth electrode layer 514 and the fifth counter-electrode layer 525) of the battery, which may occur due to an impact, vibration, or the like when manufacturing or using the battery.

Moreover, with the structure described above, the fourth bent portion 240 can cover a side surface of the battery where the fourth bent portion 240 is positioned. Thus, the fourth bent portion 240 can prevent contact between a member that may exist outside the battery (such as another battery) and the side surface of the battery where the fourth bent portion 240 is positioned. Accordingly, a short circuit due to contact between batteries can be suppressed. Moreover, it is possible to suppress partial destruction of the side surface of the battery due to contact between the battery and a member that may exist outside the battery. Because the fourth bent portion 240 covers a part of the side surface of the battery, even if a part of a component of the battery (such as an electrode material included in the second electrode layer 512 or the fourth electrode layer 514 or a counter-electrode material included in the first counter-electrode layer 521 or the fifth counter-electrode layer 525) crumbles and falls, the fourth bent portion 240 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

As illustrated in FIGS. 13 and 14, the battery 2000 according to the second embodiment may further include a first current collector 610, a second current collector 620, and a third current collector 630.

The first current collector 610 is disposed between the first electrode layer 511 and the fourth counter-electrode layer 524 and in contact with the first electrode layer 511 and the fourth counter-electrode layer 524.

The second current collector 620 is disposed between the fourth electrode layer 514 and the first counter-electrode layer 521 and in contact with the fourth electrode layer 514 and the first counter-electrode layer 521.

The third current collector 630 is disposed between the second electrode layer 512 and the fifth counter-electrode layer 525 and in contact with the second electrode layer 512 and the fifth counter-electrode layer 525.

With the structure described above, it is possible to form a stacked battery by using the first insulator 110 and the second insulator 120. That is, it is possible to stack a first power generation element 501, which includes the fourth electrode layer 514 and the fourth counter-electrode layer 524, and a second power generation element 502, which includes the second electrode layer 512 and the first counter-electrode layer 521, in series via the second current collector 620. That is, it is possible to increase the voltage of the battery by connecting the first power generation element 501 and the second power generation element 502 in series, while the bent portions of the first insulator 110 and the second insulator 120 securely maintain the positional relationship between the first power generation element 501 and the second power generation element 502.

Figure 15:
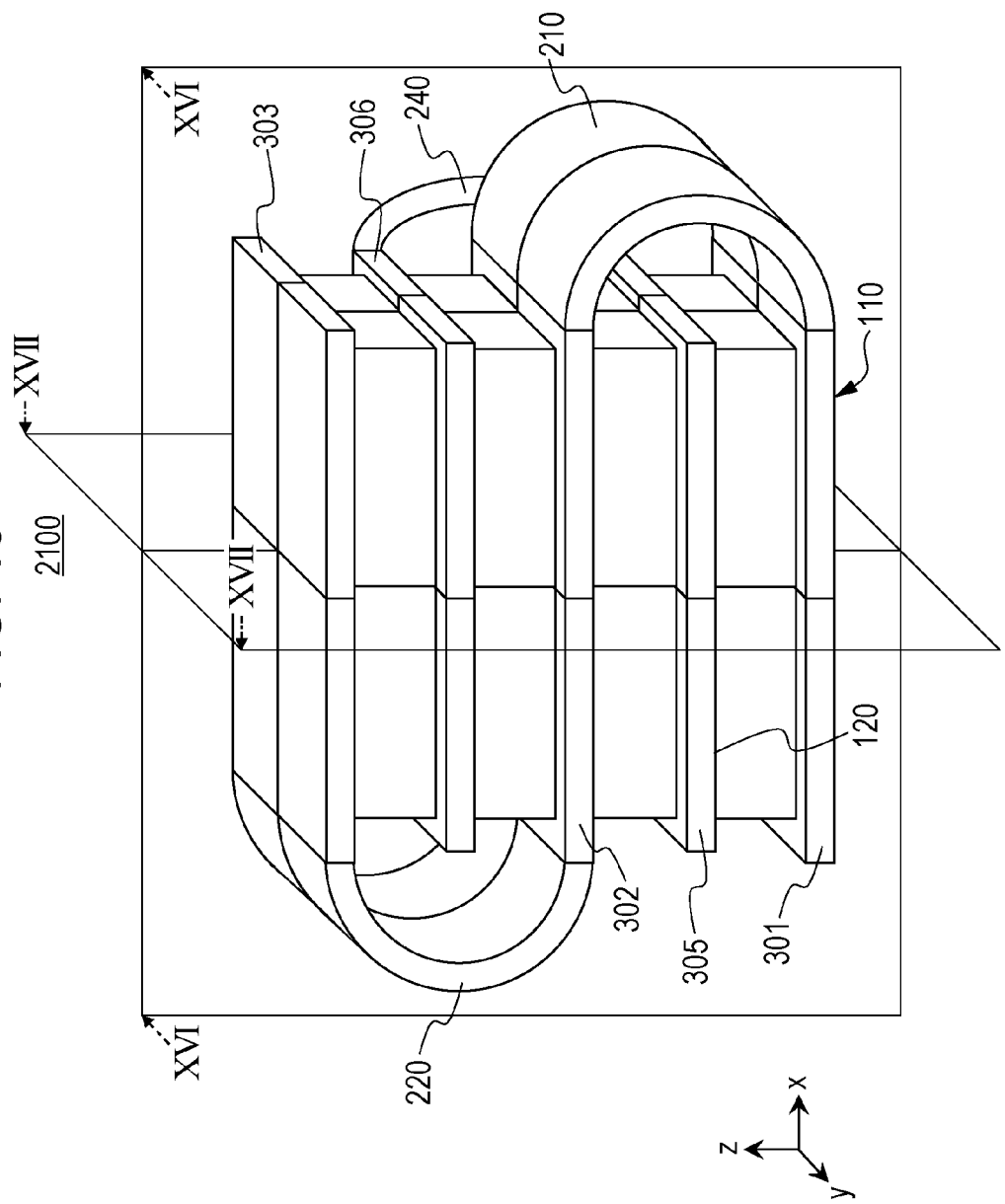
FIG. 15 is a schematic perspective view of a battery according to the second embodiment.

FIG. 15 is a schematic perspective view of a battery 2100 according to the second embodiment.

Figure 16:
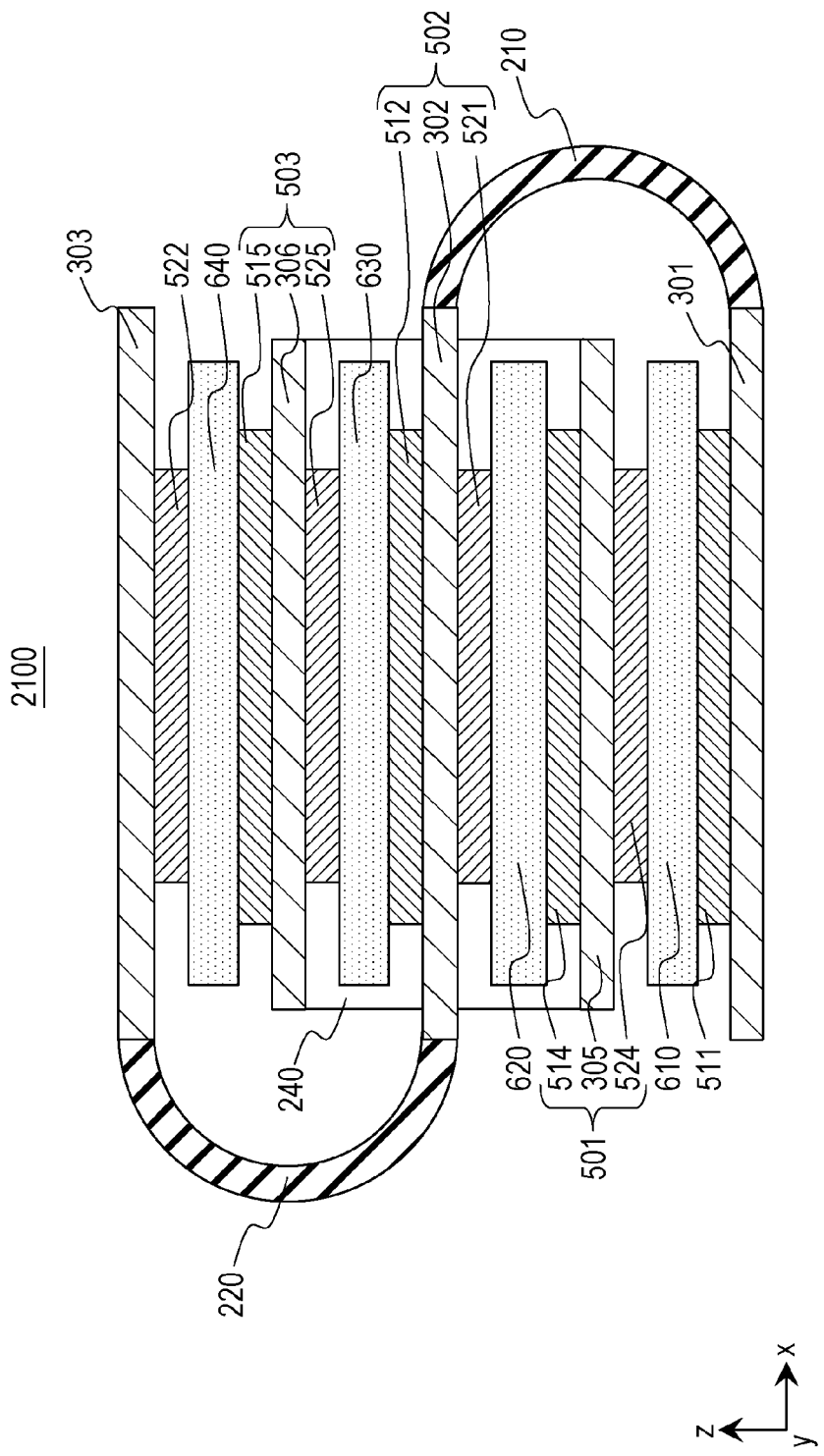
FIG. 16 is a schematic x-z view (sectional view taken along plane XVI-XVI in FIG. 15) of the battery according to the second embodiment.

FIG. 16 is a schematic x-z view (sectional view taken along plane XVI-XVI in FIG. 15) of the battery 2100 according to the second embodiment.

Figure 17:
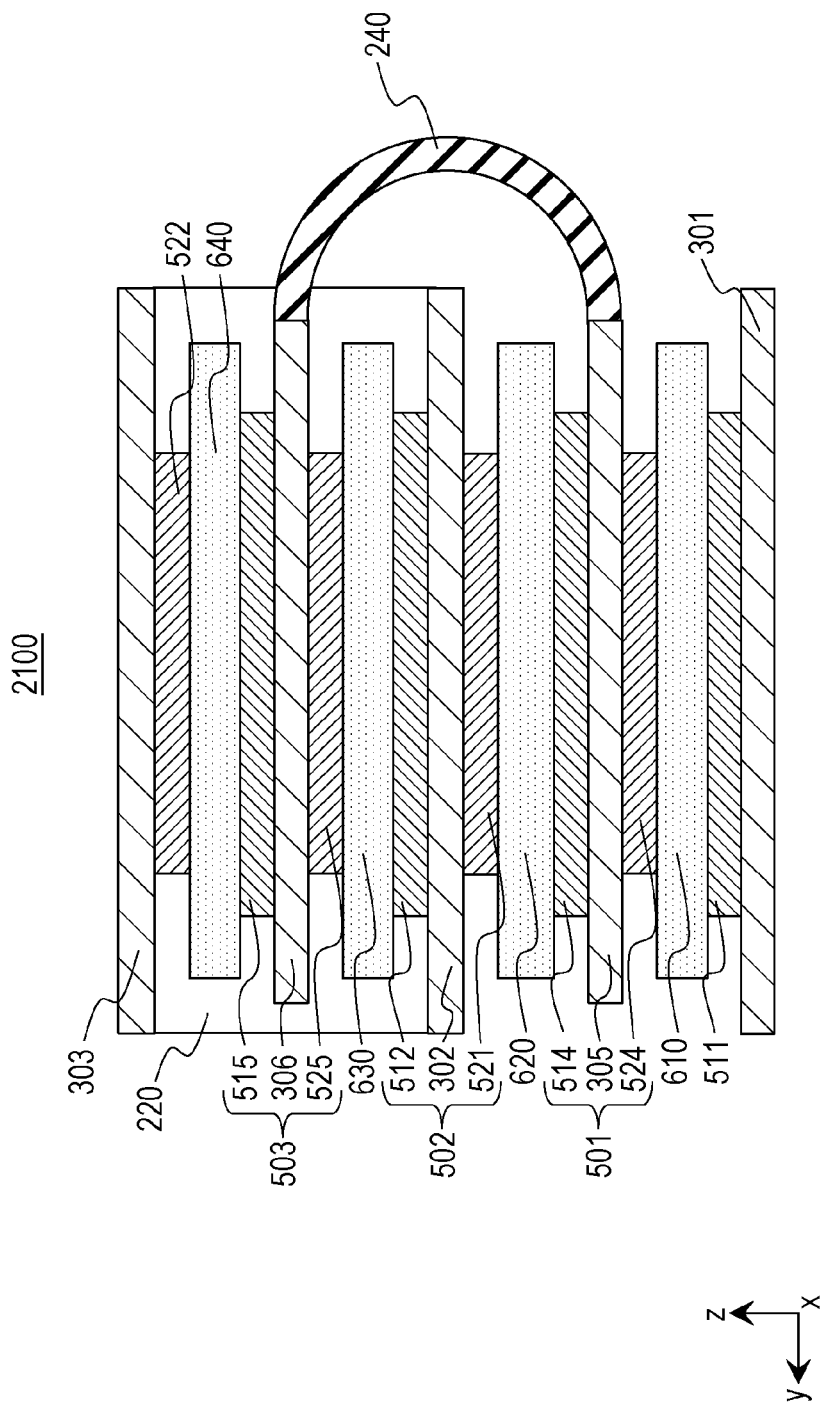
FIG. 17 is a schematic y-z view (sectional view taken along plane XVII-XVII in FIG. 15) of the battery according to the second embodiment.

FIG. 17 is a schematic y-z view (sectional view taken along plane XVII-XVII in FIG. 15) of the battery 2100 according to the second embodiment.

The battery 2100 according to the second embodiment further includes the following components, in addition to the components of the battery 2000 according to the second embodiment.

That is, the battery 2100 according to the second embodiment further includes a fifth electrode layer 515 and a second counter-electrode layer 522.

The second counter-electrode layer 522 is a counter electrode for the first electrode layer 511, the second electrode layer 512, the fourth electrode layer 514, and the fifth electrode layer 515.

The first insulator 110 includes a second bent portion 220 and a third electrolyte portion 303.

The second bent portion 220 is positioned between the second electrolyte portion 302 and the third electrolyte portion 303.

The fifth electrode layer 515 is disposed in contact with the sixth electrolyte portion 306.

The second counter-electrode layer 522 is disposed in contact with the third electrolyte portion 303.

The first insulator 110 is bent at the second bent portion 220. Thus, the fifth electrode layer 515 and the second counter-electrode layer 522 are positioned facing each other.

With the structure described above, bonding strength between the components of the battery can be further increased. That is, the second electrode layer 512 and the second counter-electrode layer 522 can be respectively disposed on the second electrolyte portion 302 and the third electrolyte portion 303, which are linked to each other by the second bent portion 220. Thus, the second bent portion 220 (in other words, the first insulator 110, which is a single component) can securely maintain the positional relationship between the second electrode layer 512, which is disposed on the second electrolyte portion 302, and the second counter-electrode layer 522, which is disposed on the third electrolyte portion 303. Thus, for example, it is possible to prevent displacement or separation of layers (such as the second electrode layer 512 and the second counter-electrode layer 522) of the battery, which may occur due to an impact, vibration, or the like when manufacturing or using the battery.

Moreover, with the structure described above, the second bent portion 220 can cover a side surface of the battery where the second bent portion 220 is positioned. Thus, the second bent portion 220 can prevent contact between a member that may exist outside the battery (such as another battery) and the side surface of the battery where the second bent portion 220 is positioned. Accordingly, a short circuit due to contact between batteries can be suppressed. Moreover, it is possible to suppress partial destruction of the side surface of the battery due to contact between the battery and a member that may exist outside the battery. Because the second bent portion 220 covers a part of the side surface of the battery, even if a part of a component of the battery (such as an electrode material included in the second electrode layer 512 or the fifth electrode layer 515, or a counter-electrode material included in the second counter-electrode layer 522 or the fifth counter-electrode layer 525) crumbles and falls, the second bent portion 220 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

As illustrated in FIGS. 16 and 17, the battery 2100 according to the second embodiment may further include a first current collector 610, a second current collector 620, a third current collector 630, and a fourth current collector 640.

The fourth current collector 640 is disposed between the fifth electrode layer 515 and the second counter-electrode layer 522 and in contact with the fifth electrode layer 515 and the second counter-electrode layer 522.

With the structure described above, it is possible to form a stacked battery by using the first insulator 110 and the second insulator 120. That is, it is possible to stack a second power generation element 502, which includes the second electrode layer 512 and the first counter-electrode layer 521, and a third power generation element 503, which includes the fifth electrode layer 515 and the fifth counter-electrode layer 525, in series via the third current collector 630. That is, it is possible to increase the voltage of the battery by connecting the first power generation element 501, the second power generation element 502, and the third power generation element 503 in series, while the bent portions of the first insulator 110 and the second insulator 120 securely maintain the positional relationships among the first power generation element 501, the second power generation element 502, and the third power generation element 503.

Figure 18:
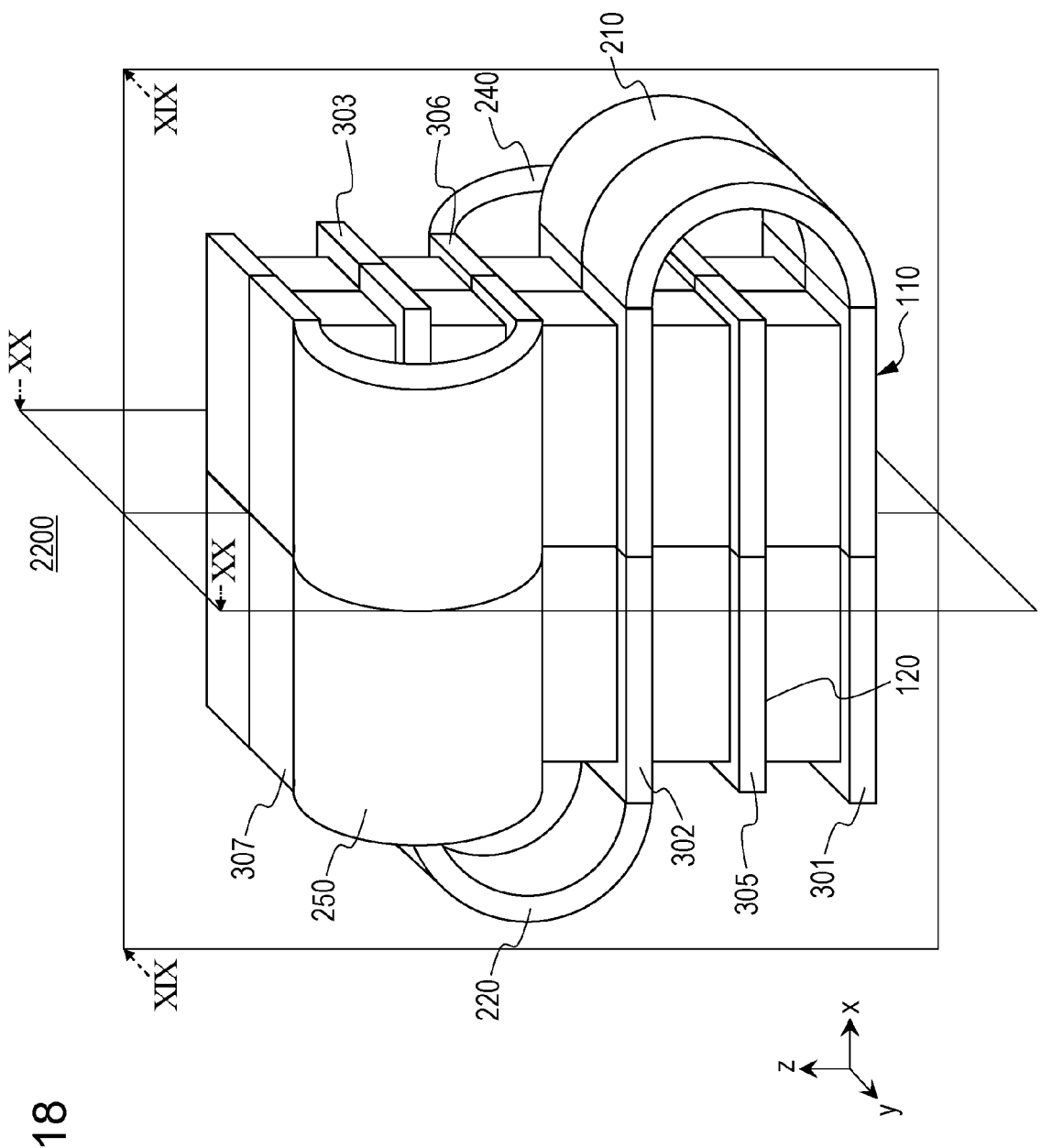
FIG. 18 is a schematic perspective view of a battery according to the second embodiment.

FIG. 18 is a schematic perspective view of a battery 2200 according to the second embodiment.

Figure 19:
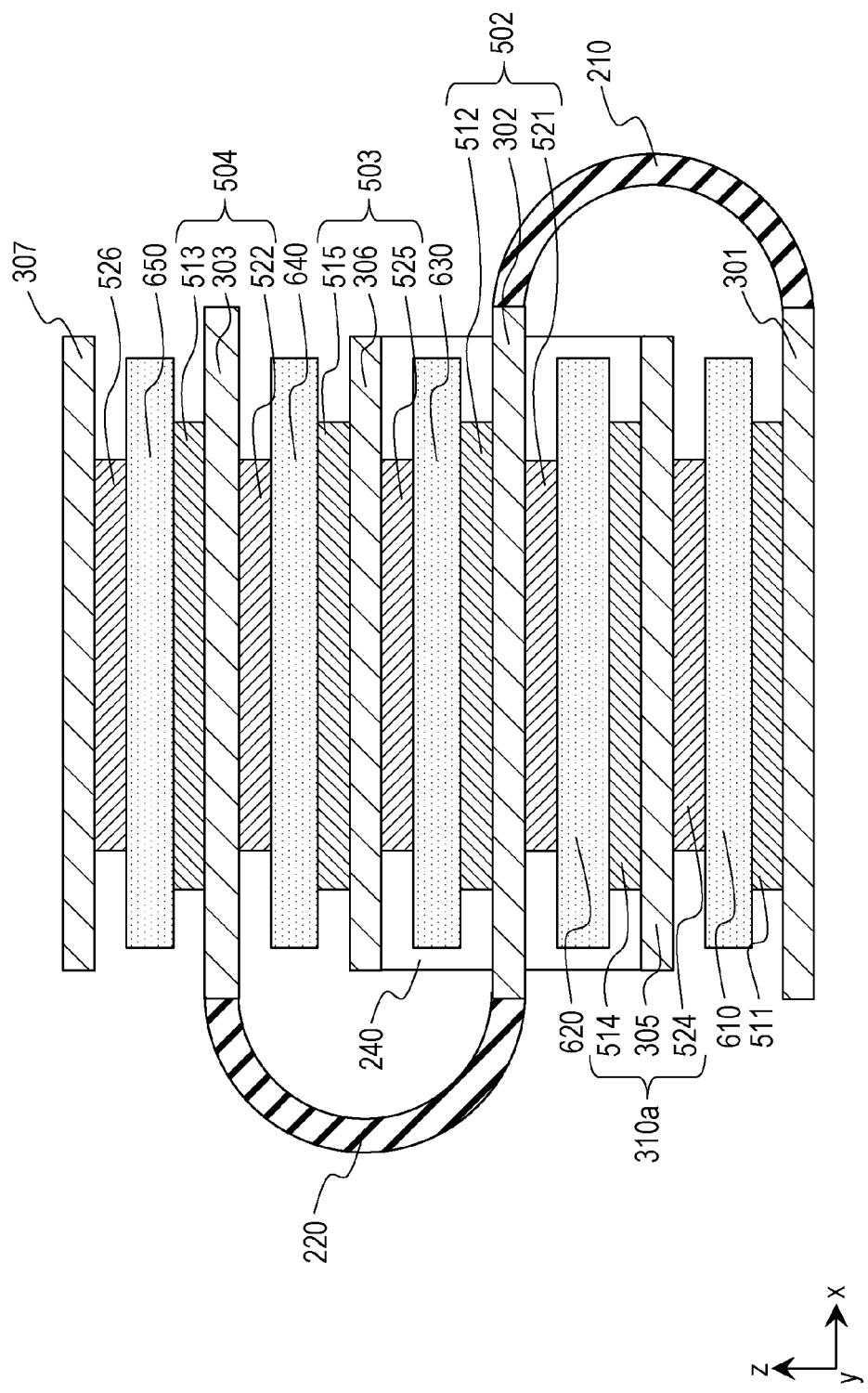
FIG. 19 is a schematic x-z view (sectional view taken along plane XIX-XIX in FIG. 18) of the battery according to the second embodiment.

FIG. 19 is a schematic x-z view (sectional view taken along plane XIX-XIX in FIG. 18) of the battery 2200 according to the second embodiment.

Figure 20:
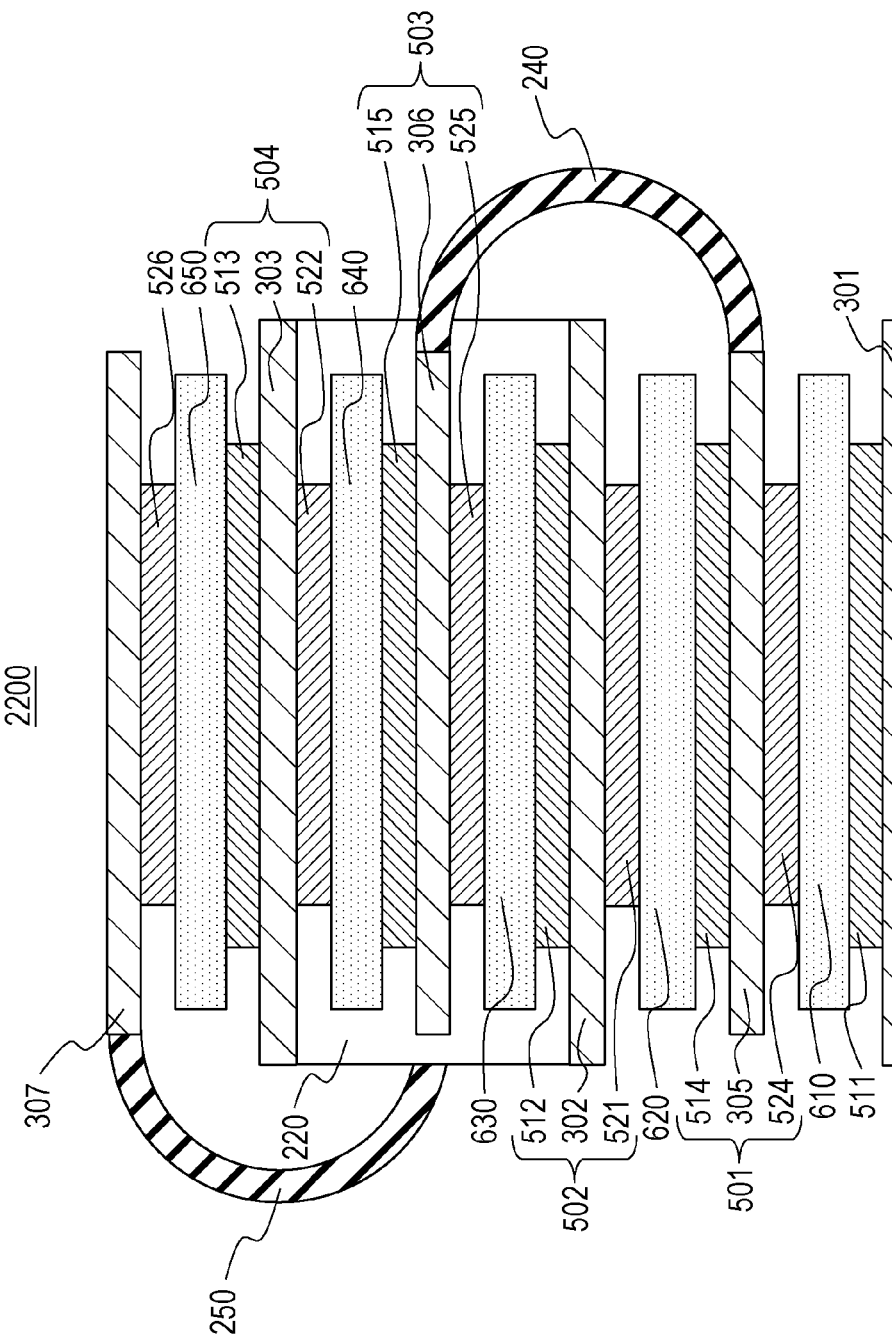
FIG. 20 is a schematic y-z view (sectional view taken along plane XX-XX in FIG. 18) of the battery according to the second embodiment.

FIG. 20 is a schematic y-z view (sectional view taken along plane XX-XX in FIG. 18) of the battery 2200 according to the second embodiment.

The battery 2200 according to the second embodiment further includes the following components, in addition to the components of the battery 2100 according to the second embodiment.

That is, the battery 2200 according to the second embodiment further includes a third electrode layer 513 and a sixth counter-electrode layer 526.

The sixth counter-electrode layer 526 is a counter electrode for the first electrode layer 511, the second electrode layer 512, the third electrode layer 513, the fourth electrode layer 514, and the fifth electrode layer 515.

The second insulator 120 includes a seventh electrolyte portion 307 and a fifth bent portion 250.

The fifth bent portion 250 is positioned between the sixth electrolyte portion 306 and the seventh electrolyte portion 307.

The third electrode layer 513 is disposed in contact with the third electrolyte portion 303.

The sixth counter-electrode layer 526 is disposed in contact with the seventh electrolyte portion 307.

The second insulator 120 is bent at the fifth bent portion 250. Thus, the third electrode layer 513 and the sixth counter-electrode layer 526 are positioned facing each other.

With the structure described above, bonding strength between the components of the battery can be further increased. That is, the fifth electrode layer 515 and the sixth counter-electrode layer 526 can be respectively disposed on the sixth electrolyte portion 306 and the seventh electrolyte portion 307, which are linked to each other by the fifth bent portion 250. Thus, the fifth bent portion 250 (in other words, the second insulator 120, which is a single component) can securely maintain the positional relationship between the fifth electrode layer 515, which is disposed on the sixth electrolyte portion 306, and the sixth counter-electrode layer 526, which is disposed on the seventh electrolyte portion 307. Thus, for example, it is possible to prevent displacement or separation of layers (such as the fifth electrode layer 515 and the sixth counter-electrode layer 526) of the battery, which may occur due to an impact, vibration, or the like when manufacturing or using the battery.

Moreover, with the structure described above, the fifth bent portion 250 can cover a side surface of the battery where the fifth bent portion 250 is positioned. Thus, the fifth bent portion 250 can prevent contact between a member that may exist outside the battery (such as another battery) and the side surface of the battery where the fifth bent portion 250 is positioned. Accordingly, a short circuit due to contact between batteries can be suppressed. Moreover, it is possible to suppress partial destruction of the side surface of the battery due to contact between the battery and a member that may exist outside the battery. Because the fifth bent portion 250 covers a part of the side surface of the battery, even if a part of a component of the battery (such as an electrode material included in the third electrode layer 513 or the fifth electrode layer 515, or a counter-electrode material included in the second counter-electrode layer 522 or the sixth counter-electrode layer 526) crumbles and falls, the fifth bent portion 250 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

The battery 2200 according to the second embodiment may further include a first current collector 610, a second current collector 620, a third current collector 630, a fourth current collector 640, and a fifth current collector 650.

The fifth current collector 650 is disposed between the third electrode layer 513 and the sixth counter-electrode layer 526 and in contact with the third electrode layer 513 and the sixth counter-electrode layer 526.

With the structure described above, it is possible to form a stacked battery by using the first insulator 110 and the second insulator 120. That is, it is possible to stack a third power generation element 503, which includes the fifth electrode layer 515 and the fifth counter-electrode layer 525, and a fourth power generation element 504, which includes the third electrode layer 513 and the second counter-electrode layer 522, in series via the fourth current collector 640. That is, it is possible to increase the voltage of the battery by connecting the first power generation element 501, the second power generation element 502, the third power generation element 503, and the fourth power generation element 504 in series, while the bent portions of the first insulator 110 and the second insulator 120 securely maintain the positional relationships among the first power generation element 501, the second power generation element 502, the third power generation element 503, and the fourth power generation element 504.

Figure 21:
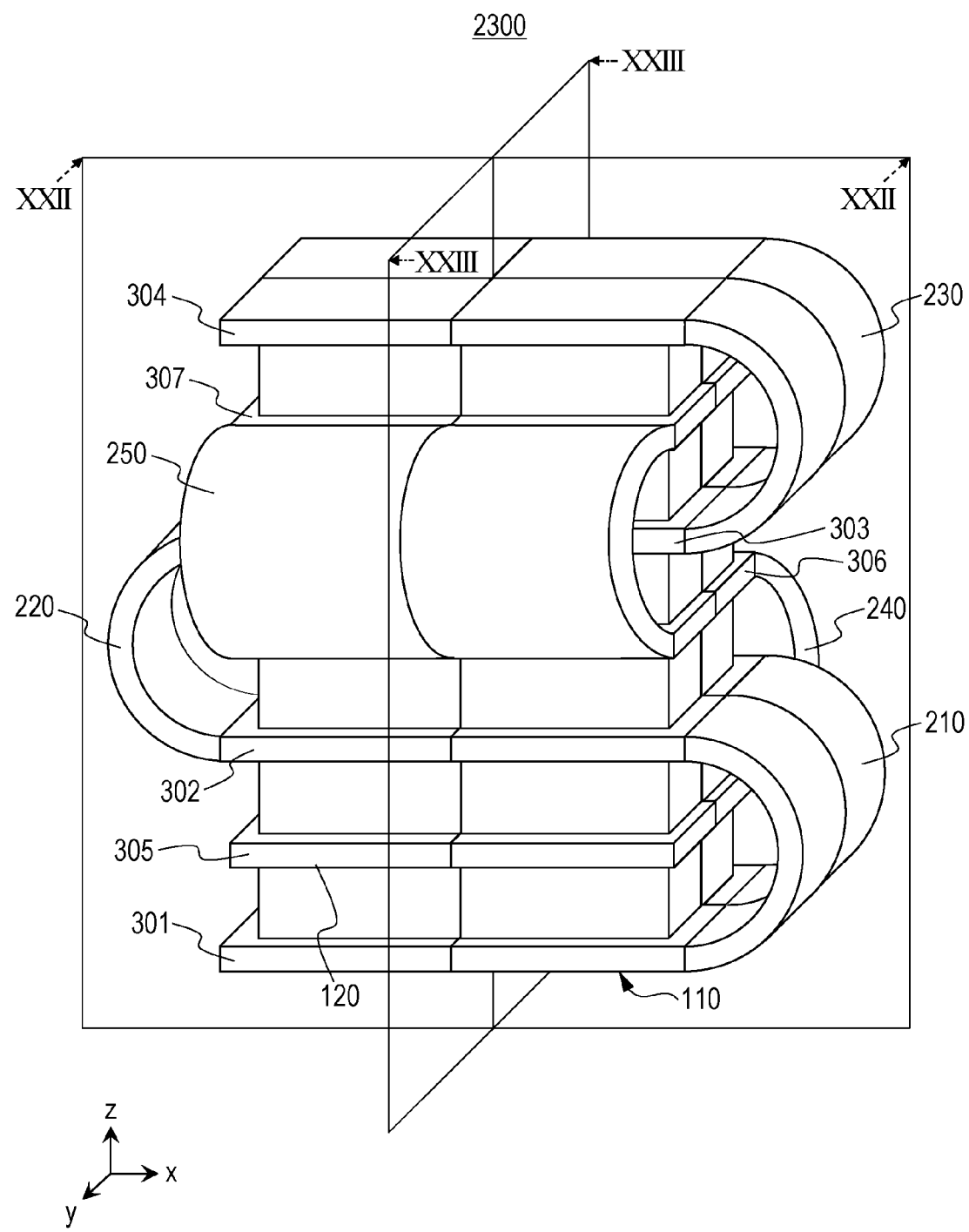
FIG. 21 is a schematic perspective view of a battery according to the second embodiment.

FIG. 21 is a schematic perspective view of a battery 2300 according to the second embodiment.

Figure 22:
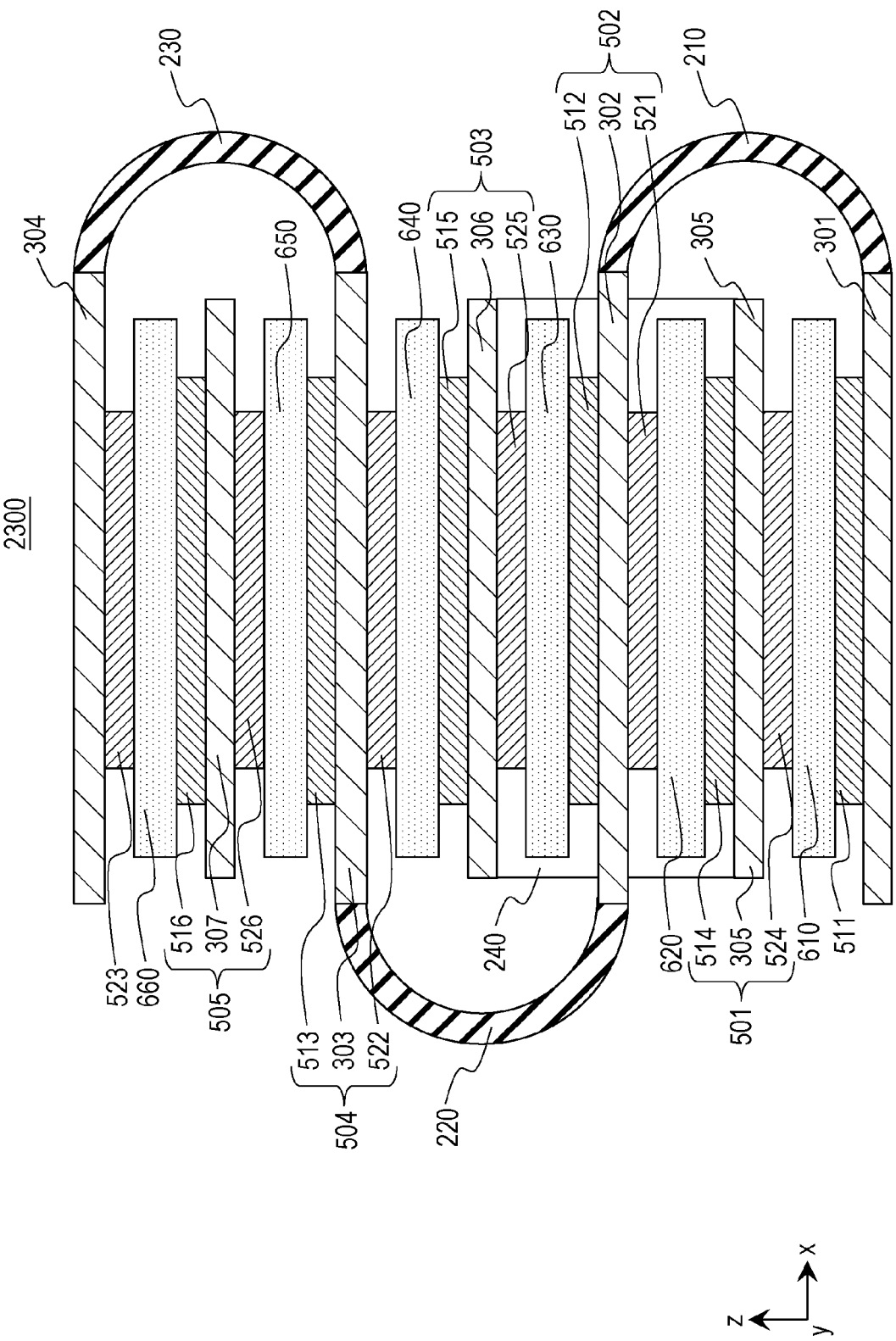
FIG. 22 is a schematic x-z view (sectional view taken along plane XXII-XXII in FIG. 21) of the battery according to the second embodiment.

FIG. 22 is a schematic x-z view (sectional view taken along plane XXII-XXII in FIG. 21) of the battery 2300 according to the second embodiment.

Figure 23:
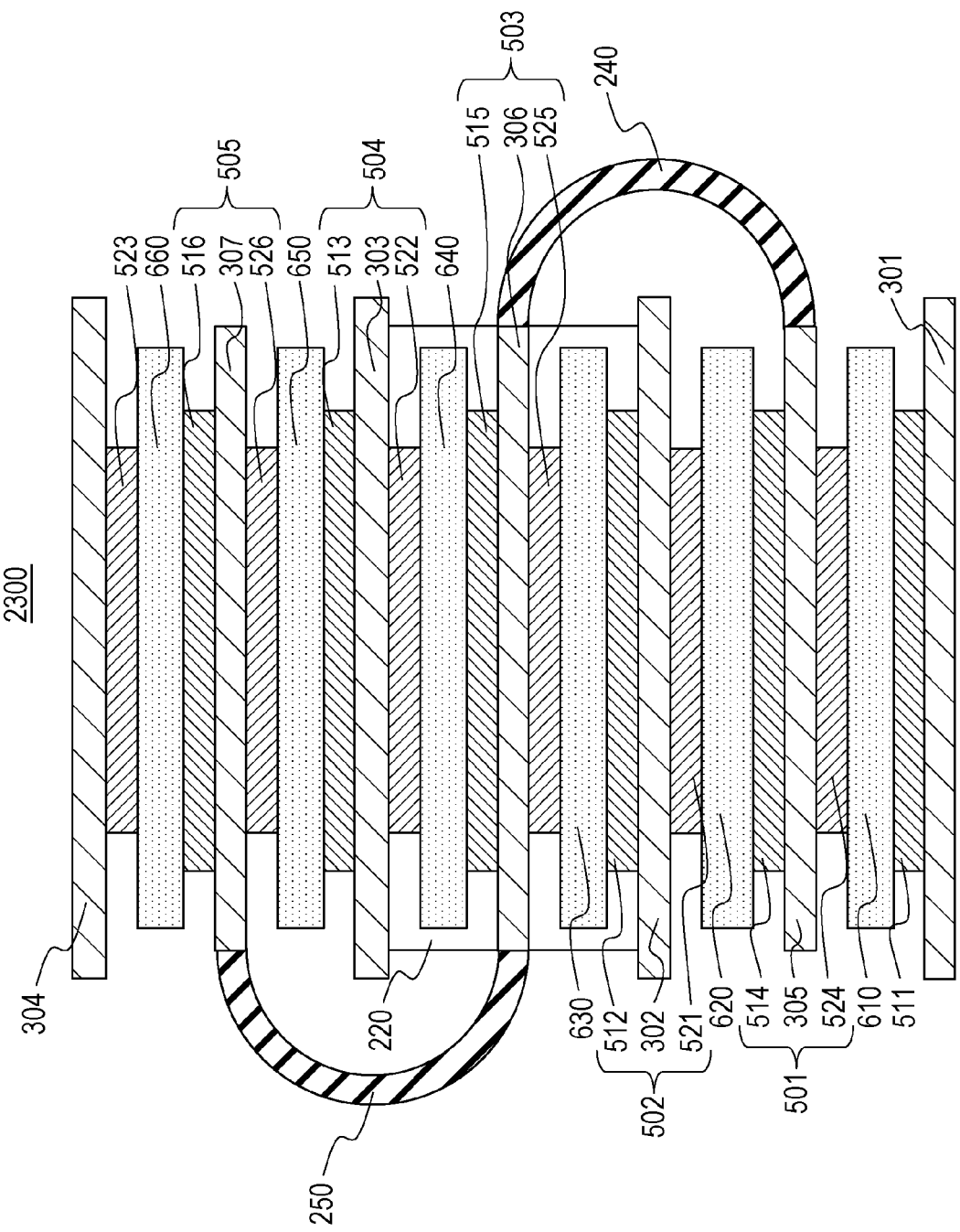
FIG. 23 is a schematic y-z view (sectional view taken along plane XXIII-XXIII in FIG. 21) of the battery according to the second embodiment.

FIG. 23 is a schematic y-z view (sectional view taken along plane XXIII-XXIII in FIG. 21) of the battery 2300 according to the second embodiment.

The battery 2300 according to the second embodiment further includes the following components, in addition to the components of the battery 2200 according to the second embodiment.

That is, the battery 2300 according to the second embodiment further includes a sixth electrode layer 516 and a third counter-electrode layer 523.

The third counter-electrode layer 523 is a counter electrode for the first electrode layer 511, the second electrode layer 512, the third electrode layer 513, the fourth electrode layer 514, the fifth electrode layer 515, and the sixth electrode layer 516.

The first insulator 110 includes a third bent portion 230 and a fourth electrolyte portion 304.

The third bent portion 230 is positioned between the third electrolyte portion 303 and the fourth electrolyte portion 304.

The sixth electrode layer 516 is disposed in contact with the seventh electrolyte portion 307.

The third counter-electrode layer 523 is disposed in contact with the fourth electrolyte portion 304.

The first insulator 110 is bent at the third bent portion 230. Thus, the sixth electrode layer 516 and the third counter-electrode layer 523 are positioned facing each other.

With the structure described above, bonding strength between the components of the battery can be further increased. That is, the third electrode layer 513 and the third counter-electrode layer 523 can be respectively disposed on the third electrolyte portion 303 and the fourth electrolyte portion 304, which are linked to each other by the third bent portion 230. Thus, the third bent portion 230 (in other words, the first insulator 110, which is a single component) can securely maintain the positional relationship between the third electrode layer 513, which is disposed on the third electrolyte portion 303, and the third counter-electrode layer 523, which is disposed on the fourth electrolyte portion 304. Thus, for example, it is possible to prevent displacement or separation of layers (such as the third electrode layer 513 and the third counter-electrode layer 523) of the battery, which may occur due to an impact, vibration, or the like when manufacturing or using the battery.

Moreover, with the structure described above, the third bent portion 230 can cover a side surface of the battery where the third bent portion 230 is positioned. Thus, the third bent portion 230 can prevent contact between a member that may exist outside the battery (such as another battery) and the side surface of the battery where the third bent portion 230 is positioned. Accordingly, a short circuit due to contact between batteries can be suppressed. Moreover, it is possible to suppress partial destruction of the side surface of the battery due to contact between the battery and a member that may exist outside the battery. Because the third bent portion 230 covers a part of the side surface of the battery, even if a part of a component of the battery (such as an electrode material included in the third electrode layer 513 or the sixth electrode layer 516, or a counter-electrode material included in the third counter-electrode layer 523 or the sixth counter-electrode layer 526) crumbles and falls, the third bent portion 230 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

The battery 2300 according to the second embodiment may further include a first current collector 610, a second current collector 620, a third current collector 630, a fourth current collector 640, a fifth current collector 650, and a sixth current collector 660.

The sixth current collector 660 is deposed between the sixth electrode layer 516 and the third counter-electrode layer 523 and in contact with the sixth electrode layer 516 and the third counter-electrode layer 523.

With the structure described above, it is possible to form a stacked battery by using the first insulator 110 and the second insulator 120. That is, it is possible to stack a fourth power generation element 504, which includes the third electrode layer 513 and the second counter-electrode layer 522, and a fifth power generation element 505, which includes the sixth electrode layer 516 and the sixth counter-electrode layer 526, in series via the fifth current collector 650. That is, it is possible to increase the voltage of the battery by connecting the first power generation element 501, the second power generation element 502, the third power generation element 503, the fourth power generation element 504, and the fifth power generation element 505 in series, while the bent portions of the first insulator 110 and the second insulator 120 securely maintain the positional relationships among the first power generation element 501, the second power generation element 502, the third power generation element 503, the fourth power generation element 504, and the fifth power generation element 505.

The fifth electrolyte portion 305, the sixth electrolyte portion 306, and the seventh electrolyte portion 307 are formed by providing an electrolyte material to the base material of the second insulator 120. The first to seventh electrolyte portions 301 to 307 may have the same characteristics (such as thickness, area, shape, and materials) or may have different characteristics.

The first to seventh electrolyte portions 301 to 307 each may be formed in an area that is larger than a corresponding one of the first to sixth electrode layers 511 to 516 and is larger than any of the first to sixth counter-electrode layers 521 to 526. Thus, a short circuit due to direct contact between an electrode layer and a counter-electrode layer can be prevented.

The fifth electrolyte portion 305 and the sixth electrolyte portion 306 may be disposed in an insular pattern with a predetermined distance therebetween. In this case, a portion of the base material positioned between the fifth electrolyte portion 305 and the sixth electrolyte portion 306 (a portion where an electrolyte material is not disposed) is a fourth bend region 740. The fourth bent portion 240 is formed by bending the fourth bend region 740.

The sixth electrolyte portion 306 and the seventh electrolyte portion 307 may be disposed in an insular pattern with a predetermined distance therebetween. In this case, a portion of the base material positioned between the sixth electrolyte portion 306 and the seventh electrolyte portion 307 (a portion where an electrolyte material is not disposed) is a fifth bend region 750. The fifth bent portion 250 is formed by bending the fifth bend region 750.

The first to sixth bent portions 210 to 260 may have the same characteristics (such as thickness, area, shape, and materials) or may have different characteristics.

The fifth electrolyte portion 305 may be disposed in an area larger than each of the first current collector 610 and the second current collector 620. Thus, the fifth electrolyte portion 305 can prevent a short circuit between the first current collector 610 and the second current collector 620.

The second electrolyte portion 302 may be disposed in an area larger than each of the second current collector 620 and the third current collector 630. Thus, the second electrolyte portion 302 can prevent a short circuit between the second current collector 620 and the third current collector 630.

The sixth electrolyte portion 306 may be disposed in an area larger than each of the third current collector 630 and the fourth current collector 640. Thus, the sixth electrolyte portion 306 can prevent a short circuit between the third current collector 630 and the fourth current collector 640.

The third electrolyte portion 303 may be disposed in an area larger than each of the fourth current collector 640 and the fifth current collector 650. Thus, the third electrolyte portion 303 can prevent a short circuit between the fourth current collector 640 and the fifth current collector 650.

The seventh electrolyte portion 307 may be disposed in an area larger than each of the fifth current collector 650 and the sixth current collector 660. Thus, the seventh electrolyte portion 307 can prevent a short circuit between the fifth current collector 650 and the sixth current collector 660.

The fourth electrode layer 514, the fifth electrode layer 515, and the sixth electrode layer 516 are each a layer containing an electrode material (such as an active material). The first to sixth electrode layers 511 to 516 may have the same characteristics (such as thickness, area, shape, and materials) or may have different characteristics.

The first to sixth electrode layers 511 to 516 each may be formed in an area smaller than any of the first to sixth current collectors 610 to 660.

The fourth counter-electrode layer 524, the fifth counter-electrode layer 525, and the sixth counter-electrode layer 526 are each a layer containing a counter-electrode material (such as an active material). The counter-electrode material is a material that forms a counter electrode for an electrode material. The first to sixth counter-electrode layers 521 to 526 may have the same characteristics (such as thickness, area, shape, and materials) or may have different characteristics.

The first to sixth counter-electrode layers 521 to 526 each may be formed in an area smaller than any of the first to sixth current collectors 610 to 660.

The fourth current collector 640, the fifth current collector 650, and the sixth current collector 660 are conductive members. The first to sixth current collectors 610 to 660 may have the same characteristics (such as thickness, area, shape, and materials) or may have different characteristics.

The third power generation element 503, the fourth power generation element 504, and the fifth power generation element 505 are each, for example, a power generation unit having charging and discharging properties (such as a secondary battery). For example, the third power generation element 503, the fourth power generation element 504, and the fifth power generation element 505 each may be an electric cell.

The third power generation element 503, the fourth power generation element 504, and the fifth power generation element 505 each may include a solid electrolyte. That is, the third power generation element 503, the fourth power generation element 504, and the fifth power generation element 505 each may be an all-solid-state battery.

The first electrode layer 511, the second electrode layer 512, the third electrode layer 513, the fourth electrode layer 514, the fifth electrode layer 515, and the sixth electrode layer 516 each may be a negative-electrode active-material layer. In this case, the electrode material is a negative-electrode active material. The first current collector 610, the second current collector 620, the third current collector 630, the fourth current collector 640, the fifth current collector 650, and the sixth current collector 660 are each a bipolar current collector. The first counter-electrode layer 521, the second counter-electrode layer 522, the third counter-electrode layer 523, the fourth counter-electrode layer 524, the fifth counter-electrode layer 525, and the sixth counter-electrode layer 526 are each a positive-electrode active-material layer. The counter-electrode material is a positive-electrode active material. In this case, a positive-electrode active-material layer may be disposed in contact with the first electrolyte portion 301 (for example, on one of the main surfaces of the first electrolyte portion 301 on which the first electrode layer 511 is not disposed). Moreover, a positive-electrode current collector may be disposed in contact with the positive-electrode active-material layer. A negative-electrode active-material layer may be disposed in contact with the fourth electrolyte portion 304 (for example, on one of the main surfaces of the fourth electrolyte portion 304 on which the third counter-electrode layer 523 is not disposed). Moreover, a negative-electrode current collector may be disposed in contact with the negative-electrode active-material layer.

Alternatively, the first electrode layer 511, the second electrode layer 512, the third electrode layer 513, the fourth electrode layer 514, the fifth electrode layer 515, and the sixth electrode layer 516 each may be a positive-electrode active-material layer. In this case, the electrode material is a positive-electrode active material. The first current collector 610, the second current collector 620, the third current collector 630, the fourth current collector 640, the fifth current collector 650, and the sixth current collector 660 are each a bipolar current collector. The first counter-electrode layer 521, the second counter-electrode layer 522, the third counter-electrode layer 523, the fourth counter-electrode layer 524, the fifth counter-electrode layer 525, and the sixth counter-electrode layer 526 are each a negative-electrode active-material layer. The counter-electrode material is a negative-electrode active material. In this case, a negative-electrode active-material layer may be disposed in contact with the first electrolyte portion 301 (for example, on one of the main surfaces of the first electrolyte portion 301 on which the first electrode layer 511 is not disposed). Moreover, a negative-electrode current collector may be disposed in contact with the negative-electrode active-material layer. A positive-electrode active-material layer may be disposed in contact with the fourth electrolyte portion 304 (for example, on one of the main surfaces of the fourth electrolyte portion 304 on which the third counter-electrode layer 523 is not disposed). Moreover, a positive-electrode current collector may be disposed in contact with the positive-electrode active-material layer.

Figure 24:
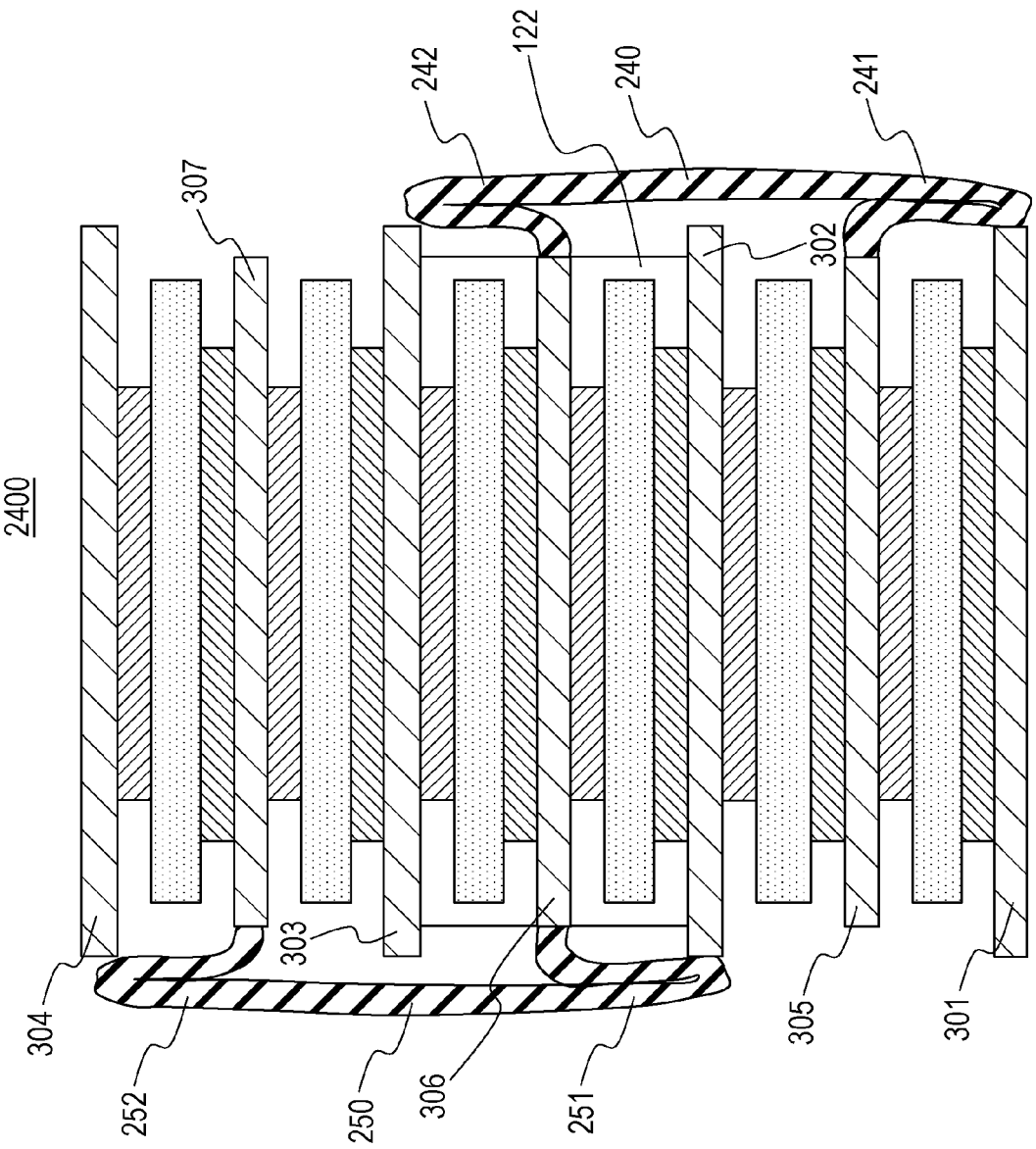
FIG. 24 is a schematic y-z view (sectional view) of a battery according to the second embodiment.

FIG. 24 is a schematic y-z view (sectional view) of a battery 2400 according to the second embodiment.

Figure 25:
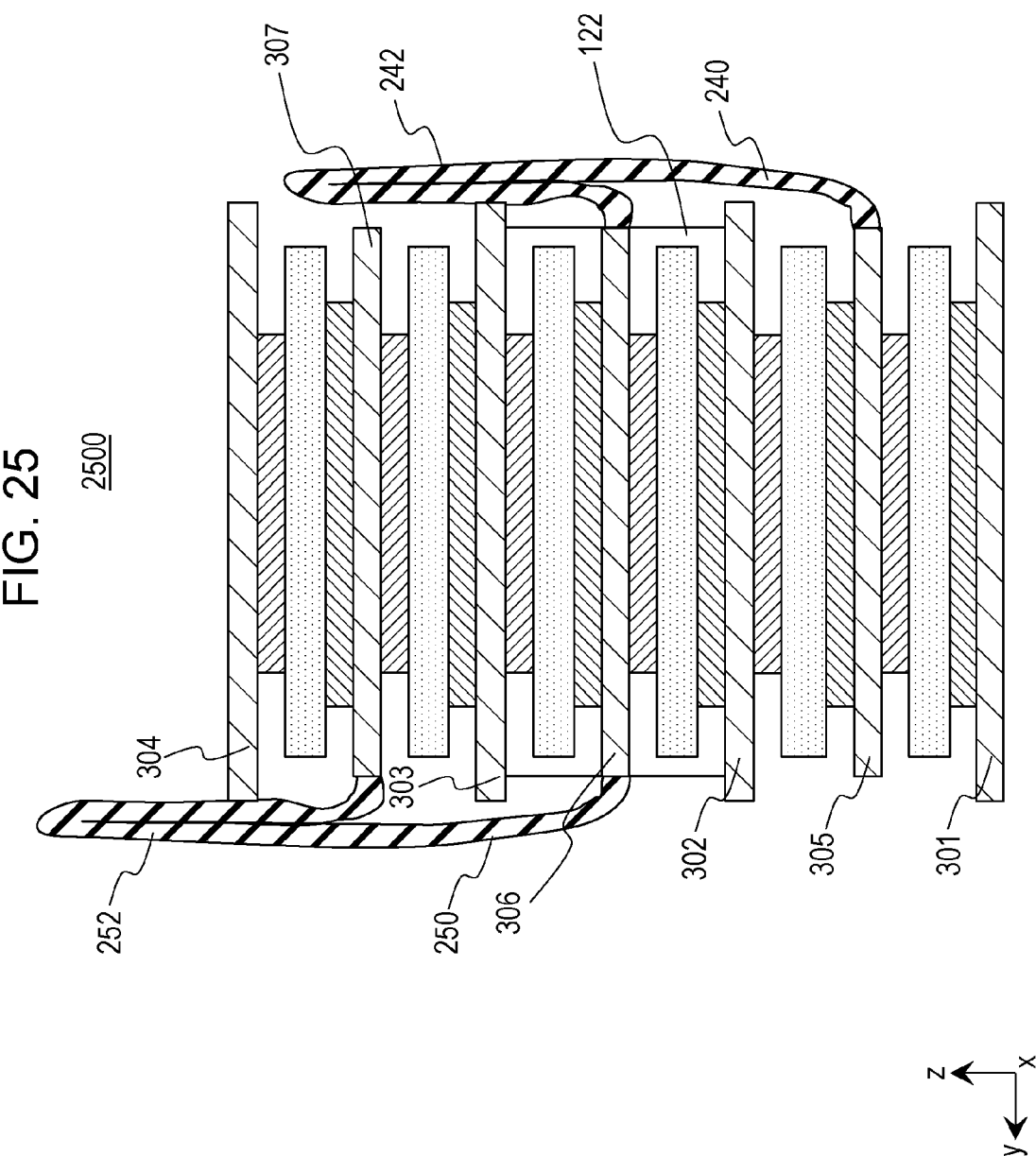
FIG. 25 is a schematic y-z view (sectional view) of a battery according to the second embodiment.

FIG. 25 is a schematic y-z view (sectional view) of a battery 2500 according to the second embodiment.

Figure 26:
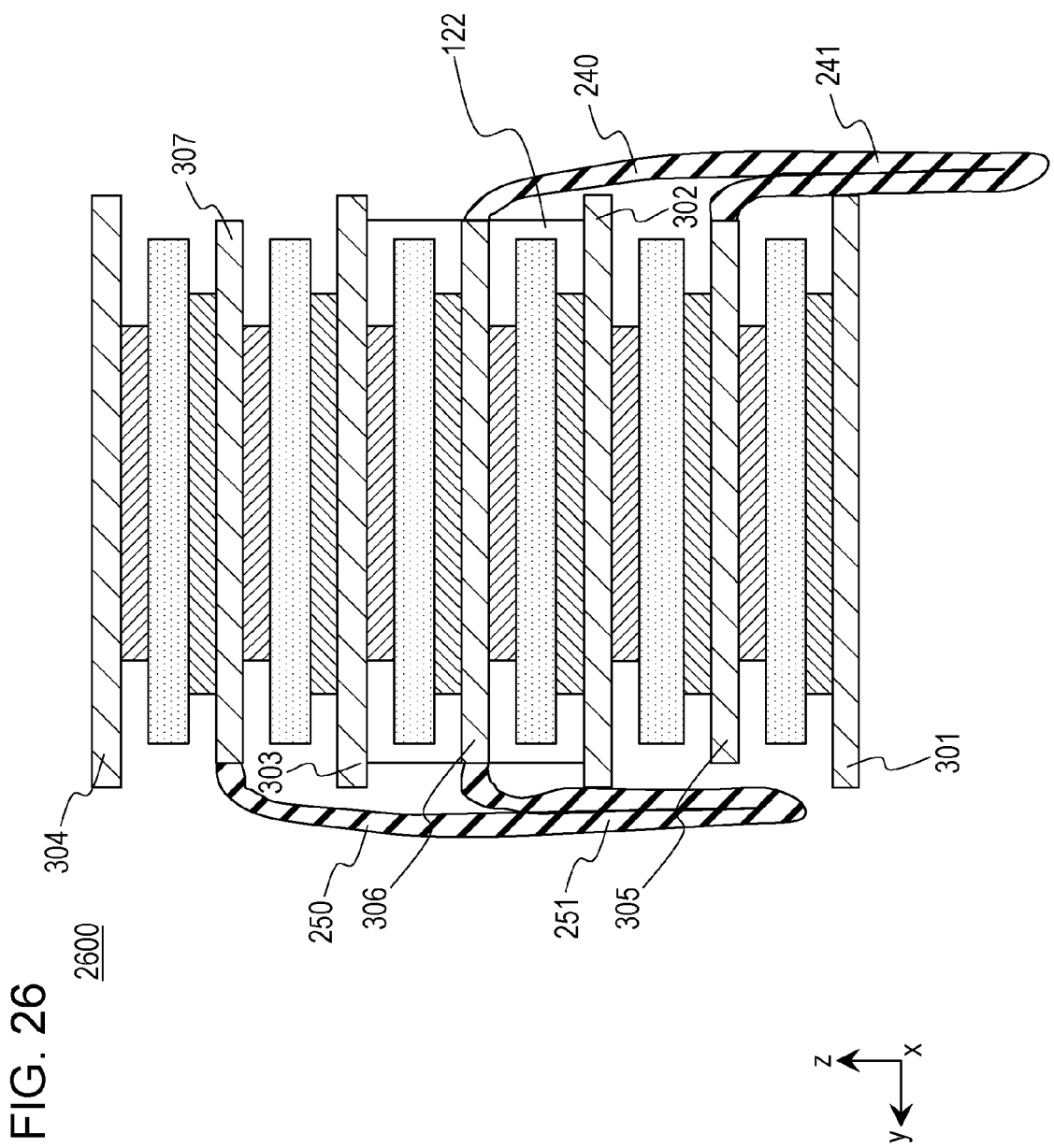
FIG. 26 is a schematic y-z view (sectional view) of a battery according to the second embodiment.

FIG. 26 is a schematic y-z view (sectional view) of a battery 2600 according to the second embodiment.

The fourth bent portion 240 may include at least one of a fourth protruding portion 241 and a fourth protruding portion 242.

As illustrated in FIGS. 24 and 26, the fourth protruding portion 241 is a portion (of the fourth bent portion 240) that protrudes beyond the fifth electrolyte portion 305 toward a side on which the fourth counter-electrode layer 524 is disposed.

With the structure described above, while the fourth bent portion 240 covers side surfaces of components that are interposed between the fifth electrolyte portion 305 and the sixth electrolyte portion 306, the fourth protruding portion 241 of the fourth bent portion 240 can cover side surfaces of components that are positioned beyond the fifth electrolyte portion 305 toward the side on which the fourth counter-electrode layer 524 is disposed. Thus, the fourth bent portion 240 can prevent contact between a member that may exist outside the battery (such as another battery) and the side surfaces of the components that are interposed between the fifth electrolyte portion 305 and the sixth electrolyte portion 306 and the side surfaces of the components that are positioned beyond the fifth electrolyte portion 305 toward the side on which the fourth counter-electrode layer 524 is disposed.

As illustrated in FIGS. 24 and 25, the fourth protruding portion 242 is a portion (of the fourth bent portion 240) that protrudes beyond the sixth electrolyte portion 306 toward a side on which the fifth electrode layer 515 is disposed.

With the structure described above, while the fourth bent portion 240 covers side surfaces of components that are interposed between the fifth electrolyte portion 305 and the sixth electrolyte portion 306, the fourth protruding portion 242 of the fourth bent portion 240 can cover side surfaces of components that are positioned beyond the sixth electrolyte portion 306 toward the side on which the fifth electrode layer 515 is disposed. Thus, the fourth bent portion 240 can prevent contact between a member that may exist outside the battery (such as another battery) and the side surfaces of the components that are interposed between the fifth electrolyte portion 305 and the sixth electrolyte portion 306 and the side surfaces of the components that are positioned beyond the sixth electrolyte portion 306 toward the side on which the fifth electrode layer 515 is disposed.

The fifth bent portion 250 may include at least one of a fifth protruding portion 251 and a fifth protruding portion 252.

As illustrated in FIGS. 24 and 26, the fifth protruding portion 251 is a portion (of the fifth bent portion 250) that protrudes beyond the sixth electrolyte portion 306 toward a side on which the fifth counter-electrode layer 525 is disposed.

With the structure described above, while the fifth bent portion 250 covers side surfaces of components that are interposed between the sixth electrolyte portion 306 and the seventh electrolyte portion 307, the fifth protruding portion 251 of the fifth bent portion 250 can cover side surfaces of components that are positioned beyond the sixth electrolyte portion 306 toward the side on which the fifth counter-electrode layer 525 is disposed. Thus, the fifth bent portion 250 can prevent contact between a member that may exist outside the battery (such as another battery) and the side surfaces of the components that are interposed between the sixth electrolyte portion 306 and the seventh electrolyte portion 307 and the side surfaces of the components that are positioned beyond the sixth electrolyte portion 306 toward the side on which the fifth counter-electrode layer 525 is disposed.

As illustrated in FIGS. 24 and 25, the fifth protruding portion 252 is a portion (of the fifth bent portion 250) that protrudes beyond the seventh electrolyte portion 307 toward a side on which the sixth electrode layer 516 is disposed.

With the structure described above, while the fifth bent portion 250 covers side surfaces of components that are interposed between the sixth electrolyte portion 306 and the seventh electrolyte portion 307, the fifth protruding portion 252 of the fifth bent portion 250 can cover side surfaces of components that are positioned beyond the seventh electrolyte portion 307 toward the side on which the sixth electrode layer 516 is disposed. Thus, the fifth bent portion 250 can prevent contact between a member that may exist outside the battery (such as another battery) and the side surfaces of the components that are interposed between the sixth electrolyte portion 306 and the seventh electrolyte portion 307 and the side surfaces of the components that are positioned beyond the sixth electrolyte portion 306 toward the side on which the fifth counter-electrode layer 525 is disposed.

Figure 27:
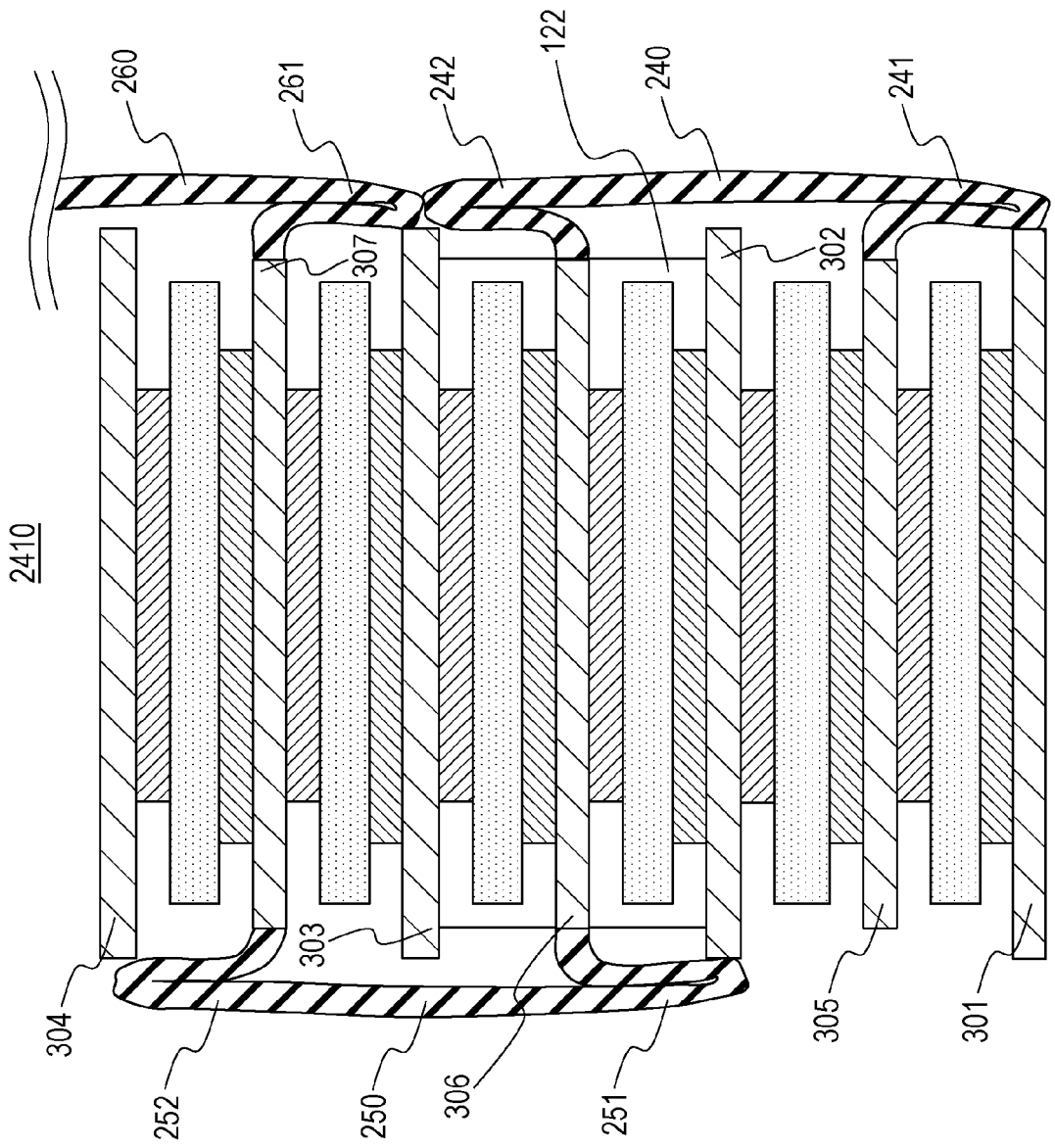
FIG. 27 is a schematic y-z view (sectional view) of a battery according to the second embodiment.

FIG. 27 is a schematic y-z view (sectional view) of a battery 2410 according to the second embodiment.

Figure 28:
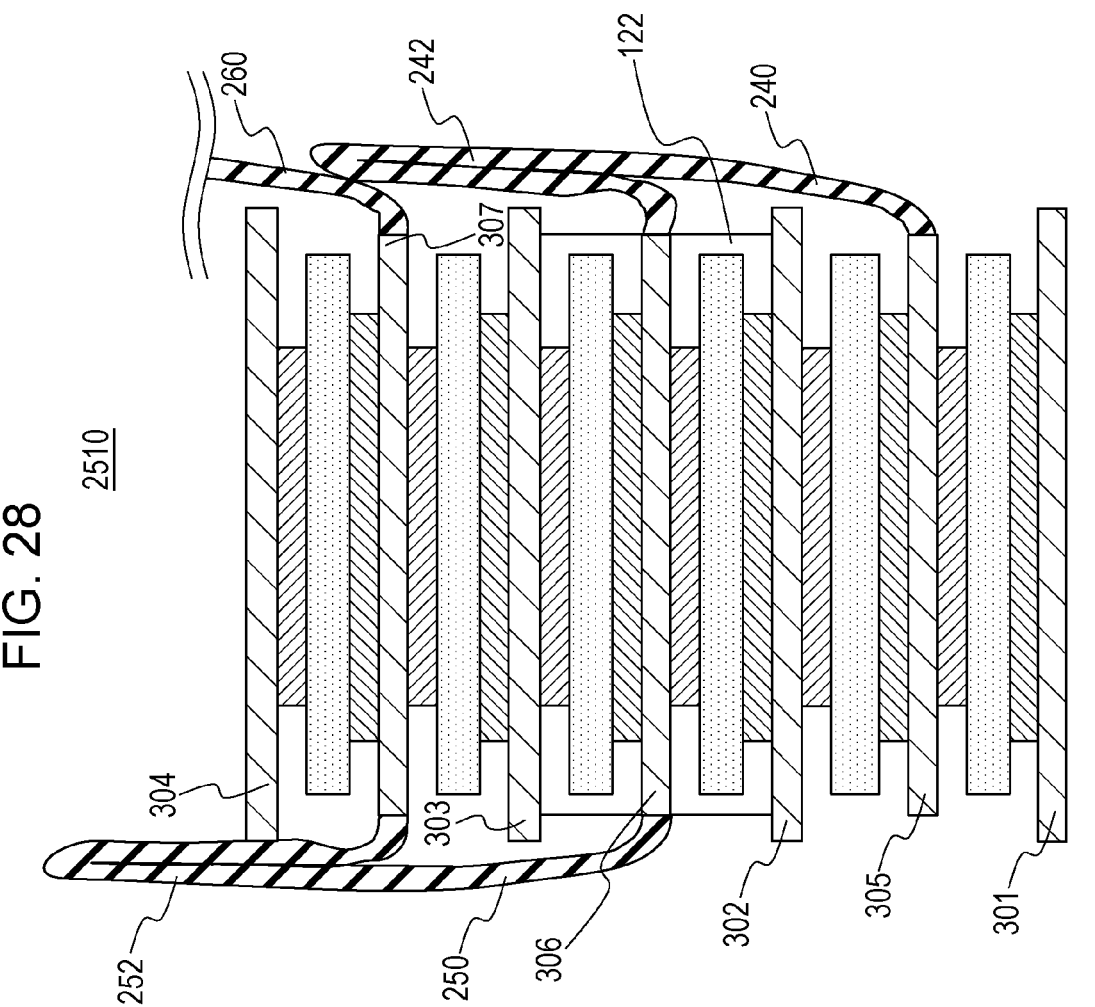
FIG. 28 is a schematic y-z view (sectional view) of a battery according to the second embodiment.

FIG. 28 is a schematic y-z view (sectional view) of a battery 2510 according to the second embodiment.

Figure 29:
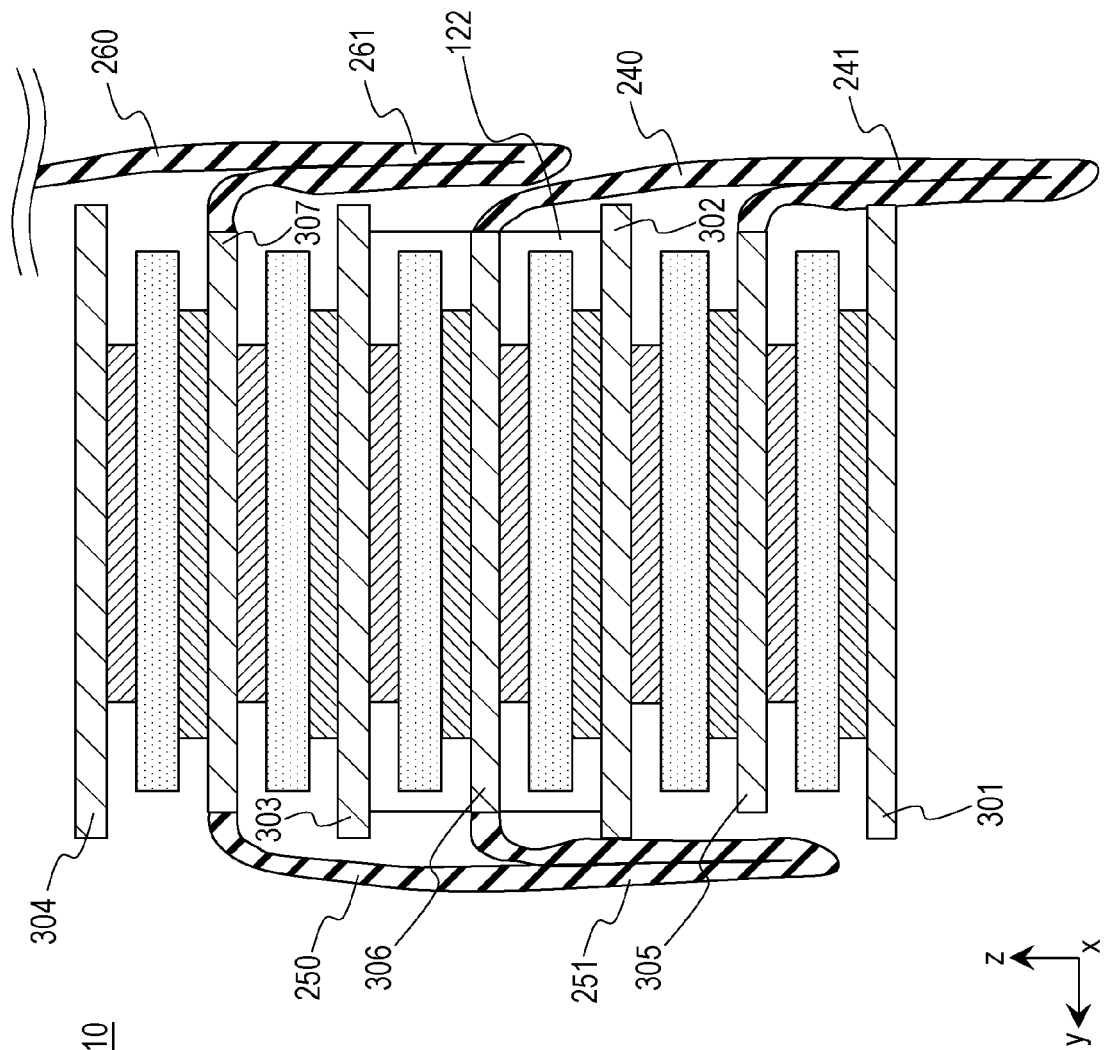
FIG. 29 is a schematic y-z view (sectional view) of a battery according to the second embodiment.

FIG. 29 is a schematic y-z view (sectional view) of a battery 2610 according to the second embodiment.

As illustrated in FIGS. 27, 28, and 29, the second insulator 120 may include a sixth bent portion 260 that is linked to the seventh electrolyte portion 307.

In this case, as illustrated in FIGS. 27, 28, and 29, the fourth bent portion 240 and the sixth bent portion 260 may contact each other.

With the structure described above, while the fourth bent portion 240 covers side surfaces of components that are interposed between the fifth electrolyte portion 305 and the sixth electrolyte portion 306, at least one of the fourth bent portion 240 and the sixth bent portion 260 can cover side surfaces of components that are interposed between the sixth electrolyte portion 306 and the seventh electrolyte portion 307. In other words, at least one of the fourth bent portion 240 and the sixth bent portion 260 can cover side surfaces of components that are interposed between the sixth electrolyte portion 306 and the seventh electrolyte portion 307, the side surfaces being different from side surfaces that are covered by the fifth bent portion 250. Thus, the fourth bent portion 240 and the sixth bent portion 260 can prevent contact between a member that may exist outside the battery (such as another battery) and side surfaces of components that are interposed between the fifth electrolyte portion 305 and the seventh electrolyte portion 307. Moreover, because the fourth bent portion 240 and the sixth bent portion 260 cover a part of the side surface of the battery, even if a part of components of the battery crumbles and falls, the fourth bent portion 240 and the sixth bent portion 260 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

As illustrated in FIGS. 27 and 29, the sixth bent portion 260 may include a sixth protruding portion 261.

As illustrated in FIGS. 27 and 29, the sixth protruding portion 261 is a portion (of the sixth bent portion 260) that protrudes beyond the seventh electrolyte portion 307 toward a side on which the sixth counter-electrode layer 526 is disposed.

As illustrated in FIG. 27, the fourth protruding portion 242 may contact the sixth protruding portion 261, and thereby the fourth bent portion 240 and the sixth bent portion 260 may contact each other.

Alternatively, as illustrated in FIG. 28, the fourth protruding portion 242 may contact the sixth bent portion 260, and thereby the fourth bent portion 240 and the sixth bent portion 260 may contact each other.

Alternatively, as illustrated in FIG. 29, the fourth bent portion 240 may contact the sixth protruding portion 261, and thereby the fourth bent portion 240 and the sixth bent portion 260 may contact each other.

A battery manufacturing method of manufacturing a battery according to the second embodiment will be described below as a fifth embodiment.

Third Embodiment

Hereinafter, a third embodiment will be described. Descriptions that overlap those of the first or second embodiment will be omitted as appropriate.

Figure 30:
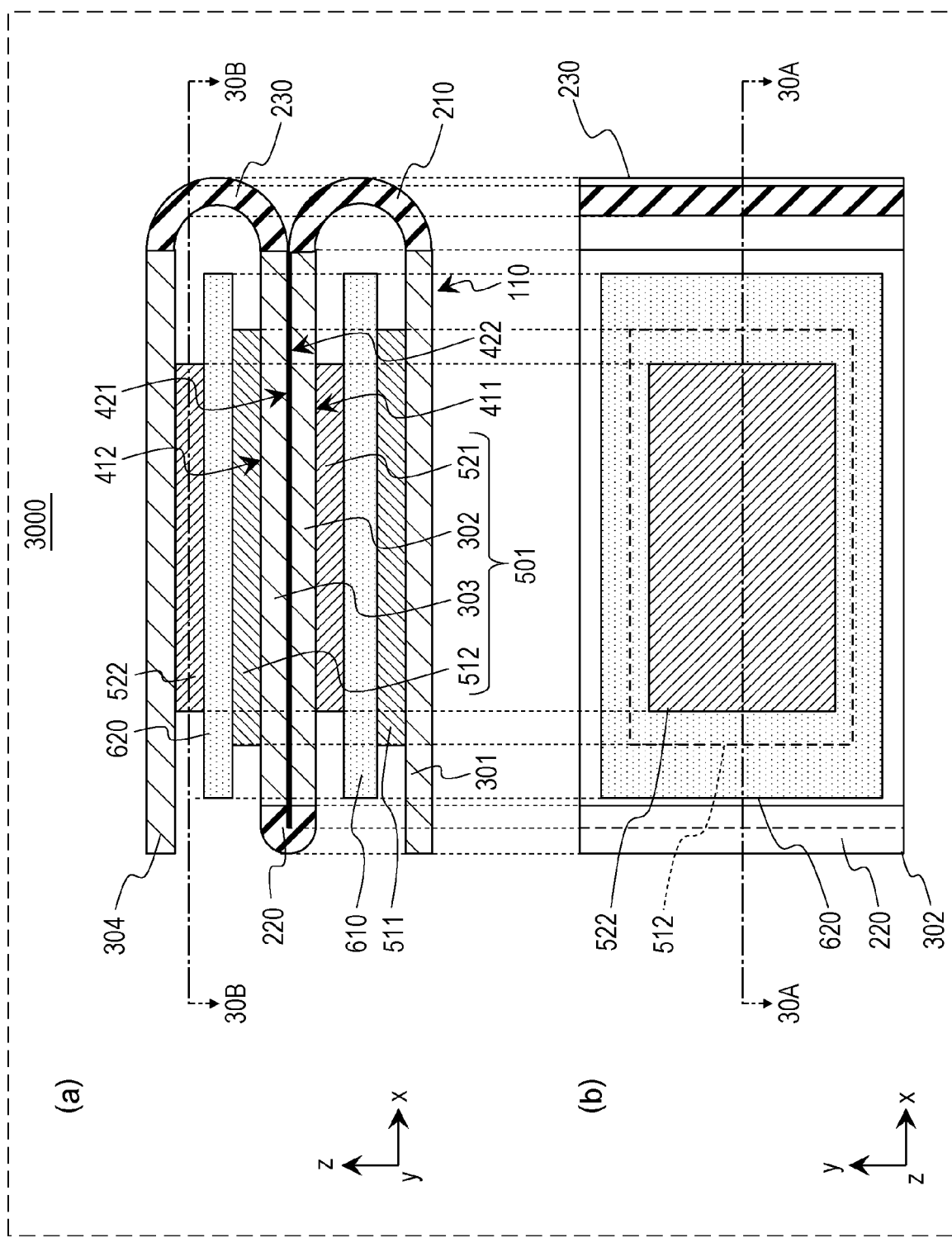
FIG. 30 schematically illustrates a battery according to a third embodiment.

FIG. 30 schematically illustrates a battery 3000 according to the third embodiment.

FIG. 30(a) is a schematic x-z view (sectional view taken along line 30A-30A) of the battery 3000 according to the third embodiment.

FIG. 30(b) is a schematic x-y view (sectional view taken along line 30B-30B) of the battery 3000 according to the third embodiment.

The battery 3000 according to the third embodiment further includes the following components, in addition to the components of the battery 1000 according to the first embodiment.

That is, in the battery 3000 according to the third embodiment, the first insulator 110 includes a third electrolyte portion 303 and a second bent portion 220.

The second bent portion 220 is positioned between the second electrolyte portion 302 and the third electrolyte portion 303.

The first insulator 110 is bent at the second bent portion 220. Thus, the second electrolyte portion 302 and the third electrolyte portion 303 are positioned facing each other.

The battery 3000 according to the third embodiment further includes a second electrode layer 512.

The second electrolyte portion 302 includes a first front-surface region 411 and a first back-surface region 421.

The first back-surface region 421 is a region positioned on the back side of the first front-surface region 411.

The first counter-electrode layer 521 is disposed in contact with the first front-surface region 411.

The third electrolyte portion 303 includes a second front-surface region 412 and a second back-surface region 422.

The second back-surface region 422 is a region positioned on the back side of the second front-surface region 412.

The second electrode layer 512 is disposed in contact with the second front-surface region 412.

The first insulator 110 is bent at the second bent portion 220. Thus, the first back-surface region 421 and the second back-surface region 422 are positioned facing each other.

The first back-surface region 421 and the second back-surface region 422 contact each other.

With the structure described above, bonding strength between the components of the battery can be further increased. That is, the first counter-electrode layer 521 and the second electrode layer 512 can be respectively disposed on the second electrolyte portion 302 and the third electrolyte portion 303 (that is, two partial regions of the first insulator 110 and that are linked to each other by the second bent portion 220). Thus, the second bent portion 220 (in other words, the first insulator 110, which is a single component) can securely maintain the positional relationship between the first counter-electrode layer 521, which is disposed on the first front-surface region 411, and the second electrode layer 512, which is disposed on the second front-surface region 412. Accordingly, for example, when forming a stacked battery by using the first insulator 110, the first insulator 110 can securely link two battery cells (battery elements) of the stacked battery to each other. Thus, for example, it is possible to prevent displacement or separation of layers (or battery elements) of the battery, which may occur due to an impact, vibration, or the like when manufacturing or using the battery. That is, the first insulator 110 can increase the bonding strength between layers (or battery elements) of the battery. Thus, the reliability of the battery can be improved.

Moreover, with the structure described above, the first bent portion 210 can cover a side surface of the battery where the first bent portion 210 is positioned. Thus, the first bent portion 210 can prevent contact between a member that may exist outside the battery (such as another battery) and the side surface of the battery where the first bent portion 210 is positioned. Accordingly, a short circuit due to contact between batteries can be suppressed. Moreover, it is possible to suppress partial destruction of the side surface of the battery due to contact between the battery and a member that may exist outside the battery. Because the first bent portion 210 covers a part of the side surface of the battery, even if a part of a component of the battery (such as an electrode material included in the first electrode layer 511 or a counter-electrode material included in the first counter-electrode layer 521) crumbles and falls, the first bent portion 210 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

The battery 3000 according to the third embodiment may further include a second counter-electrode layer 522.

The second counter-electrode layer 522 is a counter electrode for the first electrode layer 511 and the second electrode layer 512.

The first insulator 110 may include a fourth electrolyte portion 304 and a third bent portion 230.

The third bent portion 230 is positioned between the third electrolyte portion 303 and the fourth electrolyte portion 304.

The second counter-electrode layer 522 is disposed in contact with the fourth electrolyte portion 304.

The first insulator 110 is bent at the third bent portion 230. Thus, the second electrode layer 512 and the second counter-electrode layer 522 are positioned facing each other.

With the structure described above, bonding strength between the components of the battery can be further increased. That is, the second electrode layer 512 and the second counter-electrode layer 522 can be respectively disposed on the third electrolyte portion 303 and the fourth electrolyte portion 304, which are linked to each other by the third bent portion 230. Thus, the third bent portion 230 (in other words, the first insulator 110, which is a single component) can securely maintain the positional relationship between the second electrode layer 512, which is disposed on the third electrolyte portion 303, and the second counter-electrode layer 522, which is disposed on the fourth electrolyte portion 304. Thus, for example, it is possible to prevent displacement or separation of layers (such as the second electrode layer 512 and the second counter-electrode layer 522) of the battery, which may occur due to an impact, vibration, or the like when manufacturing or using the battery.

Moreover, with the structure described above, the third bent portion 230 can cover a side surface of the battery where the third bent portion 230 is positioned. Thus, the third bent portion 230 can prevent contact between a member that may exist outside the battery (such as another battery) and the side surface of the battery where the third bent portion 230 is positioned. Accordingly, a short circuit due to contact between batteries can be suppressed. Moreover, it is possible to suppress partial destruction of the side surface of the battery due to contact between the battery and a member that may exist outside the battery. Because the third bent portion 230 covers a part of the side surface of the battery, even if a part of a component of the battery (such as an electrode material included in the second electrode layer 512 or a counter-electrode material included in the second counter-electrode layer 522) crumbles and falls, the third bent portion 230 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

The battery 3000 according to the third embodiment may further include a first current collector 610 and a second current collector 620.

The first current collector 610 is disposed between the first electrode layer 511 and the first counter-electrode layer 521 and in contact with the first electrode layer 511 and the first counter-electrode layer 521.

The second current collector 620 is disposed between the second electrode layer 512 and the second counter-electrode layer 522 and in contact with the second electrode layer 512 and the second counter-electrode layer 522.

With the structure described above, it is possible to stack a power generation element including the second electrode layer 512 and the first counter-electrode layer 521 (a first power generation element 501) and another power generation element (such as a power generation element including the first electrode layer 511 or the second counter-electrode layer 522) in series via the first current collector 610 and the second current collector 620.

Figure 31:
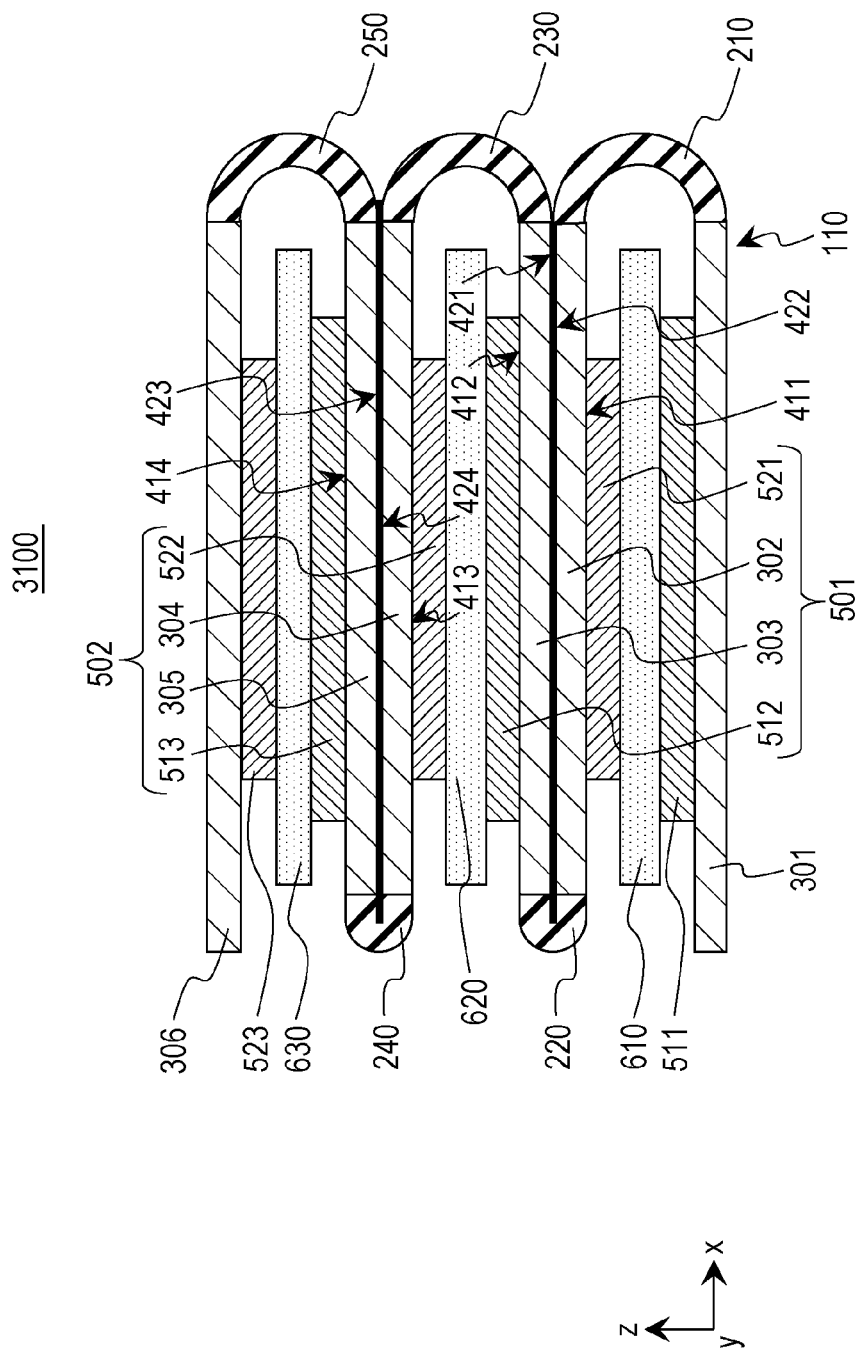
FIG. 31 is a schematic x-z view (sectional view) of a battery according to the third embodiment.

FIG. 31 is a schematic x-z view (sectional view) of a battery 3100 according to the third embodiment.

The battery 3100 according to the third embodiment further includes the following components, in addition to the components of the battery 3000 according to the third embodiment.

That is, the battery 3100 according to the third embodiment further includes a third electrode layer 513 and a third counter-electrode layer 523.

The third counter-electrode layer 523 is a counter electrode for the first electrode layer 511, the second electrode layer 512, and the third electrode layer 513.

The first insulator 110 includes a fifth electrolyte portion 305, a sixth electrolyte portion 306, a fourth bent portion 240, and a fifth bent portion 250.

The fourth bent portion 240 is positioned between the fourth electrolyte portion 304 and the fifth electrolyte portion 305.

The fifth bent portion 250 is positioned between the fifth electrolyte portion 305 and the sixth electrolyte portion 306.

The fourth electrolyte portion 304 includes a third front-surface region 413 and a third back-surface region 423.

The third back-surface region 423 is a region positioned on the back side of the third front-surface region 413.

The second counter-electrode layer 522 is disposed in contact with the third front-surface region 413.

The fifth electrolyte portion 305 includes a fourth front-surface region 414 and a fourth back-surface region 424.

The fourth back-surface region 424 is a region positioned on the back side of the fourth front-surface region 414.

The first insulator 110 is bent at the fourth bent portion 240. Thus, the third back-surface region 423 and the fourth back-surface region 424 are positioned facing each other.

The third back-surface region 423 and the fourth back-surface region 424 contact each other.

The third electrode layer 513 is disposed in contact with the fourth front-surface region 414.

The third counter-electrode layer 523 is disposed in contact with the sixth electrolyte portion 306.

The first insulator 110 is bent at the fifth bent portion 250. Thus, the third electrode layer 513 and the third counter-electrode layer 523 are positioned facing each other.

With the structure described above, bonding strength between the components of the battery can be further increased. That is, the second counter-electrode layer 522 and the third electrode layer 513 can be respectively disposed on the fourth electrolyte portion 304 and the fifth electrolyte portion 305, which are linked to each other by the fourth bent portion 240. Thus, the fourth bent portion 240 (in other words, the first insulator 110, which is a single component) can securely maintain the positional relationship between the second counter-electrode layer 522, which is disposed on the fourth electrolyte portion 304, and the third electrode layer 513, which is disposed on the fifth electrolyte portion 305. Thus, for example, it is possible to prevent displacement or separation of layers (such as the third electrode layer 513 and the second counter-electrode layer 522) of the battery, which may occur due to an impact, vibration, or the like when manufacturing or using the battery.

Moreover, with the structure described above, the fifth bent portion 250 can cover a side surface of the battery where the fifth bent portion 250 is positioned. Thus, the fifth bent portion 250 can prevent contact between a member that may exist outside the battery (such as another battery) and the side surface of the battery where the fifth bent portion 250 is positioned. Accordingly, a short circuit due to contact between batteries can be suppressed. Moreover, it is possible to suppress partial destruction of the side surface of the battery due to contact between the battery and a member that may exist outside the battery. Because the fifth bent portion 250 covers a part of the side surface of the battery, even if a part of a component of the battery (such as an electrode material included in the third electrode layer 513 or a counter-electrode material included in the third counter-electrode layer 523) crumbles and falls, the fifth bent portion 250 can suppress movement of the fallen component to another electric cell portion inside the battery or to the outside of the battery. Accordingly, a short circuit inside the battery, which may occur due to crumbling and falling of a component of the battery, can be suppressed. As a result, the reliability of the battery can be further improved.

The battery 3100 according to the third embodiment may further include a first current collector 610, a second current collector 620, and a third current collector 630.

The first current collector 610 is disposed between the first electrode layer 511 and the first counter-electrode layer 521 and in contact with the first electrode layer 511 and the first counter-electrode layer 521.

The second current collector 620 is disposed between the second electrode layer 512 and the second counter-electrode layer 522 and in contact with the second electrode layer 512 and the second counter-electrode layer 522.

The third current collector 630 is disposed between the third electrode layer 513 and the third counter-electrode layer 523 and in contact with the third electrode layer 513 and the third counter-electrode layer 523.

With the structure described above, it is possible to form a stacked battery by using the first insulator 110. That is, it is possible to stack a first power generation element 501, which includes the second electrode layer 512 and the first counter-electrode layer 521, and a second power generation element 502, which includes the third electrode layer 513 and the second counter-electrode layer 522, in series via the second current collector 620. That is, it is possible to increase the voltage of the battery by connecting the first power generation element 501 and the second power generation element 502 in series, while the bent portions of the first insulator 110 securely maintain the positional relationship between the first power generation element 501 and the second power generation element 502.

As illustrated in FIG. 31, the length of each of the second bent portion 220 and the fourth bent portion 240 may be smaller than the length of each of the first bent portion 210, the third bent portion 230, and the fifth bent portion 250. Alternatively, the length of each of the second bent portion 220 and the fourth bent portion 240 may be equal to or larger than the length of each of the first bent portion 210, the third bent portion 230, and the fifth bent portion 250.

The second electrolyte portion 302 and the third electrolyte portion 303 may have the same characteristics (such as thickness, area, shape, and materials) or may have different characteristics.

The fourth electrolyte portion 304 and the fifth electrolyte portion 305 may have the same characteristics (such as thickness, area, shape, and materials) or may have different characteristics.

As illustrated in FIG. 31, at least one (for example, each) of the second electrolyte portion 302 and the third electrolyte portion 303 may be disposed in an area larger than a corresponding one of the first current collector 610 and the second current collector 620. Thus, at least one of the second electrolyte portion 302 and the third electrolyte portion 303 can prevent a short circuit between the first current collector 610 and the second current collector 620.

As illustrated in FIG. 31, at least one (for example, each) of the fourth electrolyte portion 304 and the fifth electrolyte portion 305 may be disposed in an area larger than a corresponding one of the second current collector 620 and the third current collector 630. Thus, at least one of the fourth electrolyte portion 304 and the fifth electrolyte portion 305 can prevent a short circuit between the second current collector 620 and the third current collector 630.

Figure 32:
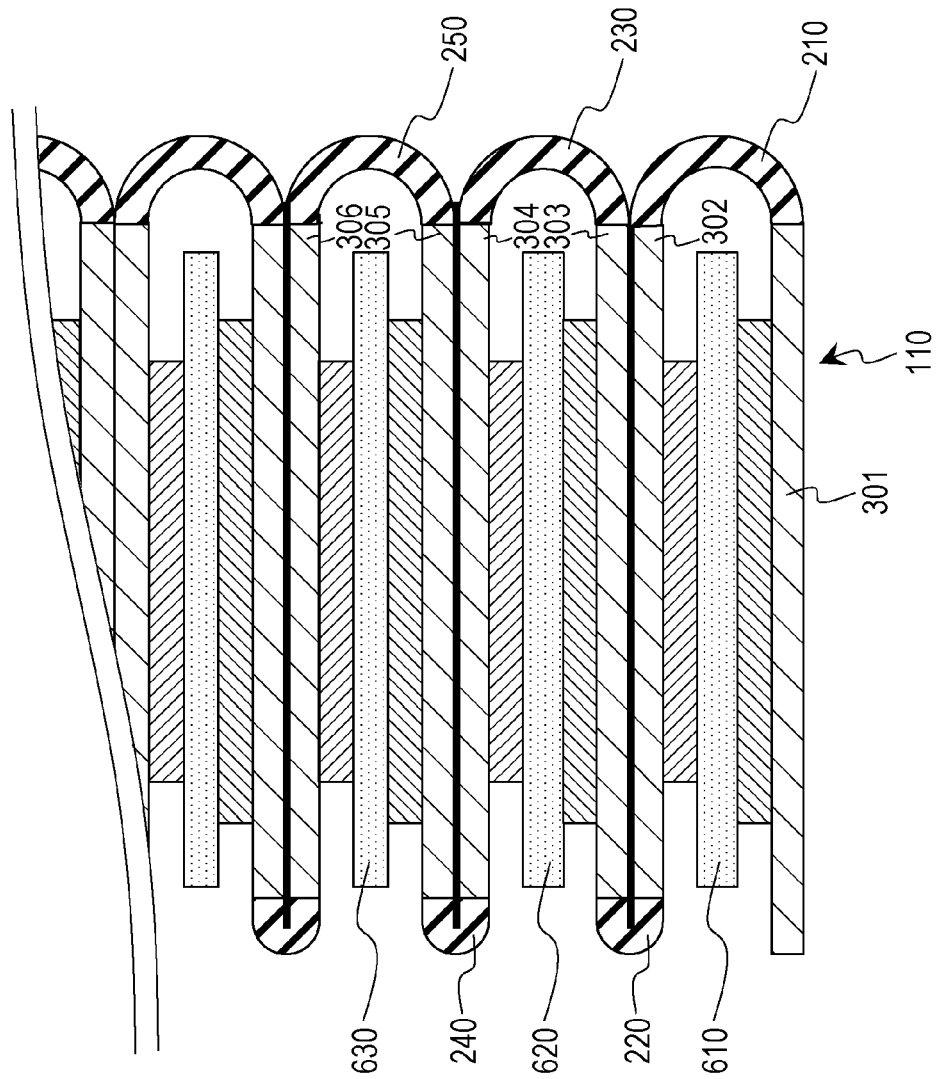
FIG. 32 is a schematic sectional view of a battery according to the third embodiment.

FIG. 32 is a schematic sectional view of a battery 3200 according to the third embodiment.

In the third embodiment, as illustrated in FIG. 32, a battery may be formed by stacking four or more power generation elements.

The battery 3200 illustrated in FIG. 32 includes a fourth power generation element and other power generation elements stacked on the third current collector 630. For example, a high voltage can be obtained by using a bipolar battery including a plurality of power generation elements (electric cells) that are connected in series.

The number of power generation elements that are stacked in the battery according to the third embodiment may be, for example, in the range of 2 to 200. By adjusting the number of power generation elements that are stacked, it is possible to adjust the output power in accordance with use of the battery (such as use in an electronic device, an electric device, an electric vehicle, or a stationary storage battery).

Figure 33:
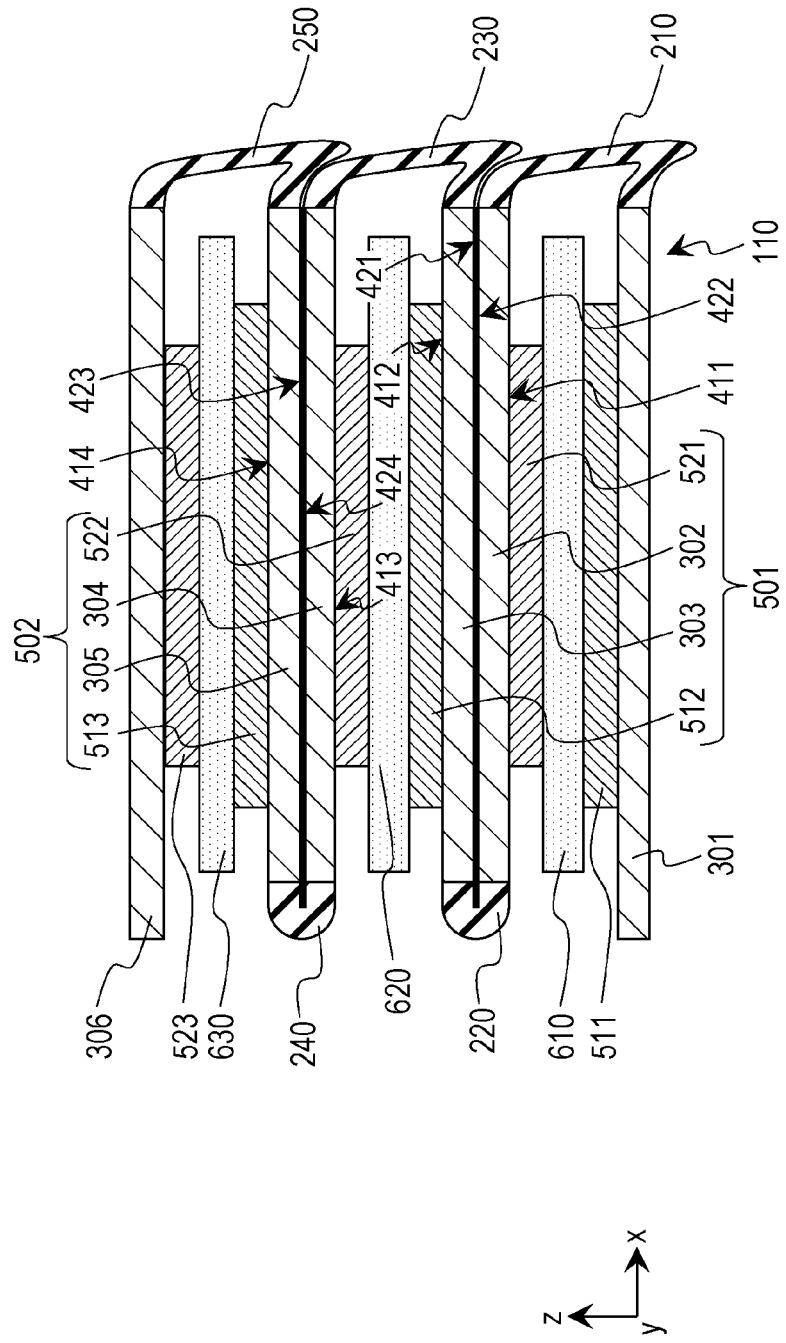
FIG. 33 is a schematic sectional view of a battery according to the third embodiment.

FIG. 33 is a schematic sectional view of a battery 3300 according to the third embodiment.

In the third embodiment, as illustrated in FIG. 33, a plurality of bent portions (such as the first bent portion 210, the third bent portion 230, and the fifth bent portion 250) may be bent to be bonded to each other. Thus, the plurality of bent portions can be integrated into a wall-like portion. Therefore, it is possible to more securely maintain a structure in which a plurality of power generation elements are connected in series.

A battery manufacturing method of manufacturing a battery according to the third embodiment will be described below as a fifth embodiment.

Fourth Embodiment

Hereinafter, a fourth embodiment will be described. Descriptions that overlap those of any of the first to third embodiments will be omitted as appropriate.

Figure 34:
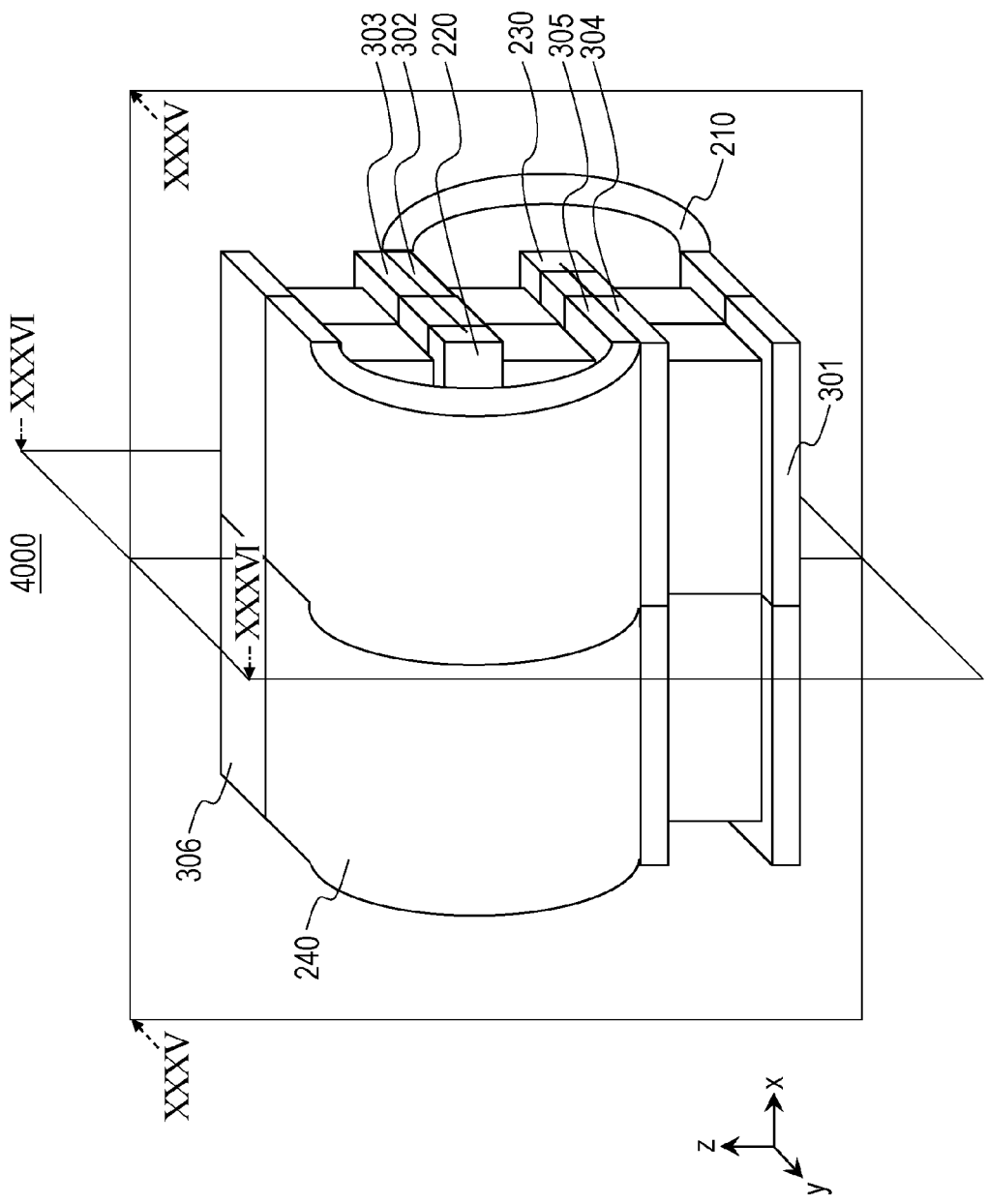
FIG. 34 is a schematic perspective view of a battery according to a fourth embodiment.

FIG. 34 is a schematic perspective view of a battery 4000 according to the fourth embodiment.

Figure 35:
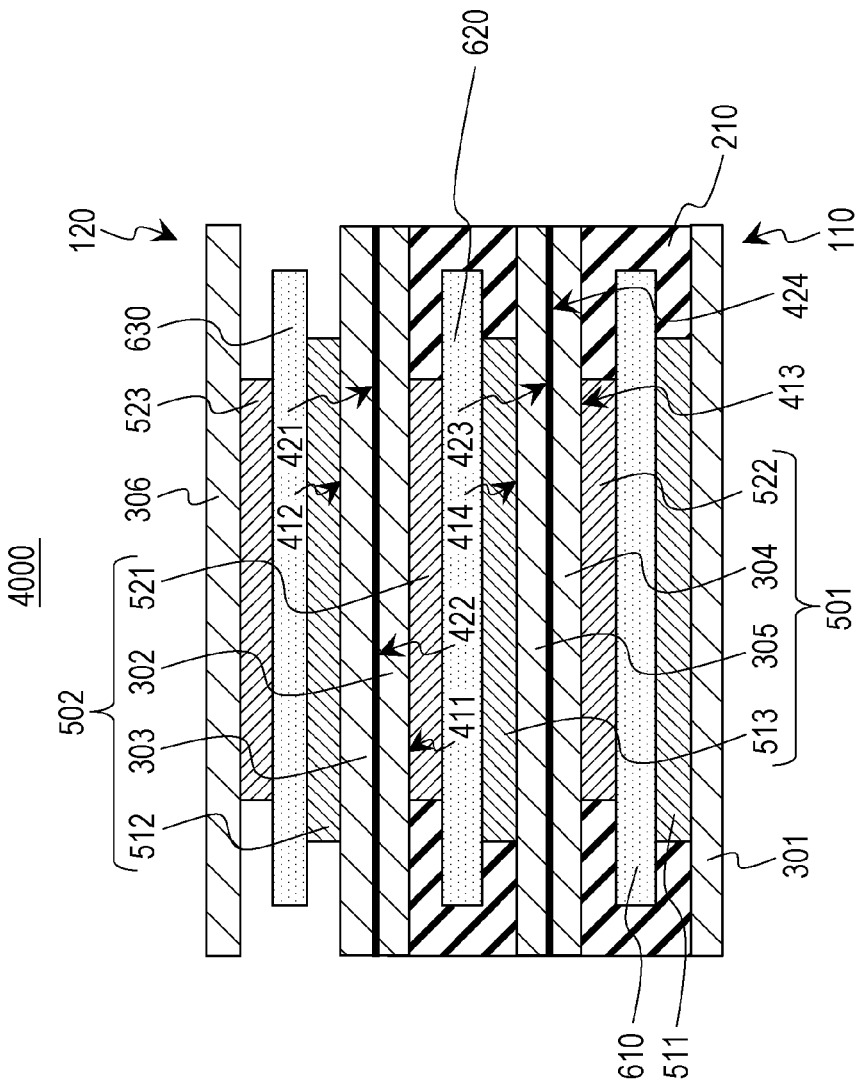
FIG. 35 is a schematic x-z view (sectional view taken along plane XXXV-XXXV in FIG. 34) of the battery according to the fourth embodiment.

FIG. 35 is a schematic x-z view (sectional view taken along plane XXXV-XXXV in FIG. 34) of the battery 4000 according to the fourth embodiment.

Figure 36:
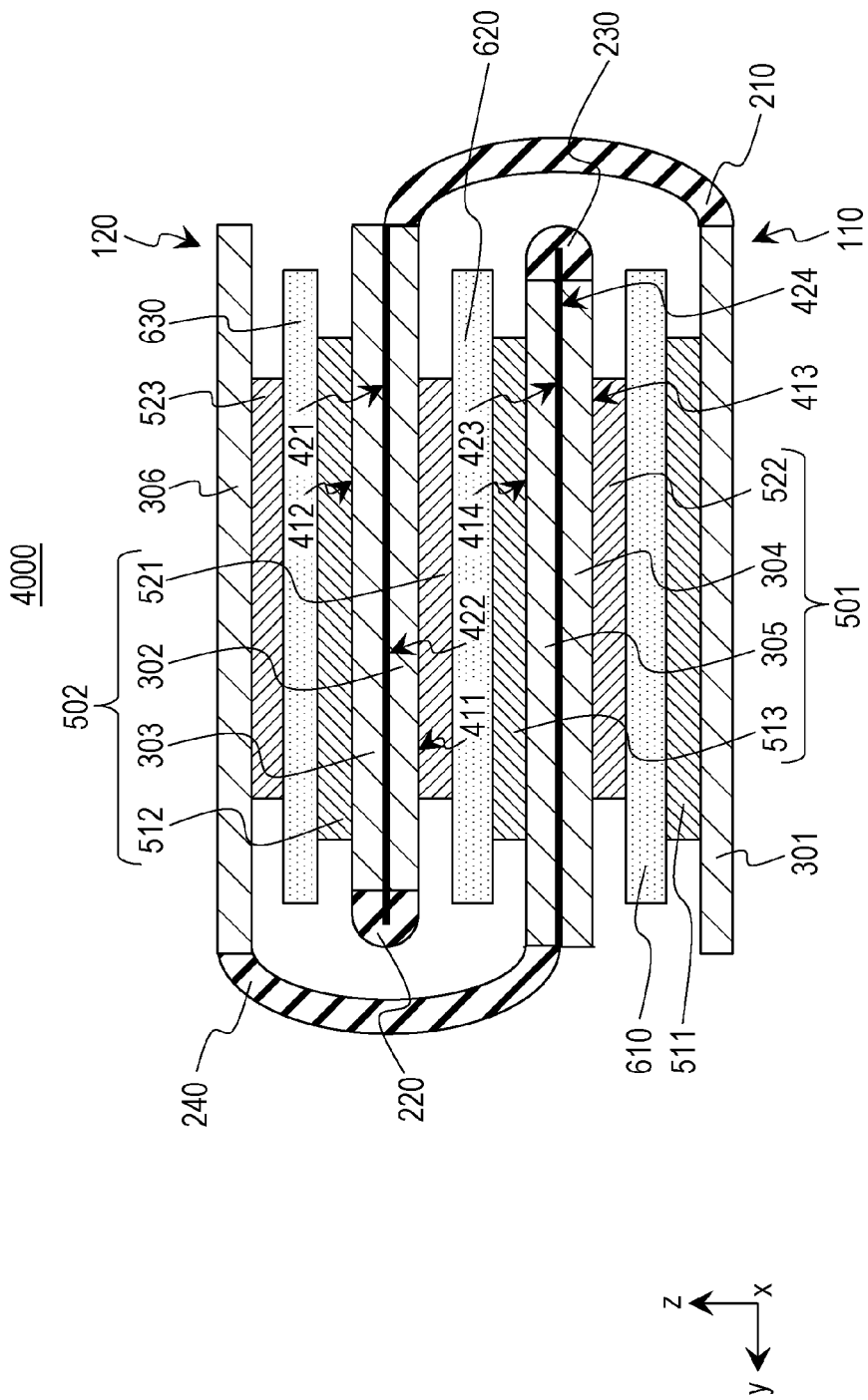
FIG. 36 is a schematic y-z view (sectional view taken along plane XXXVI-XXXVI in FIG. 34) of the battery according to the fourth embodiment.

FIG. 36 is a schematic y-z view (sectional view taken along plane XXXVI-XXXVI in FIG. 34) of the battery 4000 according to the fourth embodiment.

The battery 4000 according to the fourth embodiment further includes the following components, in addition to the components of the battery 3000 according to the third embodiment.

That is, the battery 4000 according to the fourth embodiment further includes a second insulator 120, a second counter-electrode layer 522, a third electrode layer 513, and a third counter-electrode layer 523.

The second counter-electrode layer 522 and the third counter-electrode layer 523 are counter electrodes for the first electrode layer 511, the second electrode layer 512, and the third electrode layer 513.

The second insulator 120 includes a fourth electrolyte portion 304, a fifth electrolyte portion 305, a sixth electrolyte portion 306, a third bent portion 230, and a fourth bent portion 240.

The third bent portion 230 is positioned between the fourth electrolyte portion 304 and the fifth electrolyte portion 305.

The fourth bent portion 240 is positioned between the fifth electrolyte portion 305 and the sixth electrolyte portion 306.

The fourth electrolyte portion 304 includes a third front-surface region 413 and a third back-surface region 423.

The third back-surface region 423 is a region positioned on the back side of the third front-surface region 413.

The fifth electrolyte portion 305 includes a fourth front-surface region 414 and a fourth back-surface region 424.

The fourth back-surface region 424 is a region positioned on the back side of the fourth front-surface region 414.

The second insulator 120 is bent at the third bent portion 230. Thus, the third back-surface region 423 and the fourth back-surface region 424 are positioned facing each other.

The fourth electrolyte portion 304 and the fifth electrolyte portion 305 are disposed between the first electrolyte portion 301 and the second electrolyte portion 302.

The second counter-electrode layer 522 is disposed in contact with the third front-surface region 413 and at a position facing the first electrode layer 511.

The third electrode layer 513 is disposed in contact with the fourth front-surface region 414 and at a position facing the first counter-electrode layer 521.

The third counter-electrode layer 523 is disposed in contact with the sixth electrolyte portion 306.

The second insulator 120 is bent at the fourth bent portion 240. Thus, the second electrode layer 512 and the third counter-electrode layer 523 are positioned facing each other.

With the structure described above, bonding strength between the components of the battery can be further increased. That is, the third electrode layer 513 and the third counter-electrode layer 523 can be respectively disposed on the fifth electrolyte portion 305 and the sixth electrolyte portion 306, which are linked to each other by the fourth bent portion 240. Moreover, the second counter-electrode layer 522 and the third electrode layer 513 can be respectively disposed on the fourth electrolyte portion 304 and the fifth electrolyte portion 305 (that is, two partial regions of the second insulator 120 that are linked to each other by the third bent portion 230). Thus, the first to fourth bent portions 210 to 240 can securely link the electrode layers and the counter-electrode layers to each other. Therefore, it is possible to realize a battery in which the first power generation element 501 (that is, a power generation element including the third electrode layer 513 and the second counter-electrode layer 522) and the second power generation element 502 (that is, a power generation element including the second electrode layer 512 and the first counter-electrode layer 521) are connected in series while securely linking the first power generation element 501 and the second power generation element 502 to each other.

Moreover, with the structure described above, the fourth bent portion 240 can cover a side surface of the battery where the fourth bent portion 240 is positioned (that is, a side surface different from a side surface where the first bent portion 210 is positioned). Thus, the first bent portion 210 and the fourth bent portion 240 can cover a larger number of side surfaces of the battery. Therefore, the reliability of the battery can be further improved.

In the battery 4000 according to the fourth embodiment, the third back-surface region 423 and the fourth back-surface region 424 may be in contact with each other.

The battery 4000 according to the fourth embodiment may further include a first current collector 610, a second current collector 620, and a third current collector 630.

The first current collector 610 is disposed between the first electrode layer 511 and the second counter-electrode layer 522 and in contact with the first electrode layer 511 and the second counter-electrode layer 522.

The second current collector 620 is disposed between the third electrode layer 513 and the first counter-electrode layer 521 and in contact with the third electrode layer 513 and the first counter-electrode layer 521.

The third current collector 630 is disposed between the second electrode layer 512 and the third counter-electrode layer 523 and in contact with the second electrode layer 512 and the third counter-electrode layer 523.

With the structure described above, the power generation elements can be stacked on top of each other in series via the current collectors.

Figure 37:
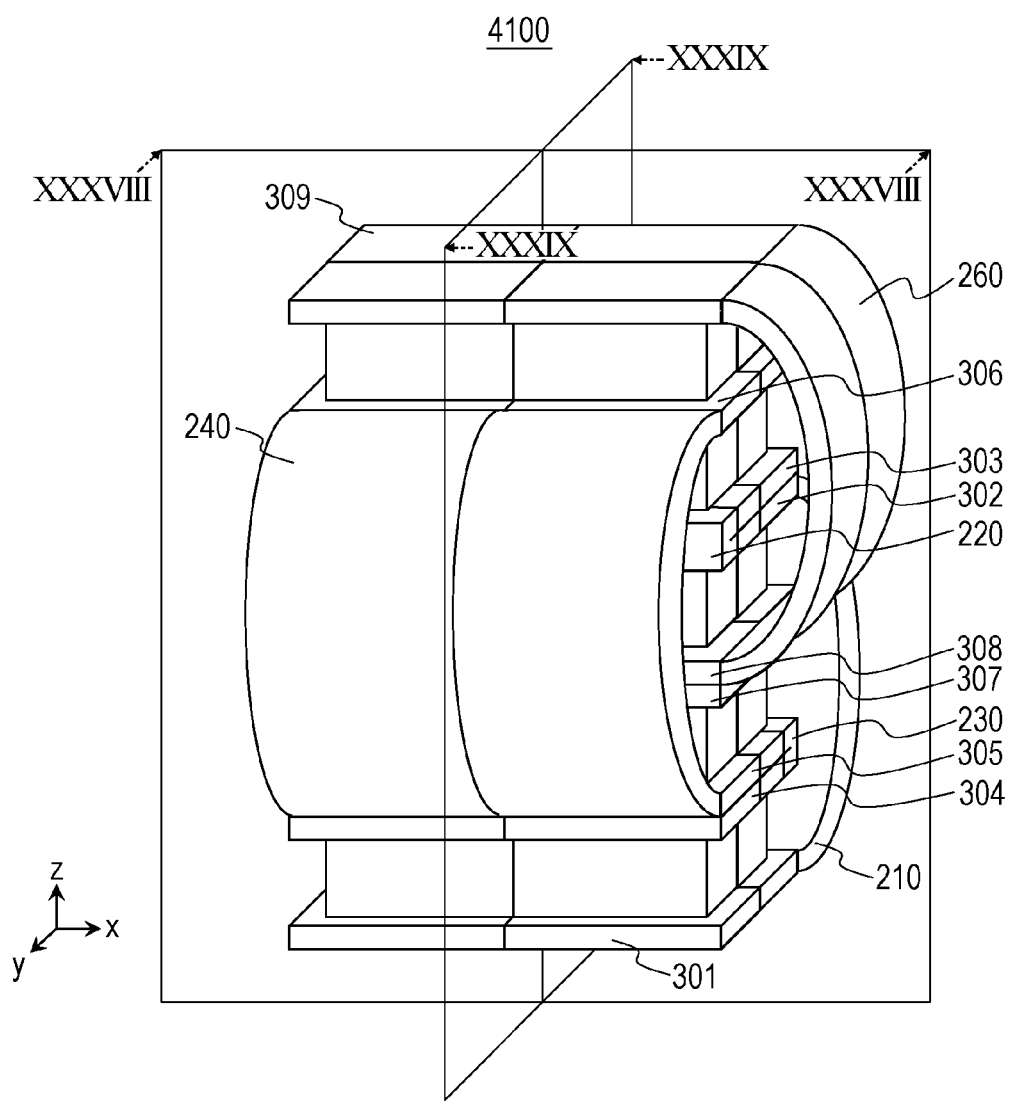
FIG. 37 is a schematic perspective view of a battery according to the fourth embodiment.

FIG. 37 is a schematic perspective view of a battery 4100 according to the fourth embodiment.

Figure 38:
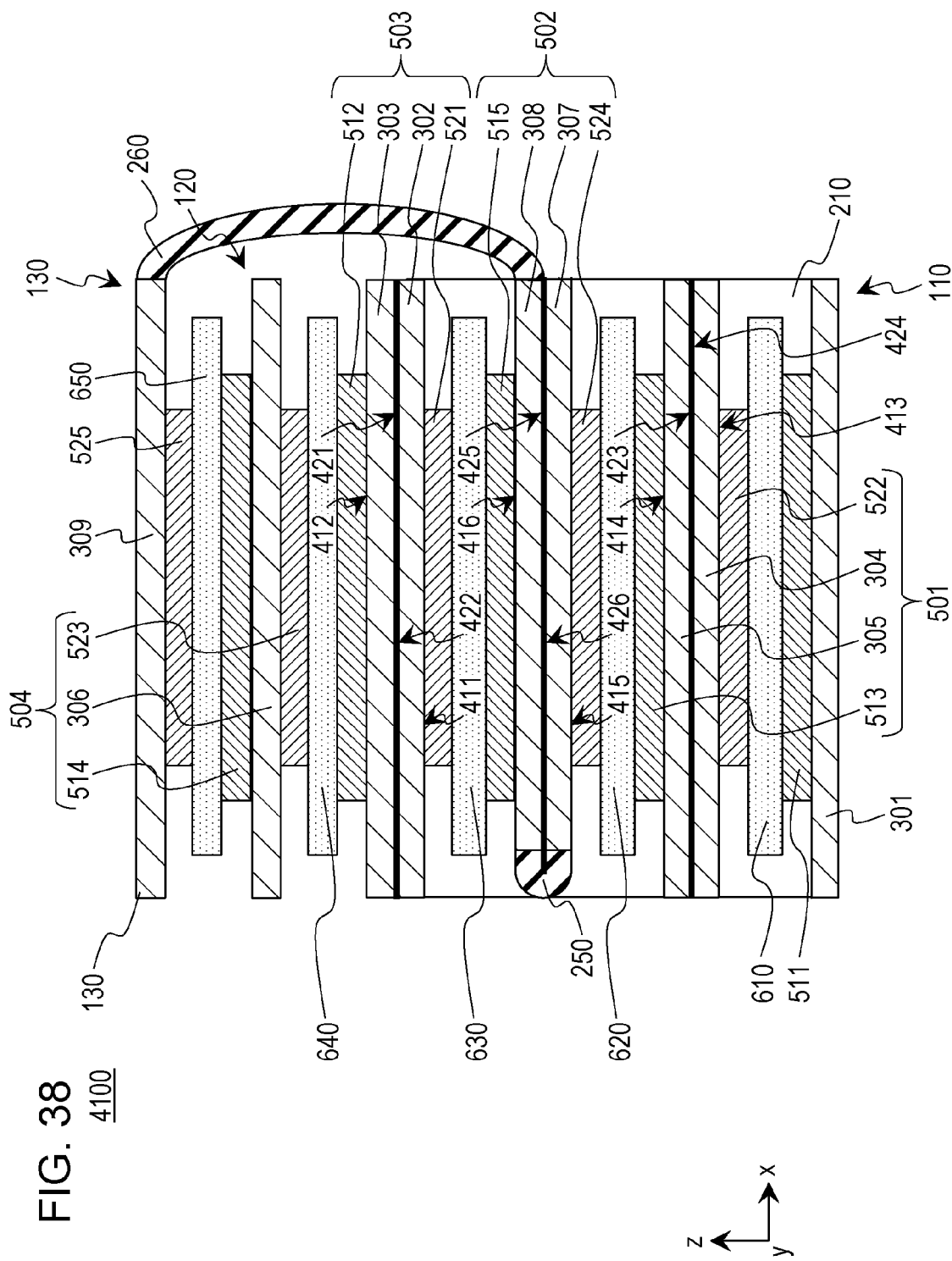
FIG. 38 is a schematic x-z view (sectional view taken along plane XXXVIII-XXXVIII in FIG. 37) of the battery according to the fourth embodiment.

FIG. 38 is a schematic x-z view (sectional view taken along plane XXXVIII-XXXVIII in FIG. 37) of the battery 4100 according to the fourth embodiment.

Figure 39:
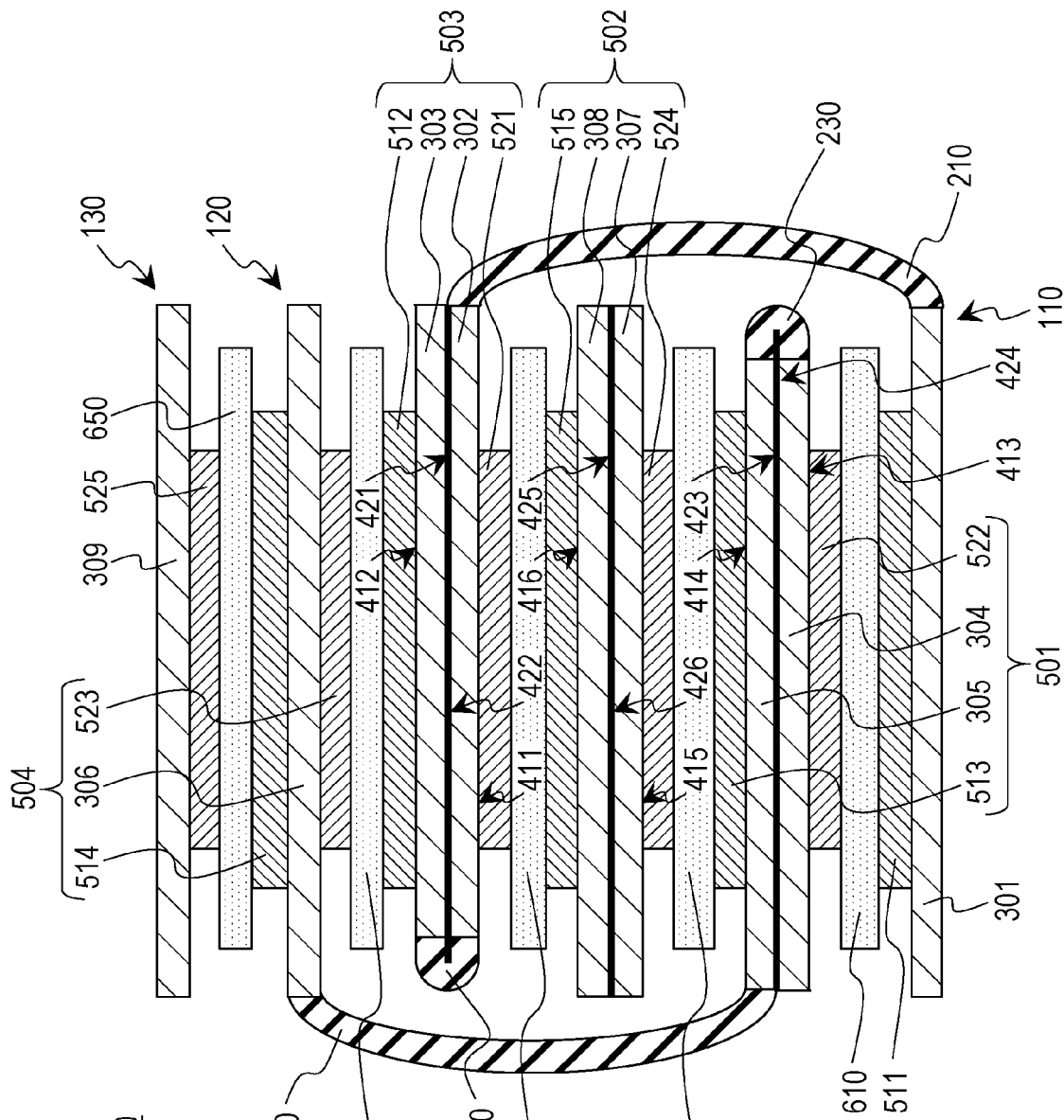
FIG. 39 is a schematic y-z view (sectional view taken along plane XXXIX-XXXIX in FIG. 37) of the battery according to the fourth embodiment.

FIG. 39 is a schematic y-z view (sectional view taken along plane XXXIX-XXXIX in FIG. 37) of the battery 4100 according to the fourth embodiment.

The battery 4100 according to the fourth embodiment further includes the following components, in addition to the components of the battery 4000 according to the fourth embodiment.

That is, the battery 4100 according to the fourth embodiment includes a third insulator 130, a fourth electrode layer 514, a fourth counter-electrode layer 524, a fifth electrode layer 515, and a fifth counter-electrode layer 525.

The fourth counter-electrode layer 524 and the fifth counter-electrode layer 525 are counter electrodes for the first electrode layer 511, the second electrode layer 512, the third electrode layer 513, the fourth electrode layer 514, and the fifth electrode layer 515.

The third insulator 130 includes a seventh electrolyte portion 307, an eighth electrolyte portion 308, a ninth electrolyte portion 309, a fifth bent portion 250, and a sixth bent portion 260.

The fifth bent portion 250 is positioned between the seventh electrolyte portion 307 and the eighth electrolyte portion 308.

The sixth bent portion 260 is positioned between the eighth electrolyte portion 308 and the ninth electrolyte portion 309.

The seventh electrolyte portion 307 includes a fifth front-surface region 415 and a fifth back-surface region 425.

The fifth back-surface region 425 is a region positioned on the back side of the fifth front-surface region 415.

The eighth electrolyte portion 308 includes a sixth front-surface region 416 and a sixth back-surface region 426.

The sixth back-surface region 426 is a region positioned on the back side of the sixth front-surface region 416.

The third insulator 130 is bent at the fifth bent portion 250. Thus, the fifth back-surface region 425 and the sixth back-surface region 426 are positioned facing each other.

The seventh electrolyte portion 307 and the eighth electrolyte portion 308 are disposed between the fifth electrolyte portion 305 and the second electrolyte portion 302.

The fourth electrode layer 514 is disposed in contact with the sixth electrolyte portion 306.

The fourth counter-electrode layer 524 is disposed in contact with the fifth front-surface region 415 and at a position facing the third electrode layer 513.

The fifth electrode layer 515 is disposed in contact with the sixth front-surface region 416 and at a position facing the first counter-electrode layer 521.

The fifth counter-electrode layer 525 is disposed in contact with the ninth electrolyte portion 309.

The third insulator 130 is bent at the sixth bent portion 260. Thus, the fourth electrode layer 514 and the fifth counter-electrode layer 525 are positioned facing each other.

With the structure described above, bonding strength between the components of the battery can be further increased. That is, the fifth electrode layer 515 and the fifth counter-electrode layer 525 can be respectively disposed on the eighth electrolyte portion 308 and the ninth electrolyte portion 309, which are linked to each other by the sixth bent portion 260. Moreover, the fourth counter-electrode layer 524 and the fifth electrode layer 515 can be respectively disposed on the seventh electrolyte portion 307 and the eighth electrolyte portion 308 (that is, two partial regions of the third insulator 130 that are linked to each other by the fifth bent portion 250). Thus, the first to sixth bent portions 210 to 260 can securely link the electrode layers and the counter-electrode layers to each other. Therefore, it is possible to realize a battery in which the first power generation element 501 (that is, a power generation element including the third electrode layer 513 and the second counter-electrode layer 522), the second power generation element 502 (that is, a power generation element including the fifth electrode layer 515 and the fourth counter-electrode layer 524), the third power generation element 503 (that is, a power generation element including the second electrode layer 512 and the first counter-electrode layer 521), and the fourth power generation element 504 (that is, a power generation element including the fourth electrode layer 514 and the third counter-electrode layer 523) are connected in series while securely linking the first to fourth power generation elements 501 to 504 to each other.

Moreover, with the structure described above, the sixth bent portion 260 can cover a side surface of the battery where the sixth bent portion 260 is positioned (that is, a side surface different from side surfaces where the first bent portion 210 and the fourth bent portion 240 are positioned). Thus, the first bent portion 210, the fourth bent portion 240, and the sixth bent portion 260 can cover a larger number of side surfaces of the battery. Therefore, the reliability of the battery can be further improved.

In the battery 4100 according to the fourth embodiment, the fifth back-surface region 425 and the sixth back-surface region 426 may be in contact with each other.

The battery 4100 according to the fourth embodiment may further include a first current collector 610, a second current collector 620, a third current collector 630, a fourth current collector 640, and a fifth current collector 650.

The first current collector 610 is disposed between the first electrode layer 511 and the second counter-electrode layer 522 and in contact with the first electrode layer 511 and the second counter-electrode layer 522.

The second current collector 620 is disposed between the third electrode layer 513 and the fourth counter-electrode layer 524 and in contact with the third electrode layer 513 and the fourth counter-electrode layer 524.

The third current collector 630 is disposed between the fifth electrode layer 515 and the first counter-electrode layer 521 and in contact with the fifth electrode layer 515 and the first counter-electrode layer 521.

The fourth current collector 640 is disposed between the second electrode layer 512 and the third counter-electrode layer 523 and in contact with the second electrode layer 512 and the third counter-electrode layer 523.

The fifth current collector 650 is disposed between the fourth electrode layer 514 and the fifth counter-electrode layer 525 and in contact with the fourth electrode layer 514 and the fifth counter-electrode layer 525.

With the structure described above, the power generation elements can be stacked on top of each other in series via the current collectors.

Figure 40:
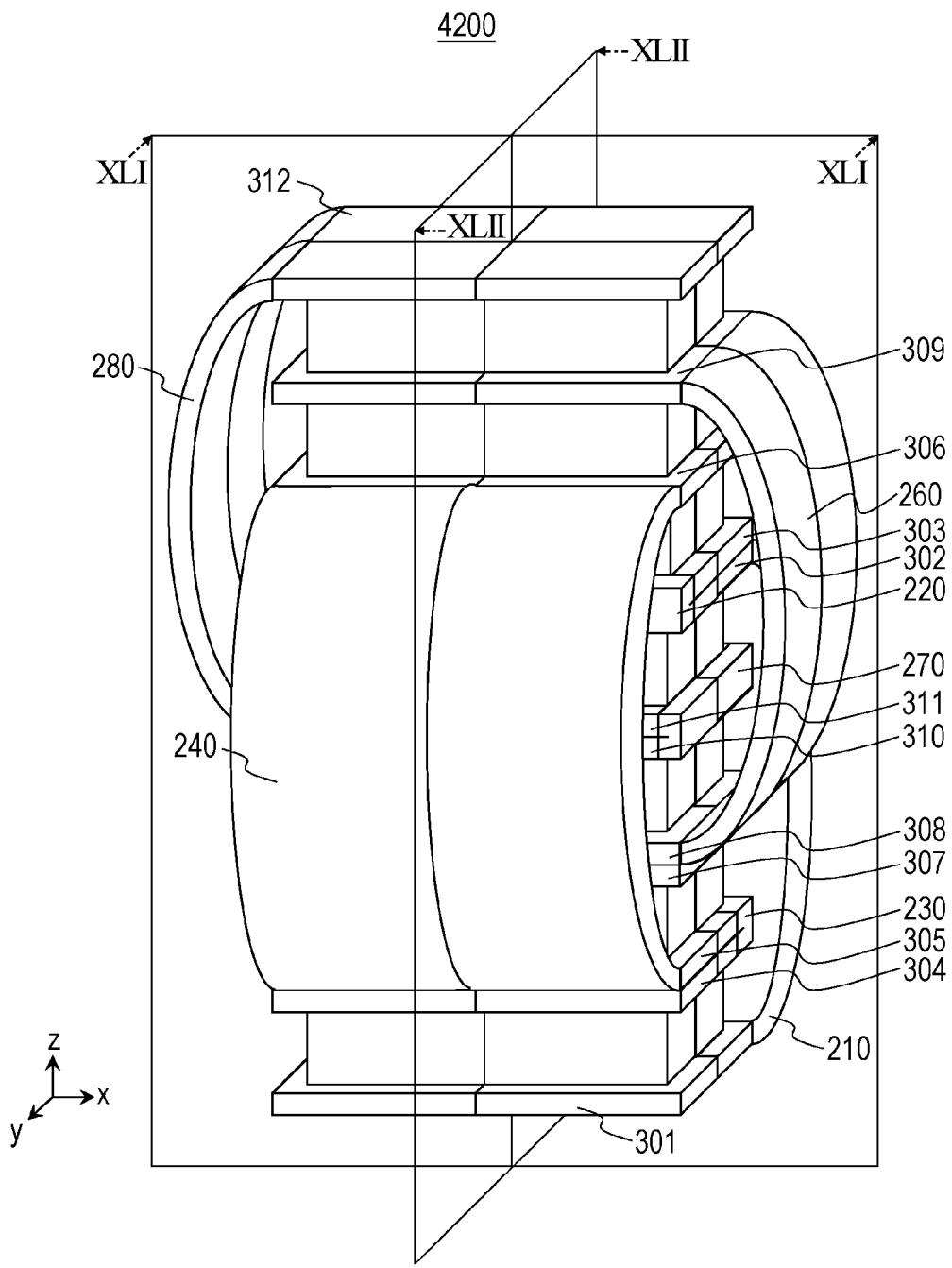
FIG. 40 is a schematic perspective view of a battery according to the fourth embodiment.

FIG. 40 is a schematic perspective view of a battery 4200 according to the fourth embodiment.

Figure 41:
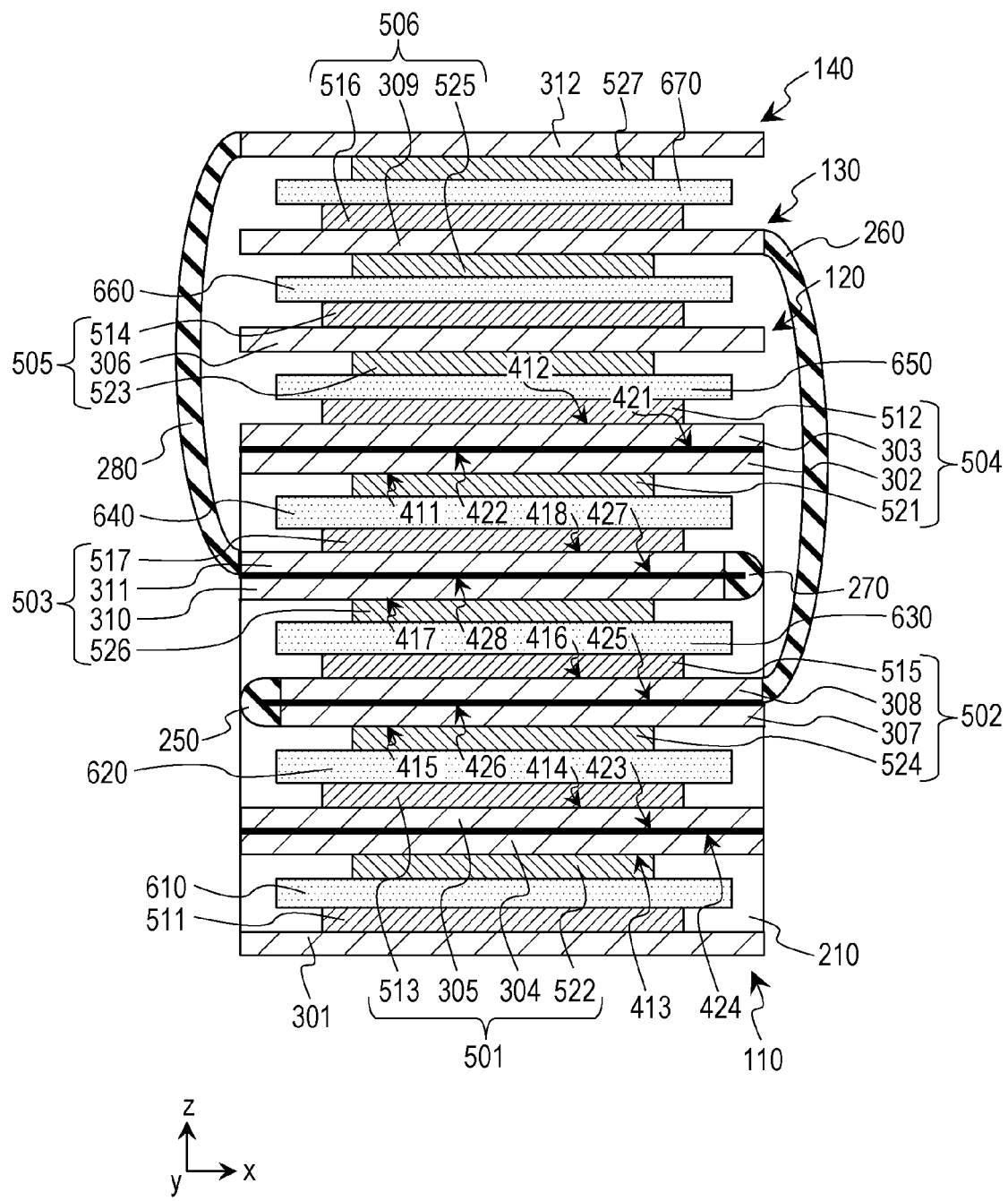
FIG. 41 is a schematic x-z view (sectional view taken along plane XLI-XLI in FIG. 40) of the battery according to the fourth embodiment.

FIG. 41 is a schematic x-z view (sectional view taken along plane XLI-XLI in FIG. 40) of the battery 4200 according to the fourth embodiment.

Figure 42:
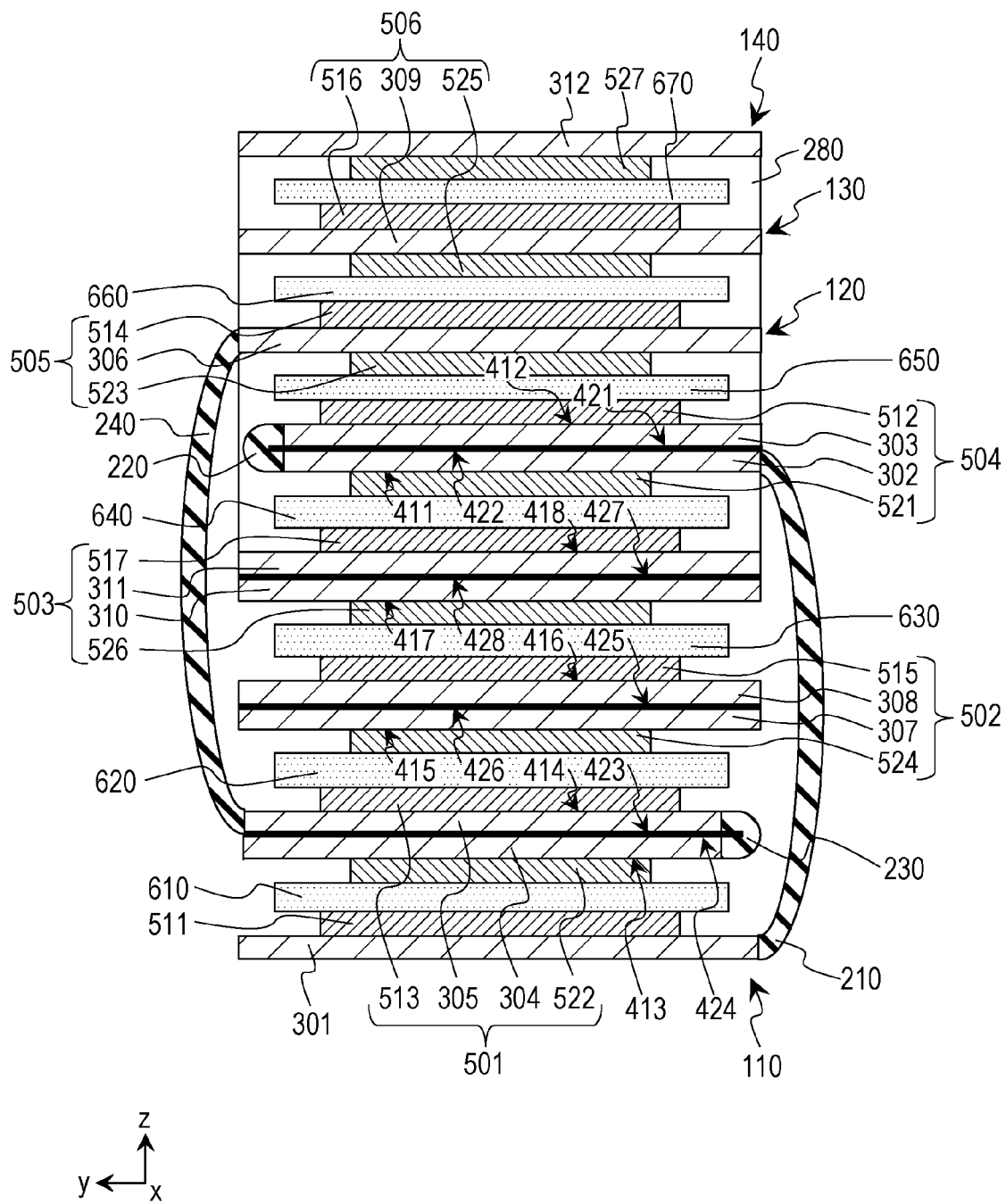
FIG. 42 is a schematic x-z view (sectional view taken along plane XLII-XLII in FIG. 40) of the battery according to the fourth embodiment.

FIG. 42 is a schematic y-z view (sectional view taken along plane XLII-XLII in FIG. 40) of the battery 4200 according to the fourth embodiment.

The battery 4200 according to the fourth embodiment further includes the following components, in addition to the components of the battery 4100 according to the fourth embodiment.

That is, the battery 4200 according to the fourth embodiment includes a fourth insulator 140, a sixth electrode layer 516, a sixth counter-electrode layer 526, a seventh electrode layer 517, and a seventh counter-electrode layer 527.

The sixth counter-electrode layer 526 and the seventh counter-electrode layer 527 are counter electrodes for the first electrode layer 511, the second electrode layer 512, the third electrode layer 513, the fourth electrode layer 514, the fifth electrode layer 515, the sixth electrode layer 516, and the seventh electrode layer 517.

The fourth insulator 140 includes a tenth electrolyte portion 310, an eleventh electrolyte portion 311, a twelfth electrolyte portion 312, a seventh bent portion 270, and an eighth bent portion 280.

The seventh bent portion 270 is positioned between the tenth electrolyte portion 310 and the eleventh electrolyte portion 311.

The eighth bent portion 280 is positioned between the eleventh electrolyte portion 311 and the twelfth electrolyte portion 312.

The tenth electrolyte portion 310 includes a seventh front-surface region 417 and a seventh back-surface region 427.

The seventh back-surface region 427 is a region positioned on the back side of the seventh front-surface region 417.

The eleventh electrolyte portion 311 includes an eighth front-surface region 418 and an eighth back-surface region 428.

The eighth back-surface region 428 is a region positioned on the back side of the eighth front-surface region 418.

The fourth insulator 140 is bent at the seventh bent portion 270. Thus, the seventh back-surface region 427 and the eighth back-surface region 428 are positioned facing each other.

The tenth electrolyte portion 310 and the eleventh electrolyte portion 311 are disposed between the eighth electrolyte portion 308 and the second electrolyte portion 302.

The sixth electrode layer 516 is disposed in contact with the ninth electrolyte portion 309.

The sixth counter-electrode layer 526 is disposed in contact with the seventh front-surface region 417 and at a position facing the fifth electrode layer 515.

The seventh electrode layer 517 is disposed in contact with the eighth front-surface region 418 and at a position facing the first counter-electrode layer 521.

The seventh counter-electrode layer 527 is disposed in contact with the twelfth electrolyte portion 312.

The fourth insulator 140 is bent at the eighth bent portion 280. Thus, the sixth electrode layer 516 and the seventh counter-electrode layer 527 are positioned facing each other.

With the structure described above, bonding strength between the components of the battery can be further increased. That is, the sixth electrode layer 516 and the seventh counter-electrode layer 527 can be respectively disposed on the eleventh electrolyte portion 311 and the twelfth electrolyte portion 312, which are linked to each other by the eighth bent portion 280. Moreover, the fourth counter-electrode layer 524 and the fifth electrode layer 515 can be respectively disposed on the tenth electrolyte portion 310 and the eleventh electrolyte portion 311 (that is, two partial regions of the fourth insulator 140 that are linked to each other by the seventh bent portion 270). Thus, the first to eighth bent portions 210 to 280 can securely link the electrode layers and the counter-electrode layers to each other. Therefore, it is possible to realize a battery in which the first power generation element 501 (that is, a power generation element including the third electrode layer 513 and the second counter-electrode layer 522), the second power generation element 502 (that is, a power generation element including the fifth electrode layer 515 and the fourth counter-electrode layer 524), the third power generation element 503 (that is, a power generation element including the sixth electrode layer 516 and the sixth counter-electrode layer 526), the fourth power generation element 504 (that is, a power generation element including the second electrode layer 512 and the first counter-electrode layer 521), the fifth power generation element 505 (that is, a power generation element including the fourth electrode layer 514 and the third counter-electrode layer 523), and a sixth power generation element 506 (that is, a power generation element including the sixth electrode layer 516 and the fifth counter-electrode layer 525) are connected in series while securely linking the first to sixth power generation elements 501 to 506 to each other.

Moreover, with the structure described above, the eighth bent portion 280 can cover a side surface of the battery where the eighth bent portion 280 is positioned (that is, a side surface different from side surfaces where the first bent portion 210, the fourth bent portion 240, or the sixth bent portion 260 are positioned). Thus, the first bent portion 210, the fourth bent portion 240, the sixth bent portion 260, and the eighth bent portion 280 can cover a larger number of side surfaces of the battery. Therefore, the reliability of the battery can be further improved.

In the battery 4200 according to the fourth embodiment, the seventh back-surface region 427 and the eighth back-surface region 428 may be in contact with each other.

The battery 4200 according to the fourth embodiment may further include a first current collector 610, a second current collector 620, a third current collector 630, a fourth current collector 640, a fifth current collector 650, a sixth current collector 660, and a seventh current collector 670.

The first current collector 610 is disposed between the first electrode layer 511 and the second counter-electrode layer 522 and in contact with the first electrode layer 511 and the second counter-electrode layer 522.

The second current collector 620 is disposed between the third electrode layer 513 and the fourth counter-electrode layer 524 and in contact with the third electrode layer 513 and the fourth counter-electrode layer 524.

The third current collector 630 is disposed between the fifth electrode layer 515 and the sixth counter-electrode layer 526 and in contact with the fifth electrode layer 515 and the sixth counter-electrode layer 526.

The fourth current collector 640 is disposed between the seventh electrode layer 517 and the first counter-electrode layer 521 and in contact with the seventh electrode layer 517 and the first counter-electrode layer 521.

The fifth current collector 650 is disposed between the second electrode layer 512 and the third counter-electrode layer 523 and in contact with the second electrode layer 512 and the third counter-electrode layer 523.

The sixth current collector 660 is disposed between the fourth electrode layer 514 and the fifth counter-electrode layer 525 and in contact with the fourth electrode layer 514 and the fifth counter-electrode layer 525.

The seventh current collector 670 is disposed between the sixth electrode layer 516 and the seventh counter-electrode layer 527 and in contact with the sixth electrode layer 516 and the seventh counter-electrode layer 527.

With the structure described above, the power generation elements can be stacked on top of each other in series via the current collectors.

The fourth electrolyte portion 304, the fifth electrolyte portion 305, and the sixth electrolyte portion 306 are formed by providing an electrolyte material to the base material of the second insulator 120.

The seventh electrolyte portion 307, the eighth electrolyte portion 308, and the ninth electrolyte portion 309 are formed by providing an electrolyte material to the base material of the third insulator 130.

The tenth electrolyte portion 310, the eleventh electrolyte portion 311, and the twelfth electrolyte portion 312 are formed by providing an electrolyte material to the base material of the fourth insulator 140.

The first to twelfth electrolyte portions 301 to 312 may have the same characteristics (such as thickness, area, shape, and materials) or may have different characteristics.

The first to twelfth electrolyte portions 301 to 312 each may be formed in an area that is larger than any of the first to seventh electrode layers 511 to 517 and is larger than any of the first to seventh counter-electrode layers 521 to 527. Thus, a short circuit due to direct contact between an electrode layer and a counter-electrode layer can be prevented.

The seventh electrolyte portion 307 and the eighth electrolyte portion 308 may be disposed in an insular pattern with a predetermined distance therebetween. In this case, a portion of the base material positioned between the seventh electrolyte portion 307 and the eighth electrolyte portion 308 (a portion where an electrolyte material is not disposed) is the fifth bend region 750. The fifth bent portion 250 is formed by bending the fifth bend region 750.

The eighth electrolyte portion 308 and the ninth electrolyte portion 309 may be disposed in an insular pattern with a predetermined distance therebetween. In this case, a portion of the base material positioned between the eighth electrolyte portion 308 and the ninth electrolyte portion 309 (a portion where an electrolyte material is not disposed) is a sixth bend region 760. The sixth bent portion 260 is formed by bending the sixth bend region 760.

The tenth electrolyte portion 310 and the eleventh electrolyte portion 311 may be disposed in an insular pattern with a predetermined distance therebetween. In this case, a portion of the base material positioned between the tenth electrolyte portion 310 and the eleventh electrolyte portion 311 (a portion where an electrolyte material is not disposed) is a seventh bend region 770. The seventh bent portion 270 is formed by bending the seventh bend region 770.

The eleventh electrolyte portion 311 and the twelfth electrolyte portion 312 may be disposed in an insular pattern with a predetermined distance therebetween. In this case, a portion of the base material positioned between the eleventh electrolyte portion 311 and the twelfth electrolyte portion 312 (a portion where an electrolyte material is not disposed) is an eighth bend region 780. The eighth bent portion 280 is formed by bending the eighth bend region 780.

The first to eighth bent portions 210 to 280 may have the same characteristics (such as thickness, area, shape, and materials) or may have different characteristics.

The seventh electrode layer 517 is a layer containing an electrode material (such as an active material). The first to seventh electrode layers 511 to 517 may have the same characteristics (such as thickness, area, shape, and materials) or may have different characteristics.

The first to seventh electrode layers 511 to 517 each may be formed in an area smaller than any of the first to seventh current collectors 610 to 670.

The seventh counter-electrode layer 527 is a layer containing an electrode material (such as an active material). The first to seventh counter-electrode layers 521 to 527 may have the same characteristics (such as thickness, area, shape, and materials) or may have different characteristics.

The first to seventh counter-electrode layers 521 to 527 each may be formed in an area smaller than any of the first to seventh current collectors 610 to 670.

The seventh current collector 670 is a conductive member. The first to seventh current collectors 610 to 670 may have the same characteristics (such as thickness, area, shape, and materials) or may have different characteristics.

The sixth power generation element 506 is, for example, a power generation unit having charging and discharging properties (such as a secondary battery). For example, the sixth power generation element 506 may be an electric cell.

The sixth power generation element 506 may include a solid electrolyte. That is, the sixth power generation element 506 may be an all-solid-state battery.

The first electrode layer 511, the second electrode layer 512, the third electrode layer 513, the fourth electrode layer 514, the fifth electrode layer 515, the sixth electrode layer 516, and the seventh electrode layer 517 each may be a negative-electrode active-material layer. In this case, the electrode material is a negative-electrode active material. The first current collector 610, the second current collector 620, the third current collector 630, the fourth current collector 640, the fifth current collector 650, the sixth current collector 660, and the seventh current collector 670 are each a bipolar current collector. The first counter-electrode layer 521, the second counter-electrode layer 522, the third counter-electrode layer 523, the fourth counter-electrode layer 524, the fifth counter-electrode layer 525, the sixth counter-electrode layer 526, and the seventh counter-electrode layer 527 are each a positive-electrode active-material layer. The counter-electrode material is a positive-electrode active material. In this case, a positive-electrode active-material layer may be disposed in contact with the first electrolyte portion 301 (for example, on one of the main surfaces of the first electrolyte portion 301 on which the first electrode layer 511 is not disposed). Moreover, a positive-electrode current collector may be disposed in contact with the positive-electrode active-material layer. A negative-electrode active-material layer may be disposed in contact with the twelfth electrolyte portion 312 (for example, on one of the main surfaces of the twelfth electrolyte portion 312 on which the seventh counter-electrode layer 527 is not disposed). Moreover, a negative-electrode current collector may be disposed in contact with the negative-electrode active-material layer.

Alternatively, the first electrode layer 511, the second electrode layer 512, the third electrode layer 513, the fourth electrode layer 514, the fifth electrode layer 515, the sixth electrode layer 516, and the seventh electrode layer 517 each may be a positive-electrode active-material layer. In this case, the electrode material is a positive-electrode active material. The first current collector 610, the second current collector 620, the third current collector 630, the fourth current collector 640, the fifth current collector 650, the sixth current collector 660, and the seventh current collector 670 are each a bipolar current collector. The first counter-electrode layer 521, the second counter-electrode layer 522, the third counter-electrode layer 523, the fourth counter-electrode layer 524, the fifth counter-electrode layer 525, the sixth counter-electrode layer 526, and the seventh counter-electrode layer 527 are each a negative-electrode active-material layer. The counter-electrode material is a negative-electrode active material. In this case, a negative-electrode active-material layer may be disposed in contact with the first electrolyte portion 301 (for example, on one of the main surfaces of the first electrolyte portion 301 on which the first electrode layer 511 is not disposed). Moreover, a negative-electrode current collector may be disposed in contact with the negative-electrode active-material layer. A positive-electrode active-material layer may be disposed in contact with the twelfth electrolyte portion 312 (for example, on one of the main surfaces of the twelfth electrolyte portion 312 on which the seventh counter-electrode layer 527 is not disposed). Moreover, a positive-electrode current collector may be disposed in contact with the positive-electrode active-material layer.

A battery manufacturing method of manufacturing a battery according to the fourth embodiment will be described below as a fifth embodiment.

In the first to fourth embodiments, a part (or all) of each side surface of the stacked battery (such as a part outside of an insulator) may be coated with an insulating material (such as a sealant) different from the material of the insulator. Thus, it is possible to more securely seal the power generation elements, which are connected in series. In this case, the sealant may be, for example, a moisture-proof laminate sheet. Thus, the sealant can prevent deterioration of the power generation elements due to moisture. The stacked battery may be enclosed in a sealed case. As the sealed case, a generally known battery case (such as a laminate bag, a metal can, or a resin case) may be used.

A battery according to any one of the first to fourth embodiments may further include a pair of outer electrodes. If the entirety of the stacked battery is sealed with a sealant, the pair of outer electrodes may protrude from the upper and lower surfaces (or side surfaces) of the stacked battery to the outside. One of the outer electrodes may be connected to, for example, a current collector positioned at one end of the stacked battery. In this case, the other outer electrode may be connected to, for example, a current collector positioned at the other end of the stacked battery. Thus, the battery can perform discharge to a load connected to the pair of outer electrodes, and the battery (the power generation elements) can be charged by using a charger connected to the pair of outer electrodes.

Fifth Embodiment

Hereinafter, a fifth embodiment will be described. Descriptions that overlap those of any of the first to fourth embodiments will be omitted as appropriate.

Figure 43:
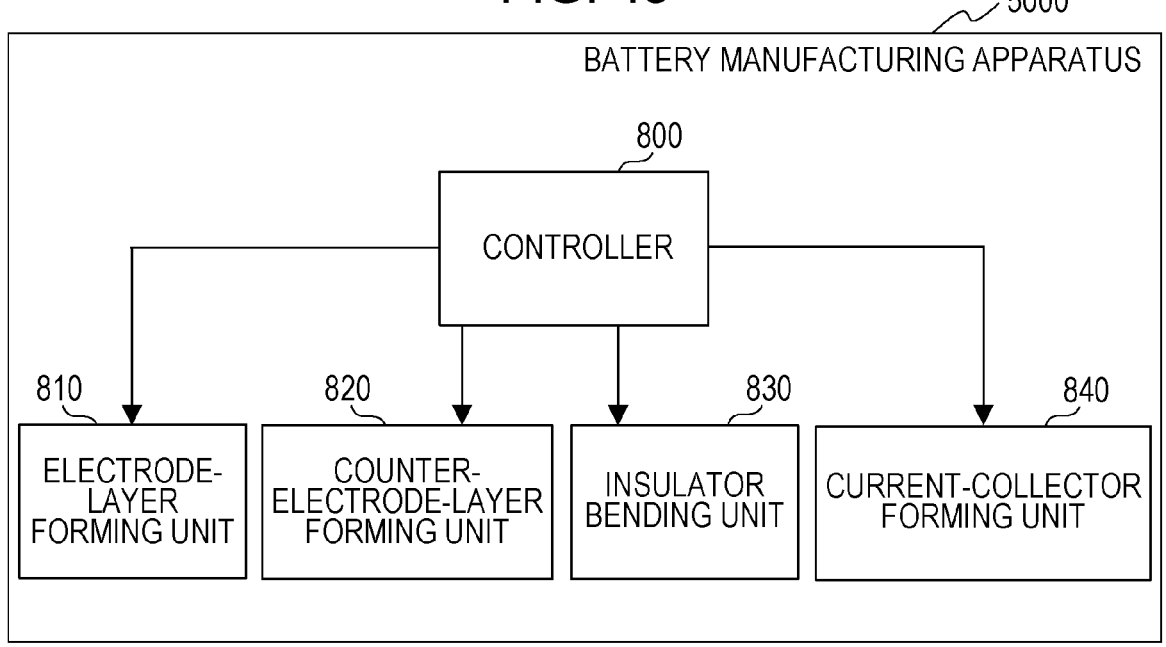
FIG. 43 is a schematic block diagram of a battery manufacturing apparatus according to a fifth embodiment.

FIG. 43 is a schematic block diagram of a battery manufacturing apparatus 5000 according to the fifth embodiment.

The battery manufacturing apparatus 5000 according to the fifth embodiment includes an electrode-layer forming unit 810, a counter-electrode-layer forming unit 820, an insulator bending unit 830, and a current-collector forming unit 840.

The electrode-layer forming unit 810 forms electrode layers on insulators. The electrode layers are formed at positions described above in any of the first to fourth embodiments.

The counter-electrode-layer forming unit 820 forms counter-electrode layers on the insulators. The counter-electrode layers are formed at positions described above in any of the first to fourth embodiments.

The insulator bending unit 830 bends the insulators (that is, bend regions). The insulator bending unit 830 forms bent portions by bending the bend regions.

The current-collector forming unit 840 forms current collectors. The current collectors are formed at positions described above in any of the first to fourth embodiments.

Figure 44:
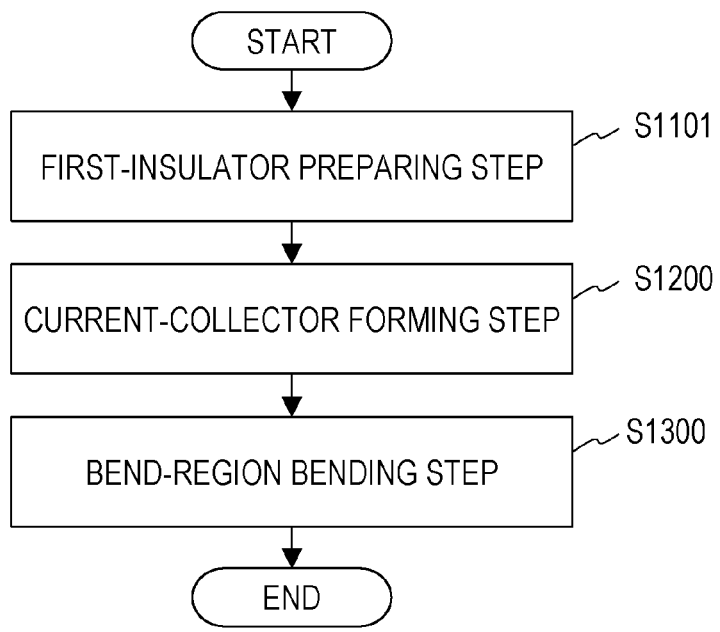
FIG. 44 is a flowchart of an example of a battery manufacturing method according to the fifth embodiment.

FIG. 44 is a flowchart of an example of a battery manufacturing method according to the fifth embodiment.

The battery manufacturing method according to the fifth embodiment is a method using the battery manufacturing apparatus according to the fifth embodiment. For example, the battery manufacturing method according to the fifth embodiment is performed in the battery manufacturing apparatus according to the fifth embodiment.

The battery manufacturing method according to the fifth embodiment includes a first-insulator preparing step S1101, a current-collector forming step S1200, and a bend-region bending step S1300.

The first-insulator preparing step S1101 is a step of forming electrode layers and counter-electrode layers on the first insulator 110 by using the electrode-layer forming unit 810 and the counter-electrode-layer forming unit 820.

The current-collector forming step S1200 is a step of forming current collectors by using the current-collector forming unit 840.

The bend-region bending step S1300 is a step of bending bend regions by using the insulator bending unit 830.

Hereinafter, a specific example of the battery manufacturing method according to the fifth embodiment will be described.

Figure 45:
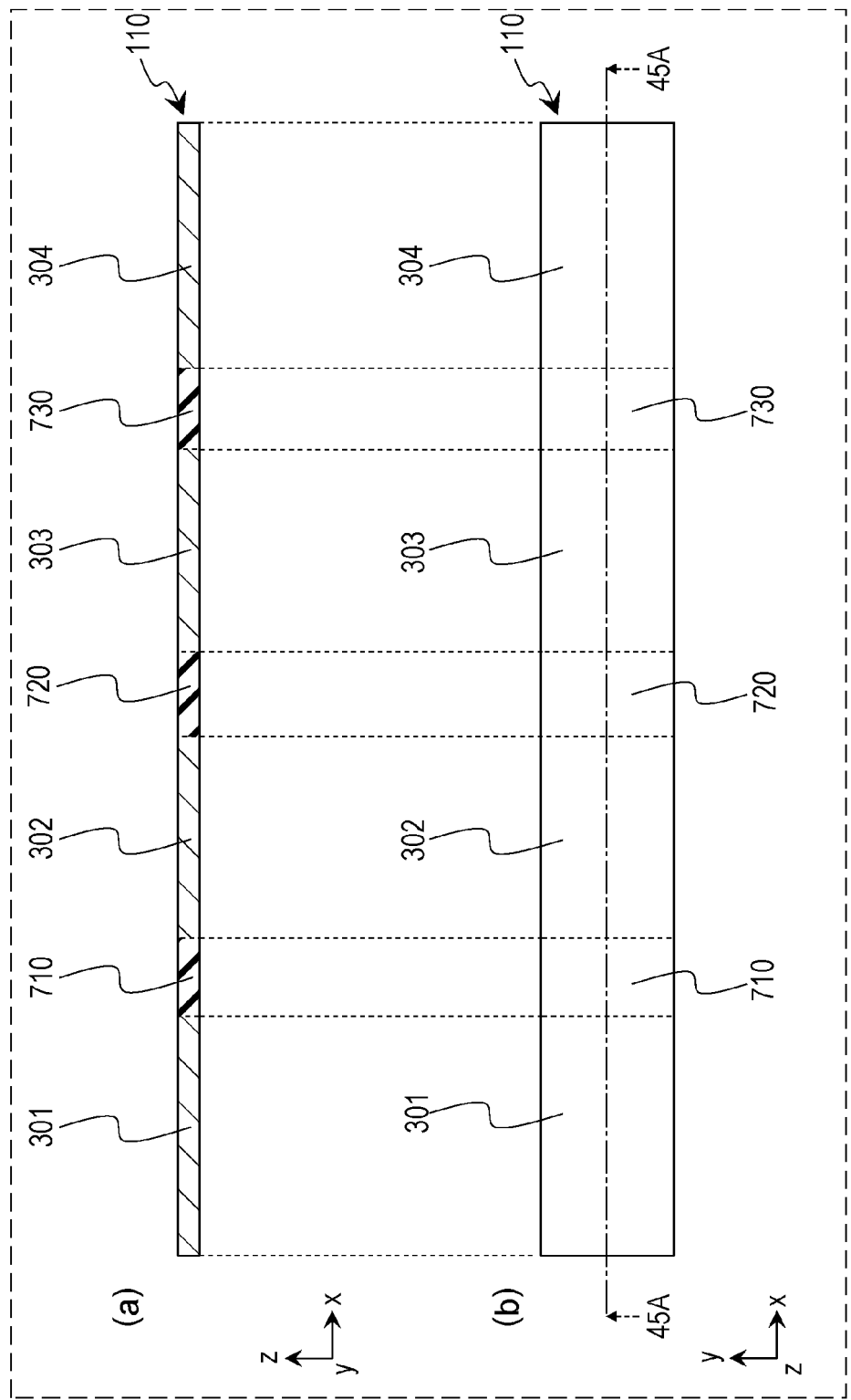
FIG. 45 schematically illustrates an example of a first insulator according to the fifth embodiment.

FIG. 45 schematically illustrates an example of a first insulator 110 according to the fifth embodiment.

FIG. 45(a) is a schematic x-z view (sectional view taken along line 45A-45A) of the example of the first insulator 110 according to the fifth embodiment.

FIG. 45(b) is a schematic x-y view (top view) of the example of the first insulator 110 according to the fifth embodiment.

Figure 46:
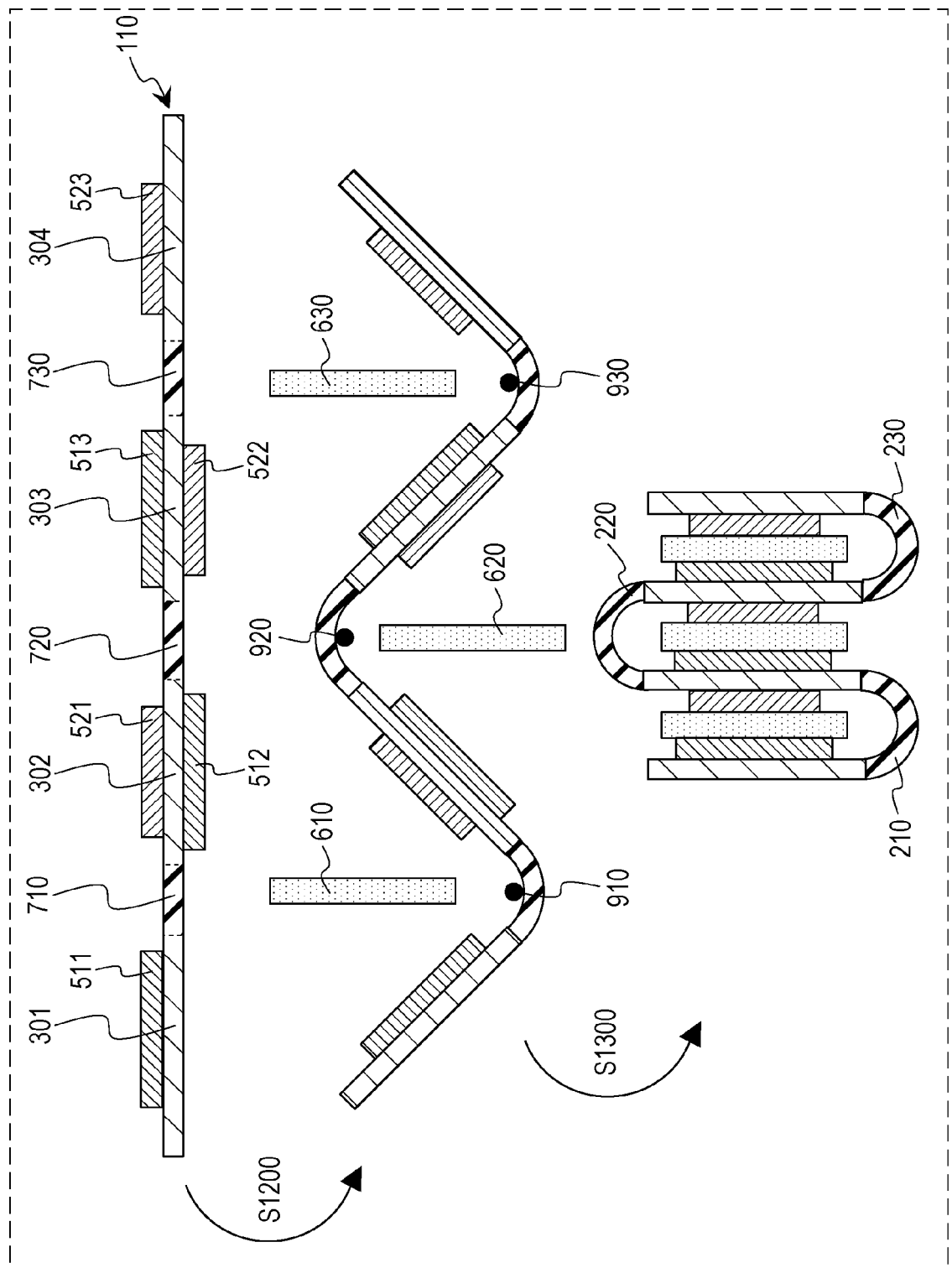
FIG. 46 illustrates an example of a current-collector forming step and a bend-region bending step.

FIG. 46 illustrates an example of the current-collector forming step S1200 and the bend-region bending step S1300.

As illustrated in FIG. 46, by performing the first-insulator preparing step S1101, electrode layers and counter-electrode layers are formed on the first insulator 110 illustrated in FIG. 45. At this time, the electrode layers and the counter-electrode layers are formed on both surfaces of the first insulator 110.

For example, the electrode-layer forming unit 810 may apply a coating material (that is, a paste-like paint in which an electrode material of the electrode layers is mixed with a solvent) to the main surfaces of the first insulator 110, which is prepared beforehand. Subsequently, the coating material may be dried. Moreover, the coating material may be pressed after being dried. Thus, the density of the material in the electrode layers can be increased.

The counter-electrode-layer forming unit 820 may, for example, apply a coating material (that is, a paste-like paint in which a counter-electrode material of the counter-electrode layers is mixed with a solvent) to the main surfaces of the first insulator 110, which is prepared beforehand. Subsequently, the coating material may be dried. Moreover, the coating material may be pressed after being dried. Thus, the density of the material in the counter-electrode layers can be increased.

As illustrated in FIG. 46, by performing the current-collector forming step S1200, each current collector is formed between a corresponding one of the electrode layers and a corresponding one of the counter-electrode layers.

For example, the current-collector forming unit 840 may process a member (such as a current collector plate), which is prepared beforehand to form a current collector, into a predetermined size. Subsequently, the processed current collector plate may be disposed between each electrode layer and a corresponding one of counter-electrode layers.

As illustrated in FIG. 46, by performing the bend-region bending step S1300, bend regions are bent. Thus, each electrode layer and a corresponding one of the counter-electrode layers are positioned facing each other. Moreover, the bent portions are formed by bending the bend regions.

The insulator bending unit 830 may include, for example, a first bending member 910, a second bending member 920, and a third bending member 930 (such as rod member or a wire member). In this case, the insulator bending unit 830 may bend the bend regions by pressing the bending members against the bend regions and by moving at least one of the first insulator 110 and the bending member.

With the steps described above, it is possible to manufacture a stacked battery, in which bipolar electrodes are stacked, by using a simple folding process. That is, it is possible to manufacture a stacked battery, in which the power generation elements are stacked in series, by using a simple process. Thus, compared with a case where a process of stacking separate bipolar electrodes is used, a stacked battery having a serial structure can be manufactured easily and at low cost while suppressing displacement of components.

The specific example of the battery manufacturing method according to the fifth embodiment can be used to manufacture a battery according to the first embodiment.

Hereinafter, another specific example of the battery manufacturing method according to the fifth embodiment will be described.

Figure 47:
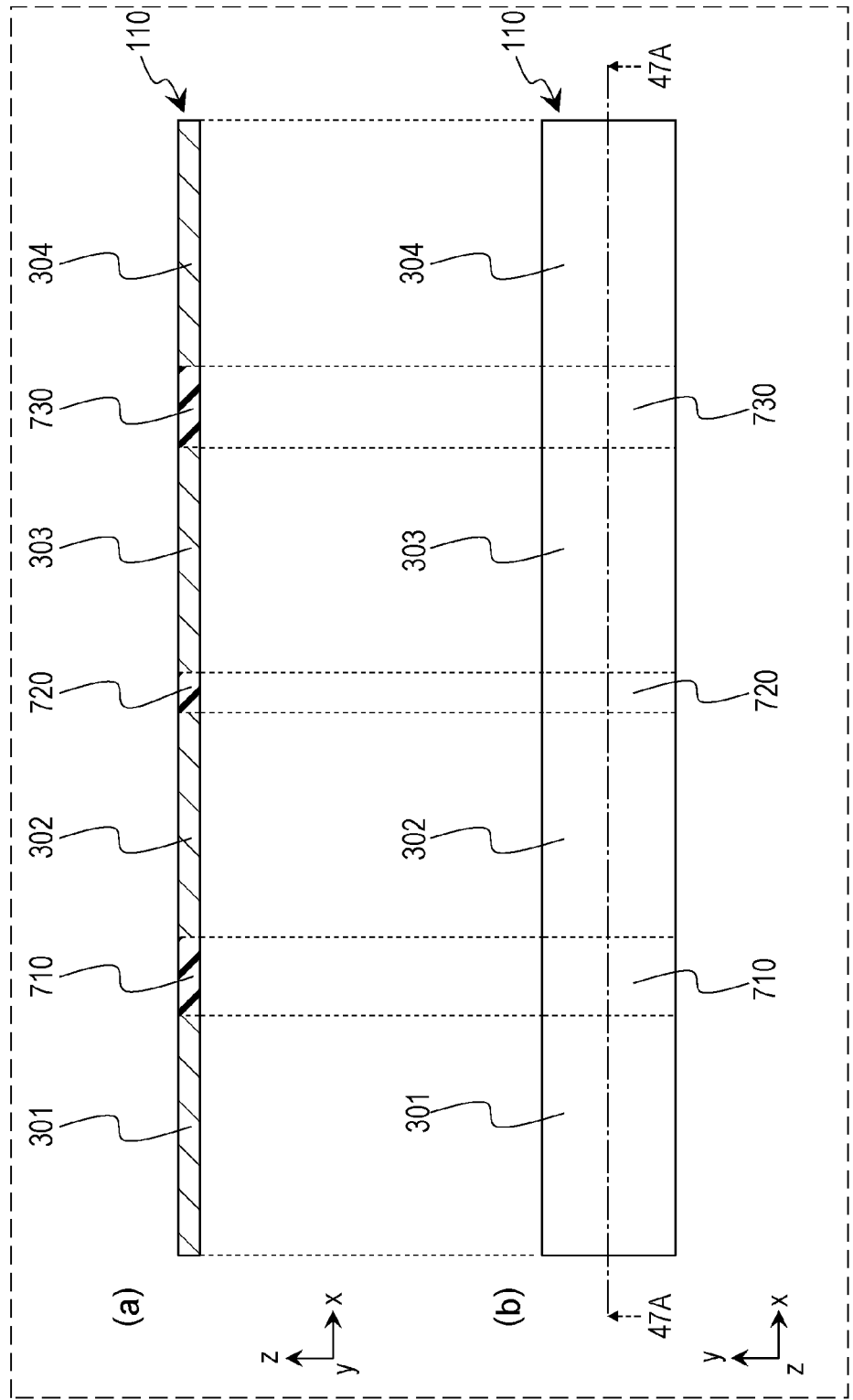
FIG. 47 schematically illustrates an example of a first insulator according to the fifth embodiment.

FIG. 47 schematically illustrates an example of the first insulator 110 according to the fifth embodiment.

FIG. 47(a) is a schematic x-z view (sectional view taken along line 47A-47A) of the example of the first insulator 110 according to the fifth embodiment.

FIG. 47(b) is a schematic x-y view (top view) of the example of the first insulator 110 according to the fifth embodiment.

Figure 48:
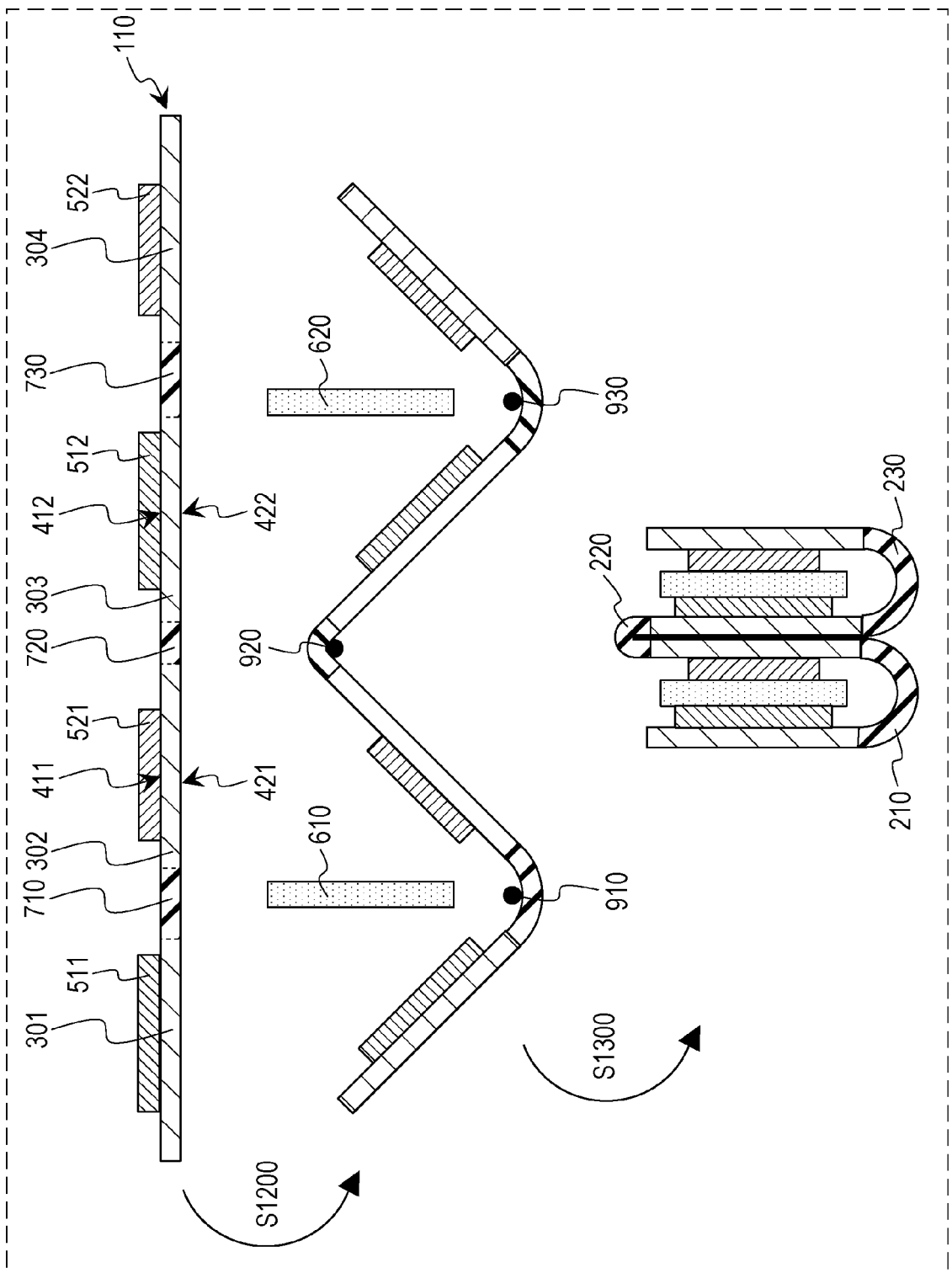
FIG. 48 illustrates an example of a current-collector forming step and a bend-region bending step.

FIG. 48 illustrates an example of the current-collector forming step S1200 and the bend-region bending step S1300.

As illustrated in FIG. 48, by performing the first-insulator preparing step S1101, electrode layers and counter-electrode layers are formed on the first insulator 110 illustrated in FIG. 47. At this time, the electrode layers and the counter-electrode layers are formed on only one surface of the first insulator 110.

As illustrated in FIG. 48, by performing the current-collector forming step S1200, each current collector is formed between a corresponding one of the electrode layers and a corresponding one of the counter-electrode layers.

As illustrated in FIG. 48, by performing the bend-region bending step S1300, bend regions are bent. Thus, each electrode layer and a corresponding one of the counter-electrode layers are positioned facing each other. Moreover, the bent portions are formed by bending the bend regions. Moreover, the first back-surface region 421 and the second back-surface region 422 are disposed facing each other and in contact with each other.

With the steps described above, it is possible to manufacture a stacked battery, in which bipolar electrodes are stacked, by using a simple single-sided deposition process. That is, it is possible to manufacture a stacked battery, in which the power generation elements are stacked in series, by using a simple process. Thus, compared with a case where a process of stacking separate bipolar electrodes is used, a stacked battery having a serial structure can be manufactured easily and at low cost while suppressing displacement of components.

The specific example of the battery manufacturing method according to the fifth embodiment can be used to manufacture a battery according to the third embodiment.

Figure 49:
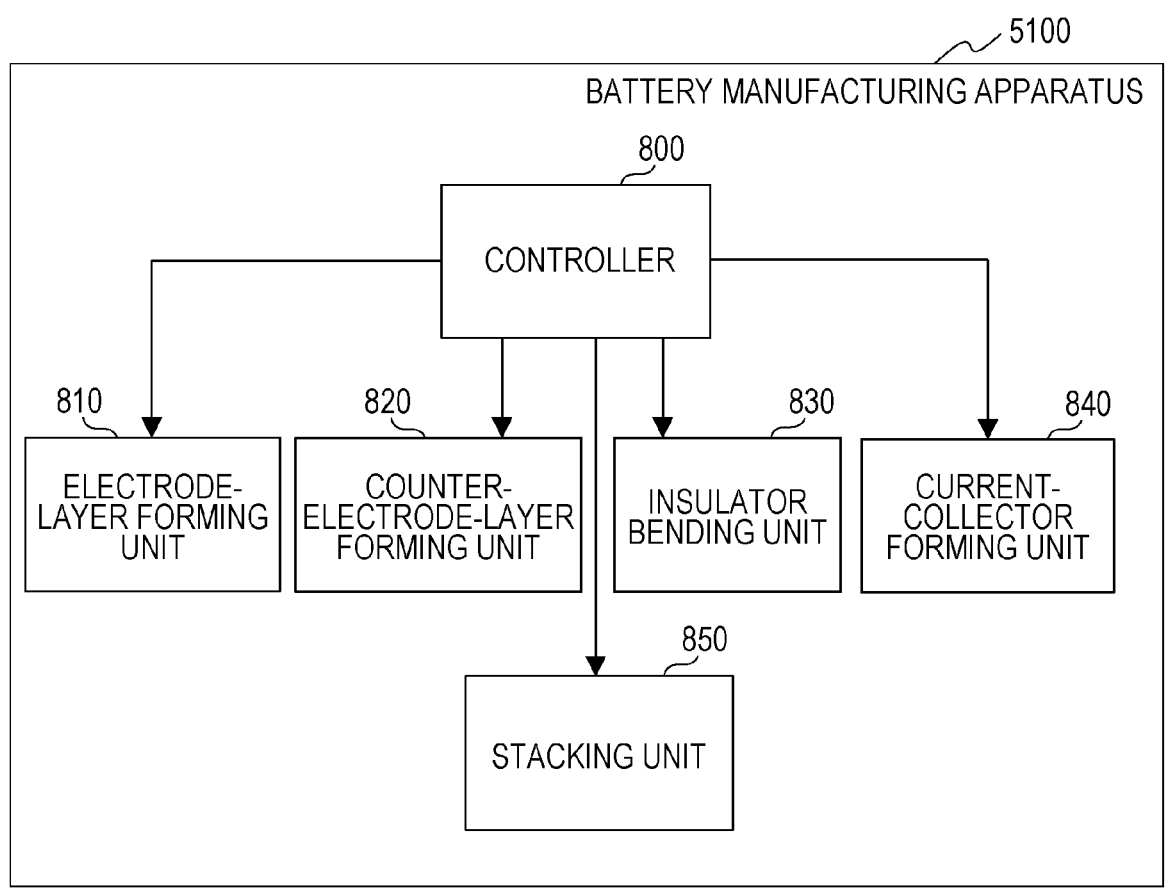
FIG. 49 is a schematic block diagram of a battery manufacturing apparatus according to the fifth embodiment.

FIG. 49 is a schematic block diagram of a battery manufacturing apparatus 5100 according to the fifth embodiment.

The battery manufacturing apparatus 5100 according to the fifth embodiment further includes the following unit, in addition to the units of the battery manufacturing apparatus 5000 according to the fifth embodiment.

That is, the battery manufacturing apparatus 5100 according to the fifth embodiment includes a stacking unit 850.

The stacking unit 850 stacks insulators on top of each other. The insulators are stacked at positions described above in the second or fourth embodiment.

Figure 50:
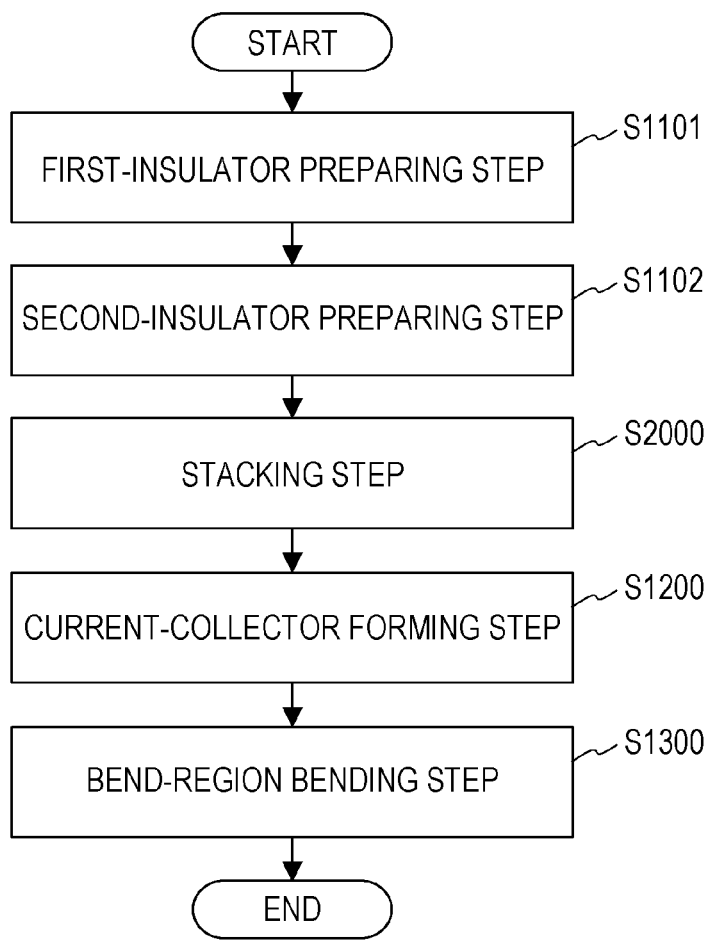
FIG. 50 is a flowchart of an example of a battery manufacturing method according to the fifth embodiment.

FIG. 50 is a flowchart of an example of a battery manufacturing method according to the fifth embodiment.

The battery manufacturing method illustrated in FIG. 50 includes the following steps, in addition to the steps of the battery manufacturing method illustrated in FIG. 44.

That is, the battery manufacturing method illustrated in FIG. 50 further includes a second-insulator preparing step S1102 and a stacking step S2000.

The second-insulator preparing step S1102 is a step of forming electrode layers and counter-electrode layers on the second insulator 120 by using the electrode-layer forming unit 810 and the counter-electrode-layer forming unit 820. The methods of forming electrode layers and counter-electrode layers may be the same as those of the first-insulator preparing step S1101.

The stacking step S2000 is a step of stacking the first insulator 110 and the second insulator 120 by using the stacking unit 850.

Figure 51:
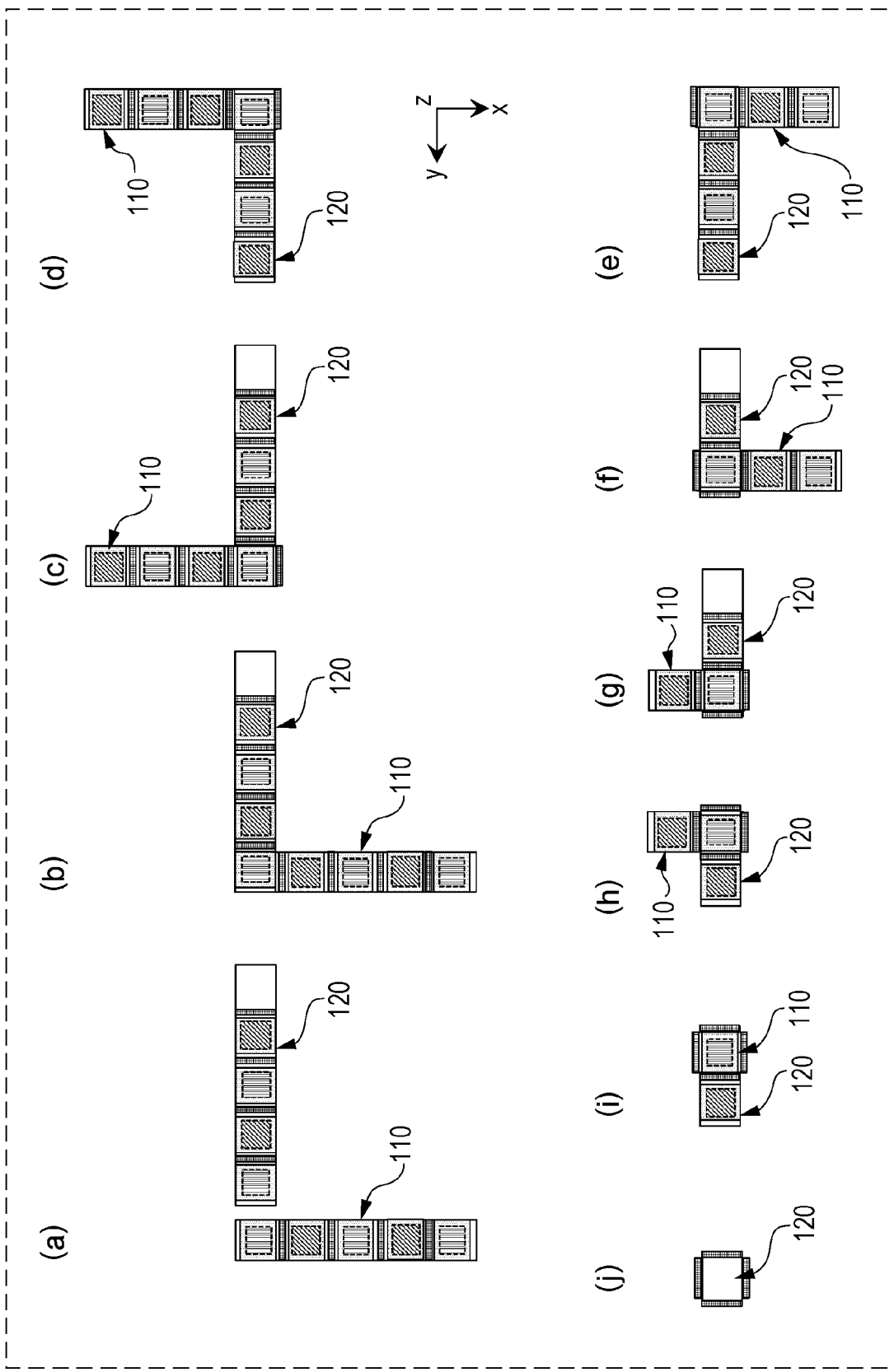
FIG. 51 is an x-y view (top view) of an example of a stacking step and a bend-region bending step.

FIG. 51 is an x-y view (top view) illustrating an example of the stacking step S2000 and the bend-region bending step S1300.

By performing the battery manufacturing method illustrated in FIG. 50, the first insulator 110 and the second insulator 120 are stacked. For example, as illustrated in FIGS. 51(*a*) and (*b*), the first insulator 110 and the second insulator 120 are placed perpendicular to each other and stacked on top of each other. Subsequently, as illustrated in FIG. 51(*c*) to (*j*), bent portions of the first insulator 110 and the second insulator 120 are alternately folded.

The battery manufacturing method according to the fifth embodiment can be used to manufacture a battery according to the second embodiment.

As illustrated in FIG. 51, the shape of each member (and each of areas where electrode layers, counter-electrode layers, and electrolyte portions are formed) may be a square.

Figure 52:
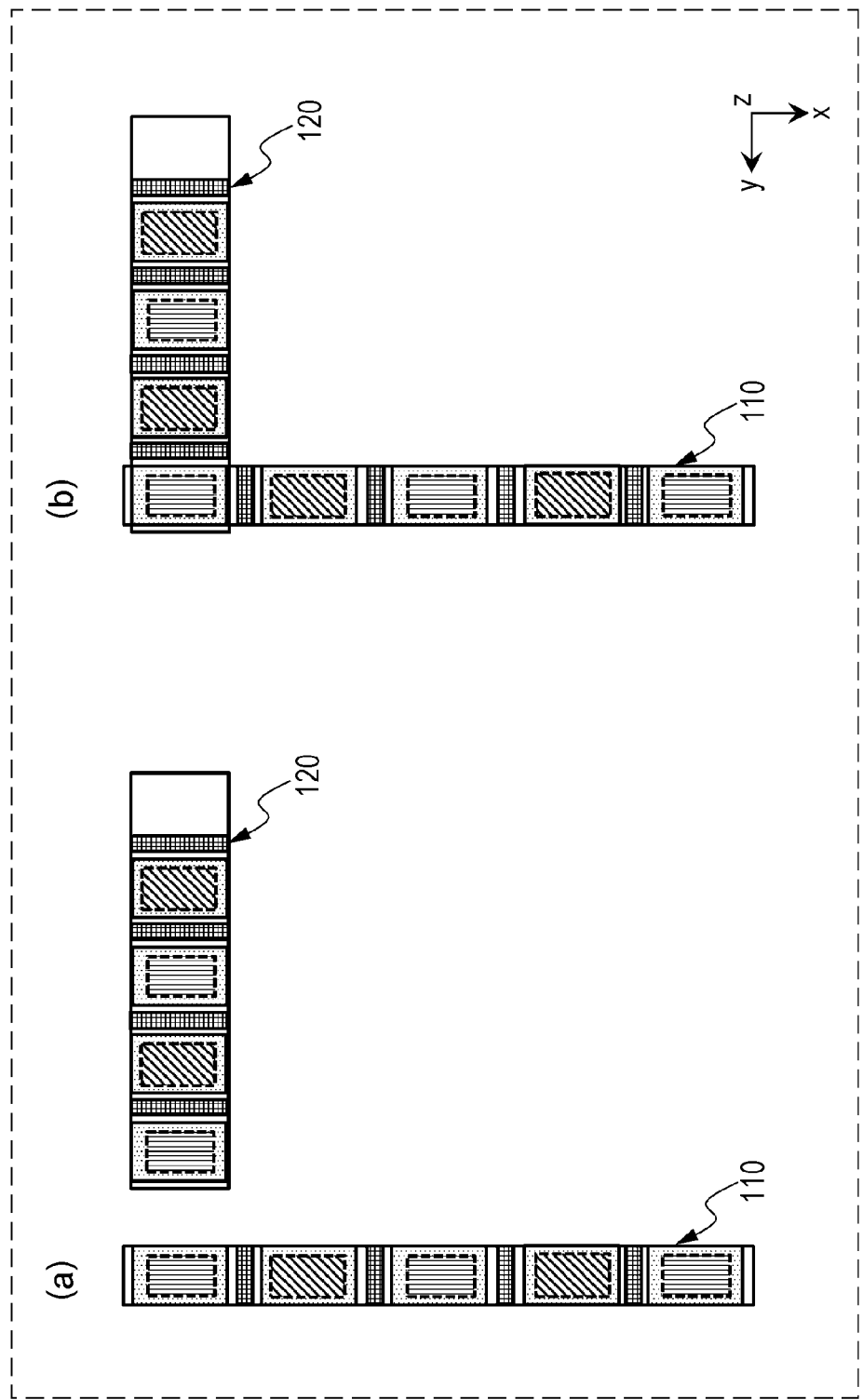
FIG. 52 is an x-y view (top view) of an example of stacking of a first insulator and a second insulator.

FIG. 52 is an x-y view (top view) illustrating an example of stacking of the first insulator 110 and the second insulator 120.

As illustrated in FIG. 52, the shape of each member (and each of areas where electrode layers, counter-electrode layers, and electrolyte portions are formed) may be a rectangle. By forming each member to have a non-square shape (such as a rectangular shape or another quadrangular shape), it is possible to design the shape of a stacked battery, which is formed by stacking these members, in any appropriate way.

The first insulator 110 and the second insulator 120 illustrated FIG. 52(*a*) may be stacked as illustrated in FIG. 52(*b*).

Figure 53:
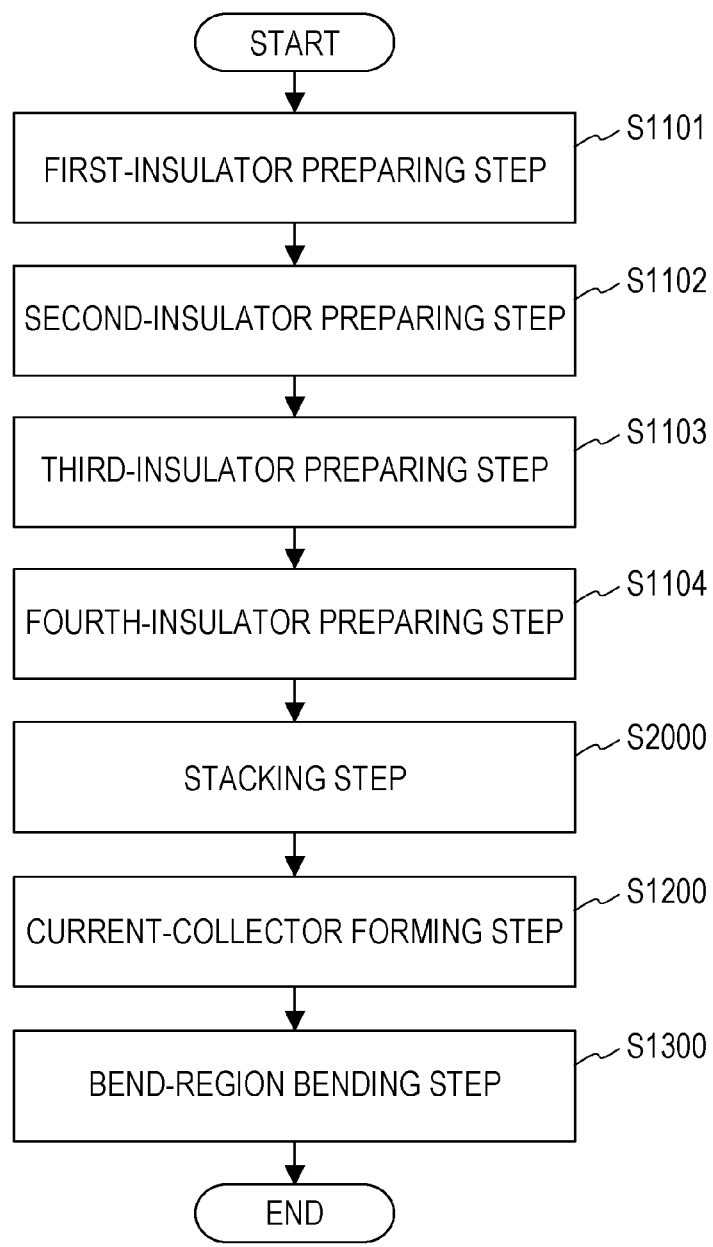
FIG. 53 is a flowchart of an example of a battery manufacturing method according to the fifth embodiment.

FIG. 53 is a flowchart of an example of a battery manufacturing method according to the fifth embodiment.

The battery manufacturing method illustrated in FIG. 53 includes the following steps, in addition to the steps of the battery manufacturing method illustrated in FIG. 50.

That is, the battery manufacturing method illustrated in FIG. 53 includes a third-insulator preparing step S1103 and a fourth-insulator preparing step S1104.

The third-insulator preparing step S1103 is a step of forming electrode layers and counter-electrode layers on the third insulator 130 by using the electrode-layer forming unit 810 and the counter-electrode-layer forming unit 820. A method of forming electrode layers and counter-electrode layers may be the same as that of the first-insulator preparing step S1101.

The fourth-insulator preparing step S1104 is a step of forming electrode layers and counter-electrode layers on the fourth insulator 140 by using the electrode-layer forming unit 810 and the counter-electrode-layer forming unit 820. A method of forming electrode layers and counter-electrode layers may be the same as that of the first-insulator preparing step S1101.

In this case, in the stacking step S2000, the first insulator 110, the second insulator 120, the third insulator 130, and the fourth insulator 140 are stacked by using the stacking unit 850.

The battery manufacturing method according to the fifth embodiment can be used to manufacture a battery according to the fourth embodiment.

Figure 54:
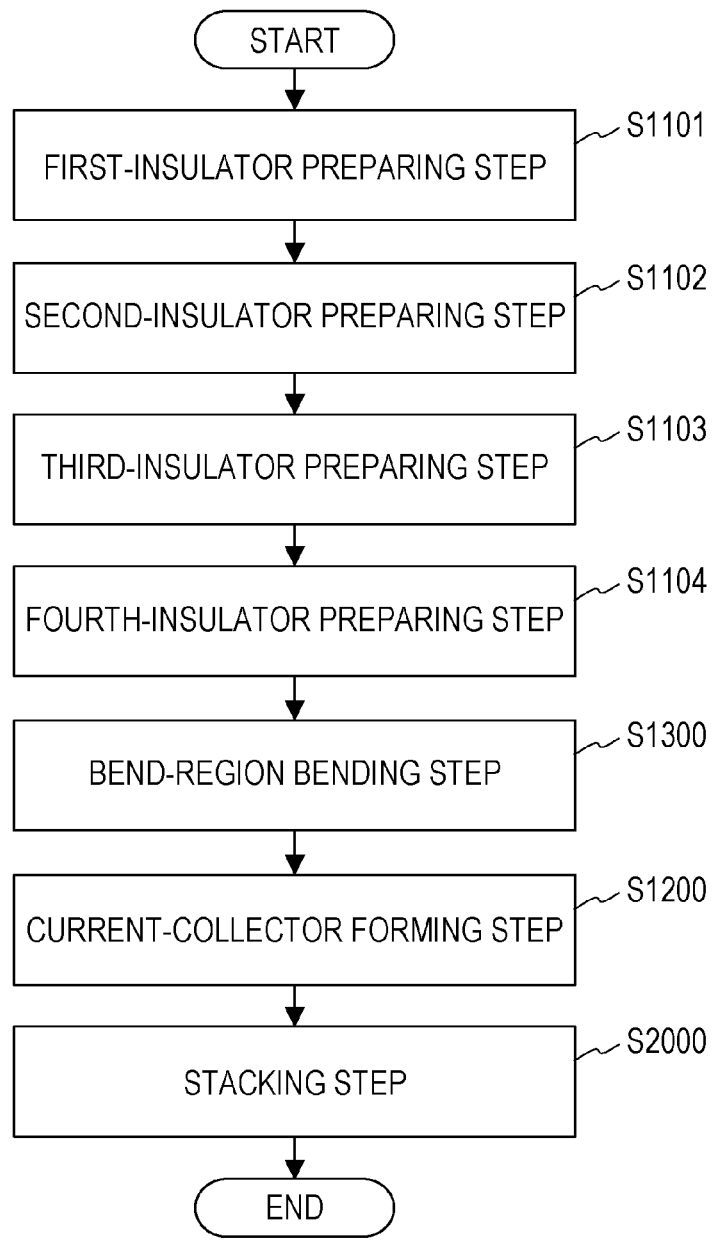
FIG. 54 is a flowchart of an example of a battery manufacturing method according to the fifth embodiment.

FIG. 54 is a flowchart of an example of a battery manufacturing method according to the fifth embodiment.

The battery manufacturing method illustrated in FIG. 54 differs from the battery manufacturing method illustrated in FIG. 53 in the following respects.

That is, in the battery manufacturing method illustrated in FIG. 54, the stacking step S2000 is performed after the bend-region bending step S1300.

Figure 55:
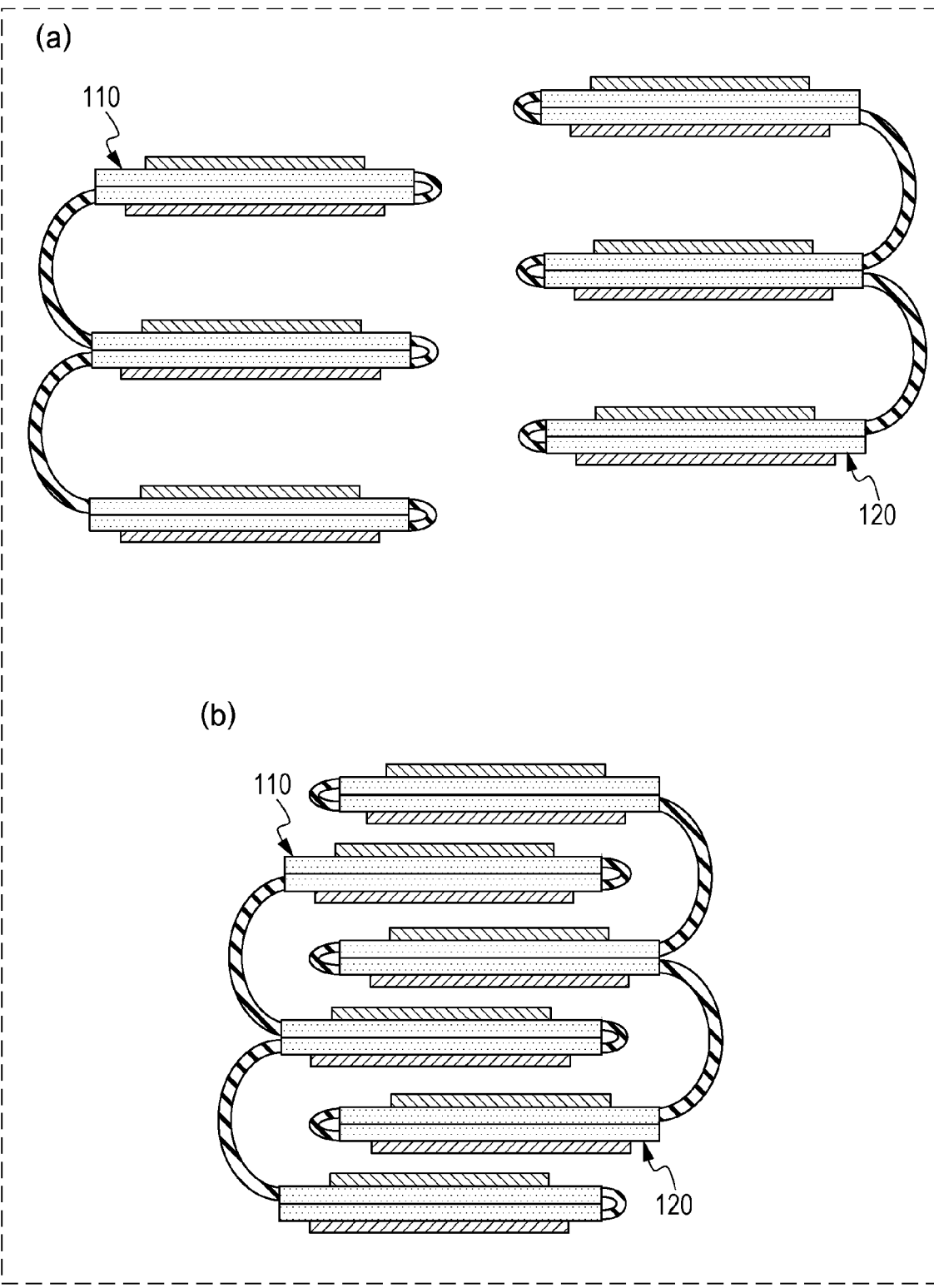
FIG. 55 illustrates an example of a stacking step.

FIG. 55 illustrates an example of the stacking step S2000.

As illustrated in FIG. 55, two electrode strips each having a comb-shaped structure (the first insulator 110 and the second insulator 120) may be inserted into each other with a vertical positional relationship illustrated in FIG. 55(*a*) and, for example, in directions that are displaced from each other by 180 degrees (or 90 degrees). Thus, a stacked structure illustrated in FIG. 55(*b*) is obtained. The current collectors may be moved to be inserted into each other by using, for example, the aforementioned bending member (such as a rod member or a wire member). By using the two electrode strips, which are independent members, it is possible to reduce the number of bipolar electrodes that each electrode strip needs to have. Thus, the manufacturing process can be made simpler. Moreover, the strength of the stacked battery can be increased. For example, the strength of the stacked battery against a mechanical impact from a side of the stacked battery can be increased.

With the structure described above, a stacked battery, in which bipolar electrodes are stacked, can be manufactured with a simplified folding process and a simplified stacking process (insertion process). That is, the process takt time can be reduced by using the insertion process, compared with a method of alternately and perpendicularly folding a long electrode strip. Therefore, it is not necessary to perform high-speed folding in order to reduce the process takt time. Thus, it is possible to suppress displacement of folded positions, which may occur when high-speed folding is performed. Moreover, it is possible to suppress damage to a battery component that is folded.

Figure 56:
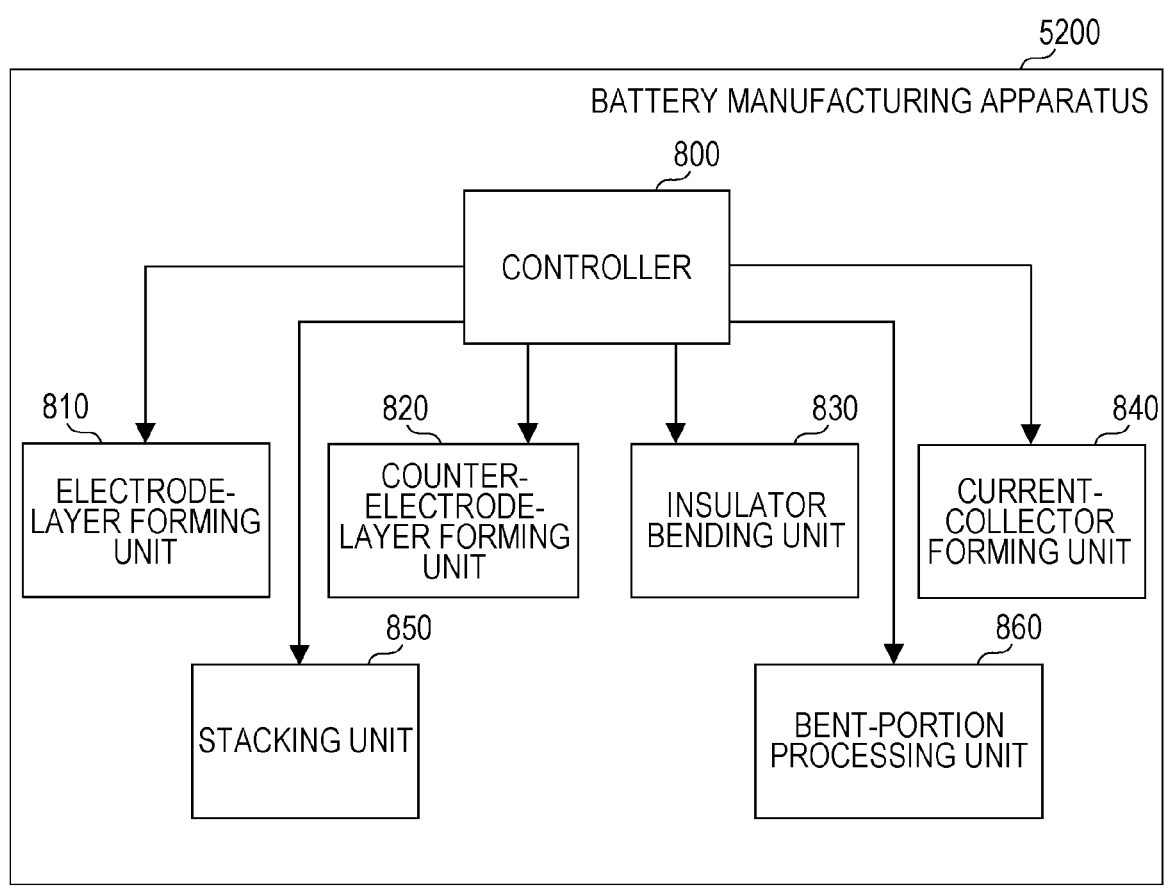
FIG. 56 is a schematic block diagram of a battery manufacturing apparatus according to the fifth embodiment.

FIG. 56 is a schematic block diagram of a battery manufacturing apparatus 5200 according to the fifth embodiment.

The battery manufacturing apparatus 5200 according to the fifth embodiment further includes the following unit, in addition to the units of the battery manufacturing apparatus 5100 according to the fifth embodiment.

That is, the battery manufacturing apparatus 5200 according to the fifth embodiment includes a bent-portion processing unit 860. The bent-portion processing unit 860 processes bent portions.

The bent-portion processing unit 860 may include, for example, a protruding-portion forming member (such as a press plate or a roller). In this case, the bent-portion processing unit 860 may form protruding portions by pressing the protruding-portion forming member against the bent portions. For example, the bent-portion processing unit 860 may integrate a plurality of insulators into a wall-like portion by causing protruding portions to contact each other. Thus, a plurality of bent portions can be integrated into a wall-like portion. Therefore, it is possible to more securely maintain a structure in which a plurality of power generation elements are connected in series.

Alternatively, the bent-portion processing unit 860 may, for example, shrink the bent portions. By shrinking the bent portions, the bent portions can further increase bonding strength between the components of the battery.

Figure 57:
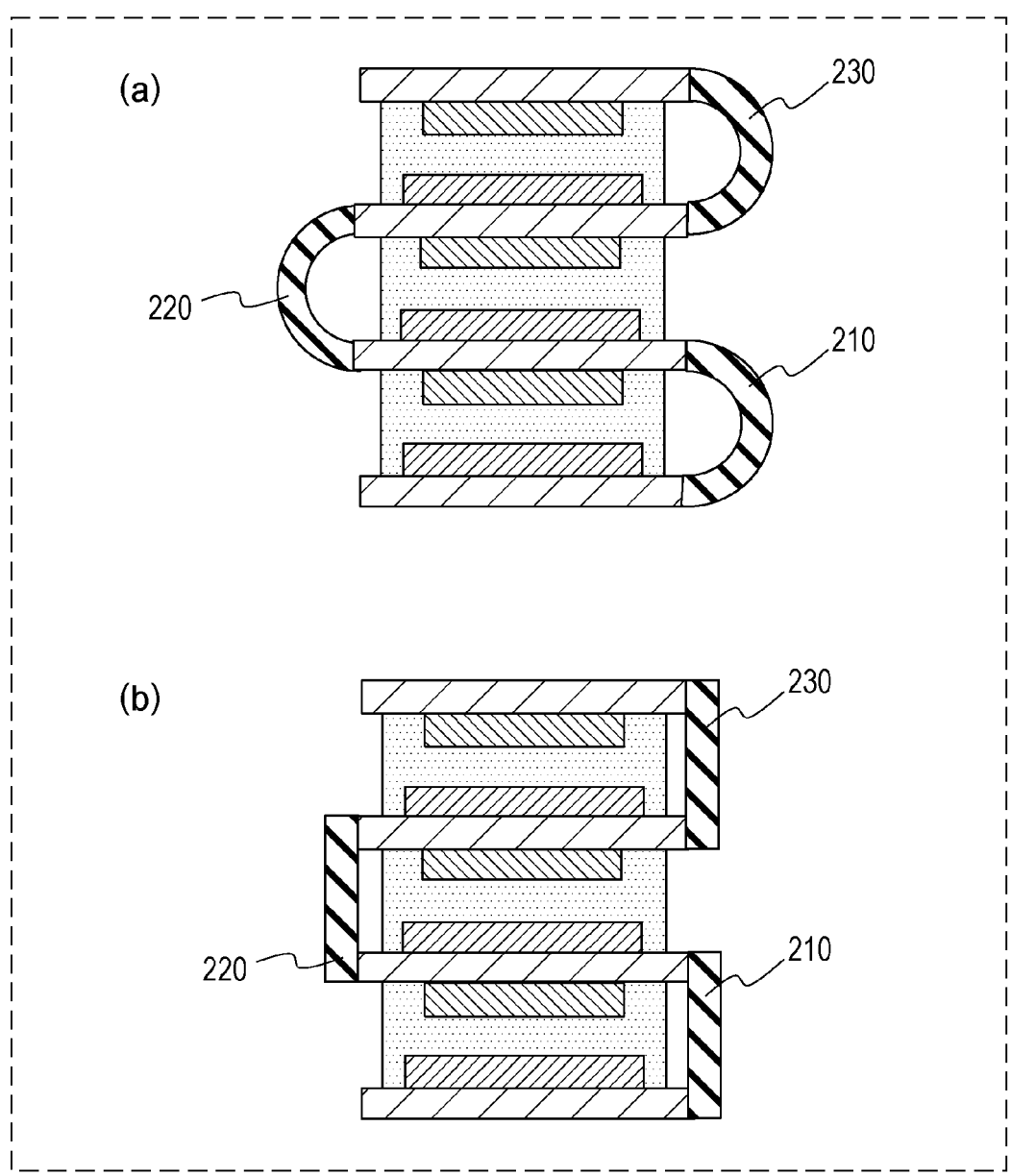
FIG. 57 illustrates an example of shrinking of bent portions.

FIG. 57 illustrates an example of shrinking of bent portions.

The bent-portion processing unit 860 may include, for example, a bent-portion shrinking member (such as a heater). The bent portions may contain a heat-shrinkable material. In this case, the bent-portion processing unit 860 may shrink the heat-shrinkable material by heating the bent portions illustrated in FIG. 57(*a*) by using a heater. By doing so, the bent portions may be shrunk with heat as illustrated in FIG. 57(*b*).

Alternatively, the bent-portion processing unit 860 may, for example, remove bent portions. Thus, the volumetric energy density and the gravimetric energy density of the battery can be further improved.

FIG. 58 illustrates an example of removing of bent portions.

The bent-portion processing unit 860 may, for example, remove (for example, cut away) a part of some of the bent portions (or all of some of the bent portions) after the bending step of bending the bent portion. For example, by cutting a part of some of the bent portions illustrated in FIG. 58(*a*), a structure illustrated in FIG. 58(*b*) is manufactured.

In the fifth embodiment, the electrode-layer forming unit 810 and the counter-electrode-layer forming unit 820 each may include, for example, an ejection mechanism (such as an ejection nozzle) that ejects a coating material (such as an electrode material or a counter-electrode material), a supply mechanism (such as a tank and a supply pipe) that supplies the coating material to the ejection mechanism, a movement mechanism (such as a roller) that moves an object to be coated, and a press mechanism that performs pressing (such as a press table and a cylinder). As these mechanisms, generally known devices and members may be used, as appropriate.

In the fifth embodiment, the insulator bending unit 830 may include, for example, a bending mechanism (such as a rod member or a wire member) that bends an object to be bent and a movement mechanism (such as a roller) that moves an object to be bent. As these mechanisms, generally known devices and members may be used, as appropriate.

In the fifth embodiment, the current-collector forming unit 840 may include, for example, a movement mechanism (such as a roller) that moves a current collector and an adjustment mechanism that adjusts the position of the current collector. As these mechanisms, generally known devices and members may be used, as appropriate.

In the fifth embodiment, the stacking unit 850 may include, for example, a movement mechanism (such as a roller) that moves an object to be stacked (such as an insulator) and an adjustment mechanism that adjusts the position of an object to be stacked. As these mechanisms, generally known devices and members may be used, as appropriate.

The battery manufacturing apparatus according to the fifth embodiment may further include a controller 800. The controller 800 controls the operations of the electrode-layer forming unit 810, the counter-electrode-layer forming unit 820, the insulator bending unit 830, the current-collector forming unit 840, the stacking unit 850, and the bent-portion processing unit 860.

The controller 800 may be composed of, for example, a processor and a memory. The processor may be, for example, a central processing unit (CPU) or a micro-processing unit (MPU). In this case, the processor may perform a control method (battery manufacturing method) described in the present disclosure by reading and executing a program stored in a memory.

In the battery manufacturing method according to the fifth embodiment, electrode layers, counter-electrode layers, and electrolyte portions may be formed by using, instead of a coating method, another method (such as a successive stacking, lamination, or transfer) or a combination of the coating method and other methods.

In the battery manufacturing method according to the fifth embodiment, power generation elements may be pressed by using a pressing machine after the insulators have been bent in the bending step. By doing so, increase in packing density and increase in adhesion strength can be realized. That is, by pressing layers in the direction in which the layers are stacked, each of the layers is densified, and the layers can be bonded to each other appropriately. In the case of pressing stacked layers, the layers may have the same area and the same thickness. Thus, the layers receive the same pressure, and the layers can be uniformly bonded to each other while being densely packed. In a battery according to the present disclosure, the layers can have substantially the same thickness and the same area. Therefore, electric cells of the battery can have the same battery characteristics. Thus, a serially stacked battery having a stably high capacity can be realized.

A battery according to the present disclosure can be used as a battery (such as an all-solid-state battery) for an electronic device, an electric device, an electric vehicle, or the like.

What is claimed is:

1. A battery comprising:
   a first insulator;
   a first electrode layer;
   a first counter-electrode layer,
   a second electrode layer;
   a second counter-electrode layer;
   a third electrode layer; and
   a third counter-electrode layer,
   wherein the first counter-electrode layer is a counter electrode for the first electrode layer,
   wherein the first insulator includes
      a first electrolyte portion,
      a second electrolyte portion,
      a first bent portion,
      a third electrolyte portion,
      a second bent portion,
      a fourth electrolyte portion, and
      a third bent portion,
   wherein the first bent portion is positioned between the first electrolyte portion and the second electrolyte portion,
   wherein the second bent portion is positioned between the second electrolyte portion and the third electrolyte portion,
   wherein the first electrode layer is disposed in contact with the first electrolyte portion,
   wherein the first counter-electrode layer is disposed in contact with the second electrolyte portion, and
   wherein the first insulator is bent at the first bent portion, and thereby the first electrode layer and the first counter-electrode layer are positioned facing each other,
   wherein the first insulator is bent at the second bent portion, and thereby the second electrolyte portion and the third electrolyte portion are positioned facing each other, wherein the second counter-electrode layer is a counter electrode for the first electrode layer and the second electrode layer, wherein the second electrode layer is disposed in contact with the second electrolyte portion, wherein the second counter-electrode layer is disposed in contact with the third electrolyte portion, wherein the first insulator is bent at the second bent portion, and thereby the second electrode layer and the second counter-electrode layer are positioned facing each other, wherein the third counter-electrode layer is a counter electrode for the first electrode layer, the second electrode layer, and the third electrode layer, wherein the third bent portion is positioned between the third electrolyte portion and the fourth electrolyte portion, wherein the third electrode layer is disposed in contact with the third electrolyte portion, wherein the third counter-electrode layer is disposed in contact with the fourth electrolyte portion, wherein the first insulator is bent at the third bent portion, and thereby the third electrode layer and the third counter-electrode layer are positioned facing each other, and wherein the first bent portion and the third bent portion contact each other.

2. The battery according to claim 1, further comprising:
a first current collector; and
a second current collector,
wherein the first current collector is disposed between the first electrode layer and the first counter-electrode layer and in contact with the first electrode layer and the first counter-electrode layer, and
wherein the second current collector is disposed between the second electrode layer and the second counter-electrode layer and in contact with the second electrode layer and the second counter-electrode layer.

3. The battery according to claim 1, further comprising:
a first current collector;
a second current collector; and
a third current collector,
wherein the first current collector is disposed between the first electrode layer and the first counter-electrode layer and in contact with the first electrode layer and the first counter-electrode layer,
wherein the second current collector is disposed between the second electrode layer and the second counter-electrode layer and in contact with the second electrode layer and the second counter-electrode layer, and
wherein the third current collector is disposed between the third electrode layer and the third counter-electrode layer and in contact with the third electrode layer and the third counter-electrode layer.

4. The battery according to claim 1,
wherein the first bent portion includes
a first protruding portion that protrudes beyond the second electrolyte portion toward a side on which the second electrode layer is disposed,
wherein the second bent portion includes
a second protruding portion that protrudes beyond the second electrolyte portion toward a side on which the first counter-electrode layer is disposed or protrudes beyond the third electrolyte portion toward a side on which the third electrode layer is disposed, and
wherein the third bent portion includes a third protruding portion that protrudes beyond the third electrolyte portion toward a side on which the second counter-electrode layer is disposed.

5. A battery comprising:
a first insulator;
a first electrode layer;
a first counter-electrode layer;
a second insulator;
a second electrode layer;
a fourth electrode layer;
a fourth counter-electrode layer; and
a fifth counter-electrode layer,
wherein the first counter-electrode layer is a counter electrode for the first electrode layer,
wherein the first insulator includes
a first electrolyte portion,
a second electrolyte portion, and
a first bent portion,
wherein the first bent portion is positioned between the first electrolyte portion and the second electrolyte portion,
wherein the first electrode layer is disposed in contact with the first electrolyte portion,
wherein the first counter-electrode layer is disposed in contact with the second electrolyte portion,
wherein the first insulator is bent at the first bent portion, and thereby the first electrode layer and the first counter-electrode layer are positioned facing each other,
wherein the fourth counter-electrode layer and the fifth counter-electrode layer are counter electrodes for the first electrode layer and the fourth electrode layer,
wherein the second insulator includes
a fifth electrolyte portion,
a sixth electrolyte portion, and
a fourth bent portion,
wherein the fourth bent portion is positioned between the fifth electrolyte portion and the sixth electrolyte portion,
wherein the second electrode layer is disposed in contact with the second electrolyte portion,
wherein the fifth counter-electrode layer is disposed in contact with the sixth electrolyte portion,
wherein the fifth electrolyte portion is disposed between the first electrolyte portion and the second electrolyte portion,
wherein the fourth electrode layer is disposed in contact with the fifth electrolyte portion and at a position facing the first counter-electrode layer,
wherein the fourth counter-electrode layer is disposed in contact with the fifth electrolyte portion and at a position facing the first electrode layer, and
wherein the second insulator is bent at the fourth bent portion, and thereby the second electrode layer and the fifth counter-electrode layer are positioned facing each other.

6. The battery according to claim 5, further comprising:
a fifth electrode layer; and
a second counter-electrode layer,
wherein the second counter-electrode layer is a counter electrode for the first electrode layer, the second electrode layer, the fourth electrode layer, and the fifth electrode layer,
wherein the first insulator includes
a second bent portion, and
a third electrolyte portion, wherein the second bent portion is positioned between the second electrolyte portion and the third electrolyte portion, wherein the fifth electrode layer is disposed in contact with the sixth electrolyte portion, wherein the second counter-electrode layer is disposed in contact with the third electrolyte portion, and wherein the first insulator is bent at the second bent portion, and thereby the fifth electrode layer and the second counter-electrode layer are positioned facing each other.

7. The battery according to claim 6, further comprising:
a third electrode layer; and
a sixth counter-electrode layer,
wherein the sixth counter-electrode layer is a counter electrode for the first electrode layer, the second electrode layer, the third electrode layer, the fourth electrode layer, and the fifth electrode layer,
wherein the second insulator includes
a seventh electrolyte portion, and
a fifth bent portion,
wherein the fifth bent portion is positioned between the sixth electrolyte portion and the seventh electrolyte portion,
wherein the third electrode layer is disposed in contact with the third electrolyte portion,
wherein the sixth counter-electrode layer is disposed in contact with the seventh electrolyte portion, and
wherein the second insulator is bent at the fifth bent portion, and thereby the third electrode layer and the sixth counter-electrode layer are positioned facing each other.

8. The battery according to claim 7, further comprising:
a sixth electrode layer; and
a third counter-electrode layer,
wherein the third counter-electrode layer is a counter electrode for the first electrode layer, the second electrode layer, the third electrode layer, the fourth electrode layer, the fifth electrode layer, and the sixth electrode layer,
wherein the first insulator includes
a third bent portion, and
a fourth electrolyte portion,
wherein the third bent portion is positioned between the third electrolyte portion and the fourth electrolyte portion,
wherein the sixth electrode layer is disposed in contact with the seventh electrolyte portion,
wherein the third counter-electrode layer is disposed in contact with the fourth electrolyte portion, and
wherein the first insulator is bent at the third bent portion, and thereby the sixth electrode layer and the third counter-electrode layer are positioned facing each other.

9. The battery according to claim 8,
wherein the fourth bent portion includes
a fourth protruding portion that protrudes beyond the fifth electrolyte portion toward a side on which the fourth counter-electrode layer is disposed or protrudes beyond the sixth electrolyte portion toward a side on which the fifth electrode layer is disposed, and
wherein the fifth bent portion includes
a fifth protruding portion that protrudes beyond the sixth electrolyte portion toward a side on which the fifth counter-electrode layer is disposed or protrudes beyond the seventh electrolyte portion toward a side on which the sixth electrode layer is disposed.

10. The battery according to claim 8,
wherein the second insulator includes
a sixth bent portion that is linked to the seventh electrolyte portion, and
wherein the fourth bent portion and the sixth bent portion contact each other.

11. The battery according to claim 8, further comprising:
a first current collector;
a second current collector;
a third current collector;
a fourth current collector;
a fifth current collector; and
a sixth current collector,
wherein the first current collector is disposed between the first electrode layer and the fourth counter-electrode layer and in contact with the first electrode layer and the fourth counter-electrode layer,
wherein the second current collector is disposed between the fourth electrode layer and the first counter-electrode layer and in contact with the fourth electrode layer and the first counter-electrode layer,
wherein the third current collector is disposed between the second electrode layer and the fifth counter-electrode layer and in contact with the second electrode layer and the fifth counter-electrode layer,
wherein the fourth current collector is disposed between the fifth electrode layer and the second counter-electrode layer and in contact with the fifth electrode layer and the second counter-electrode layer,
wherein the fifth current collector is disposed between the third electrode layer and the sixth counter-electrode layer and in contact with the third electrode layer and the sixth counter-electrode layer, and
wherein the sixth current collector is disposed between the sixth electrode layer and the third counter-electrode layer and in contact with the sixth electrode layer and the third counter-electrode layer.

12. A battery comprising:
a first insulator;
a first electrode layer;
a second electrode layer; and
a first counter-electrode layer,
wherein the first counter-electrode layer is a counter electrode for the first electrode layer,
wherein the first insulator includes
a first electrolyte portion,
a second electrolyte portion,
a third electrolyte portion,
a first bent portion, and
a second bent portion,
wherein the first bent portion is positioned between the first electrolyte portion and the second electrolyte portion,
wherein the second bent portion is positioned between the second electrolyte portion and the third electrolyte portion,
wherein the first electrode layer is disposed in contact with the first electrolyte portion,
wherein the first counter-electrode layer is disposed in contact with the second electrolyte portion,
wherein the first insulator is bent at the first bent portion, and thereby the first electrode layer and the first counter-electrode layer are positioned facing each other, wherein the first insulator is bent at the second bent portion, and thereby the second electrolyte portion and the third electrolyte portion are positioned facing each other,
wherein the second electrolyte portion includes
a first front-surface region, and
a first back-surface region,
wherein the first back-surface region is a region positioned on a back side of the first front-surface region,
wherein the first counter-electrode layer is disposed in contact with the first front-surface region,
wherein the third electrolyte portion includes
a second front-surface region, and
a second back-surface region,
wherein the second back-surface region is a region positioned on a back side of the second front-surface region,
wherein the second electrode layer is disposed in contact with the second front-surface region,
wherein the first insulator is bent at the second bent portion, and thereby the first back-surface region and the second back-surface region are positioned facing each other, and
wherein the first back-surface region and the second back-surface region contact each other.

13. The battery according to claim 12, further comprising:
a second counter-electrode layer,
wherein the second counter-electrode layer is a counter electrode for the first electrode layer and the second electrode layer,
wherein the first insulator includes
a fourth electrolyte portion, and
a third bent portion,
wherein the third bent portion is positioned between the third electrolyte portion and the fourth electrolyte portion,
wherein the second counter-electrode layer is disposed in contact with the fourth electrolyte portion, and
wherein the first insulator is bent at the third bent portion, and thereby the second electrode layer and the second counter-electrode layer are positioned facing each other.

14. The battery according to claim 13, further comprising:
a first current collector; and
a second current collector,
wherein the first current collector is disposed between the first electrode layer and the first counter-electrode layer and in contact with the first electrode layer and the first counter-electrode layer, and
wherein the second current collector is disposed between the second electrode layer and the second counter-electrode layer and in contact with the second electrode layer and the second counter-electrode layer.

15. The battery according to claim 13, further comprising:
a third electrode layer; and
a third counter-electrode layer,
wherein the third counter-electrode layer is a counter electrode for the first electrode layer, the second electrode layer, and the third electrode layer,
wherein the first insulator includes
a fifth electrolyte portion,
a sixth electrolyte portion,
a fourth bent portion, and
a fifth bent portion,
wherein the fourth bent portion is positioned between the fourth electrolyte portion and the fifth electrolyte portion,
wherein the fifth bent portion is positioned between the fifth electrolyte portion and the sixth electrolyte portion,
wherein the fourth electrolyte portion includes
a third front-surface region, and
a third back-surface region,
wherein the third back-surface region is a region positioned on a back side of the third front-surface region,
wherein the second counter-electrode layer is disposed in contact with the third front-surface region,
wherein the fifth electrolyte portion includes
a fourth front-surface region, and
a fourth back-surface region,
wherein the fourth back-surface region is a region positioned on a back side of the fourth front-surface region,
wherein the first insulator is bent at the fourth bent portion, and thereby the third back-surface region and the fourth back-surface region are positioned facing each other,
wherein the third back-surface region and the fourth back-surface region contact each other,
wherein the third electrode layer is disposed in contact with the fourth front-surface region,
wherein the third counter-electrode layer is disposed in contact with the sixth electrolyte portion, and
wherein the first insulator is bent at the fifth bent portion, and thereby the third electrode layer and the third counter-electrode layer are positioned facing each other.

16. The battery according to claim 15, further comprising:
a first current collector;
a second current collector; and
a third current collector,
wherein the first current collector is disposed between the first electrode layer and the first counter-electrode layer and in contact with the first electrode layer and the first counter-electrode layer,
wherein the second current collector is disposed between the second electrode layer and the second counter-electrode layer and in contact with the second electrode layer and the second counter-electrode layer, and
wherein the third current collector is disposed between the third electrode layer and the third counter-electrode layer and in contact with the third electrode layer and the third counter-electrode layer.

17. The battery according to claim 14, further comprising:
a second insulator;
a second counter-electrode layer;
a third electrode layer; and
a third counter-electrode layer,
wherein the second counter-electrode layer and the third counter-electrode layer are counter electrodes for the first electrode layer, the second electrode layer, and the third electrode layer,
wherein the second insulator includes
a fourth electrolyte portion,
a fifth electrolyte portion,
a sixth electrolyte portion,
a third bent portion, and
a fourth bent portion,
wherein the third bent portion is positioned between the fourth electrolyte portion and the fifth electrolyte portion,
wherein the fourth bent portion is positioned between the fifth electrolyte portion and the sixth electrolyte portion,
wherein the fourth electrolyte portion includes a third front-surface region, and
a third back-surface region,
wherein the third back-surface region is a region positioned on a back side of the third front-surface region,
wherein the fifth electrolyte portion includes
a fourth front-surface region, and
a fourth back-surface region,
wherein the fourth back-surface region is a region positioned on a back side of the fourth front-surface region,
wherein the second insulator is bent at the third bent portion, and thereby the third back-surface region and the fourth back-surface region are positioned facing each other,
wherein the fourth electrolyte portion and the fifth electrolyte portion are disposed between the first electrolyte portion and the second electrolyte portion,
wherein the second counter-electrode layer is disposed in contact with the third front-surface region and at a position facing the first electrode layer,
wherein the third electrode layer is disposed in contact with the fourth front-surface region and at a position facing the first counter-electrode layer,
wherein the third counter-electrode layer is disposed in contact with the sixth electrolyte portion, and
wherein the second insulator is bent at the fourth bent portion, and thereby the second electrode layer and the third counter-electrode layer are positioned facing each other.

18. The battery according to claim 17, further comprising:
a first current collector;
a second current collector; and
a third current collector,
wherein the first current collector is disposed between the first electrode layer and the second counter-electrode layer and in contact with the first electrode layer and the second counter-electrode layer,
wherein the second current collector is disposed between the third electrode layer and the first counter-electrode layer and in contact with the third electrode layer and the first counter-electrode layer, and
wherein the third current collector is disposed between the second electrode layer and the third counter-electrode layer and in contact with the second electrode layer and the third counter-electrode layer.

19. The battery according to claim 17, further comprising:
a third insulator;
a fourth electrode layer;
a fourth counter-electrode layer;
a fifth electrode layer; and
a fifth counter-electrode layer,
wherein the fourth counter-electrode layer and the fifth counter-electrode layer are counter electrodes for the first electrode layer, the second electrode layer, the third electrode layer, the fourth electrode layer, and the fifth electrode layer,
wherein the third insulator includes
a seventh electrolyte portion,
an eighth electrolyte portion,
a ninth electrolyte portion,
a fifth bent portion, and
a sixth bent portion,
wherein the fifth bent portion is positioned between the seventh electrolyte portion and the eighth electrolyte portion,
wherein the sixth bent portion is positioned between the eighth electrolyte portion and the ninth electrolyte portion,
wherein the seventh electrolyte portion includes
a fifth front-surface region, and
a fifth back-surface region,
wherein the fifth back-surface region is a region positioned on a back side of the fifth front-surface region,
wherein the eighth electrolyte portion includes
a sixth front-surface region, and
a sixth back-surface region,
wherein the sixth back-surface region is a region positioned on a back side of the sixth front-surface region,
wherein the third insulator is bent at the fifth bent portion, and thereby the fifth back-surface region and the sixth back-surface region are positioned facing each other,
wherein the seventh electrolyte portion and the eighth electrolyte portion are disposed between the fifth electrolyte portion and the second electrolyte portion,
wherein the fourth electrode layer is disposed in contact with the sixth electrolyte portion,
wherein the fourth counter-electrode layer is disposed in contact with the fifth front-surface region and at a position facing the third electrode layer,
wherein the fifth electrode layer is disposed in contact with the sixth front-surface region and at a position facing the first counter-electrode layer,
wherein the fifth counter-electrode layer is disposed in contact with the ninth electrolyte portion, and
wherein the third insulator is bent at the sixth bent portion, and thereby the fourth electrode layer and the fifth counter-electrode layer are positioned facing each other.

20. The battery according to claim 19, further comprising:
a first current collector;
a second current collector;
a third current collector;
a fourth current collector; and
a fifth current collector,
wherein the first current collector is disposed between the first electrode layer and the second counter-electrode layer and in contact with the first electrode layer and the second counter-electrode layer,
wherein the second current collector is disposed between the third electrode layer and the fourth counter-electrode layer and in contact with the third electrode layer and the fourth counter-electrode layer,
wherein the third current collector is disposed between the fifth electrode layer and the first counter-electrode layer and in contact with the fifth electrode layer and the first counter-electrode layer,
wherein the fourth current collector is disposed between the second electrode layer and the third counter-electrode layer and in contact with the second electrode layer and the third counter-electrode layer, and
wherein the fifth current collector is disposed between the fourth electrode layer and the fifth counter-electrode layer and in contact with the fourth electrode layer and the fifth counter-electrode layer.

21. The battery according to claim 19, further comprising:
a fourth insulator;
a sixth electrode layer;
a sixth counter-electrode layer;
a seventh electrode layer; and
a seventh counter-electrode layer,
wherein the sixth counter-electrode layer and the seventh counter-electrode layer are counter electrodes for the first electrode layer, the second electrode layer, the third electrode layer, the fourth electrode layer, the fifth electrode layer, the sixth electrode layer, and the seventh electrode layer, wherein the fourth insulator includes
a tenth electrolyte portion,
an eleventh electrolyte portion,
a twelfth electrolyte portion,
a seventh bent portion, and
an eighth bent portion, wherein the seventh bent portion is positioned between the tenth electrolyte portion and the eleventh electrolyte portion, wherein the eighth bent portion is positioned between the eleventh electrolyte portion and the twelfth electrolyte portion, wherein the tenth electrolyte portion includes
a seventh front-surface region, and
a seventh back-surface region, wherein the seventh back-surface region is a region positioned on a back side of the seventh front-surface region, wherein the eleventh electrolyte portion includes
an eighth front-surface region, and
an eighth back-surface region, wherein the eighth back-surface region is a region positioned on a back side of the eighth front-surface region, wherein the fourth insulator is bent at the seventh bent portion, and thereby the seventh back-surface region and the eighth back-surface region are positioned facing each other, wherein the tenth electrolyte portion and the eleventh electrolyte portion are disposed between the eighth electrolyte portion and the second electrolyte portion, wherein the sixth electrode layer is disposed in contact with the ninth electrolyte portion, wherein the sixth counter-electrode layer is disposed in contact with the seventh front-surface region and at a position facing the fifth electrode layer, wherein the seventh electrode layer is disposed in contact with the eighth front-surface region and at a position facing the first counter-electrode layer, wherein the seventh counter-electrode layer is disposed in contact with the twelfth electrolyte portion, and wherein the fourth insulator is bent at the eighth bent portion, and thereby the sixth electrode layer and the seventh counter-electrode layer are positioned facing each other.

22. The battery according to claim 21, further comprising:
a first current collector;
a second current collector;
a third current collector;
a fourth current collector;
a fifth current collector;
a sixth current collector; and
a seventh current collector, wherein the first current collector is disposed between the first electrode layer and the second counter-electrode layer and in contact with the first electrode layer and the second counter-electrode layer, wherein the second current collector is disposed between the third electrode layer and the fourth counter-electrode layer and in contact with the third electrode layer and the fourth counter-electrode layer, wherein the third current collector is disposed between the fifth electrode layer and the sixth counter-electrode layer and in contact with the fifth electrode layer and the sixth counter-electrode layer, wherein the fourth current collector is disposed between the seventh electrode layer and the first counter-electrode layer and in contact with the seventh electrode layer and the first counter-electrode layer, wherein the fifth current collector is disposed between the second electrode layer and the third counter-electrode layer and in contact with the second electrode layer and the third counter-electrode layer, wherein the sixth current collector is disposed between the fourth electrode layer and the fifth counter-electrode layer and in contact with the fourth electrode layer and the fifth counter-electrode layer, and wherein the seventh current collector is disposed between the sixth electrode layer and the seventh counter-electrode layer and in contact with the sixth electrode layer and the seventh counter-electrode layer.

* * * * *